US012786968B2

(12) United States Patent
Erkucuk et al.

(10) Patent No.: US 12,786,968 B2
(45) Date of Patent: Nov. 3, 2026

(54) MULTI-USER FDMA-BASED TRIGGERED TXOP SHARING

(71) Applicant: Comcast Cable Communications, LLC, Philadelphia, PA (US)

(72) Inventors: Serhat Erkucuk, Falls Church, VA (US); Jeongki Kim, Seoul (KR); Esmael Hejazi Dinan, McLean, VA (US); Leonardo Alisasis Lanante, Reston, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 428 days.

(21) Appl. No.: 18/474,828

(22) Filed: Sep. 26, 2023

(65) Prior Publication Data

US 2024/0107508 A1 Mar. 28, 2024

Related U.S. Application Data

(60) Provisional application No. 63/413,660, filed on Oct. 6, 2022, provisional application No. 63/409,863, filed on Sep. 26, 2022.

(51) Int. Cl.
*H04W 72/0453* (2023.01)
*H04W 74/0808* (2024.01)

(52) U.S. Cl.
CPC ... *H04W 72/0453* (2013.01); *H04W 74/0808* (2013.01)

(58) Field of Classification Search
CPC ............... H04W 72/04; H04W 72/044; H04W 72/0453; H04W 74/08; H04W 74/0808; H04W 84/12; H04W 84/18; H04L 5/0003; H04L 5/0005; H04L 5/0007
See application file for complete search history.

(56) References Cited

U.S. PATENT DOCUMENTS

| | | | | |
|---|---|---|---|---|
| 2020/0359230 | A1 | 11/2020 | Yerramalli et al. | |
| 2021/0176763 | A1 | 6/2021 | Viger et al. | |
| 2021/0368561 | A1 | 11/2021 | Nezou et al. | |
| 2022/0353910 | A1* | 11/2022 | Lu | H04W 74/006 |
| 2023/0209512 | A1* | 6/2023 | Baron | H04W 72/51 370/328 |

(Continued)

FOREIGN PATENT DOCUMENTS

| | | | |
|---|---|---|---|
| WO | 2021089758 | A1 | 5/2021 |
| WO | 2021239618 | A2 | 12/2021 |

(Continued)

OTHER PUBLICATIONS

Feb. 15, 2024—European Search Report—EP App. No. 23199846.9.

*Primary Examiner* — Paul H. Masur
(74) *Attorney, Agent, or Firm* — Banner & Witcoff, Ltd.

(57) ABSTRACT

An access point (AP) may communicate with one or more computing devices (e.g., wireless devices and/or stations (STAs)). Computing devices may transmit without simultaneous transmit-receive (STR) operation, for example, by eliminating target computing device indications in a frame and/or by setting a target computing device rule for allocated computing devices. Instead of using adjacent channels for computing device operation, computing devices may use non-adjacent channels for transmitting and receiving in order to decrease adjacent channel interference.

30 Claims, 30 Drawing Sheets

(56) References Cited

U.S. PATENT DOCUMENTS

| | | | | |
|---|---|---|---|---|
| 2023/0354377 | A1* | 11/2023 | Yang | H04W 28/0278 |
| 2023/0413327 | A1 | 12/2023 | Kim et al. | |
| 2024/0373456 | A1* | 11/2024 | Iwai | H04W 74/0816 |
| 2024/0397551 | A1* | 11/2024 | Kim | H04W 74/0866 |
| 2025/0119191 | A1* | 4/2025 | Lou | H04B 7/088 |

FOREIGN PATENT DOCUMENTS

| | | | |
|---|---|---|---|
| WO | 2022067748 | A1 | 4/2022 |
| WO | 2022114468 | A1 | 6/2022 |

* cited by examiner

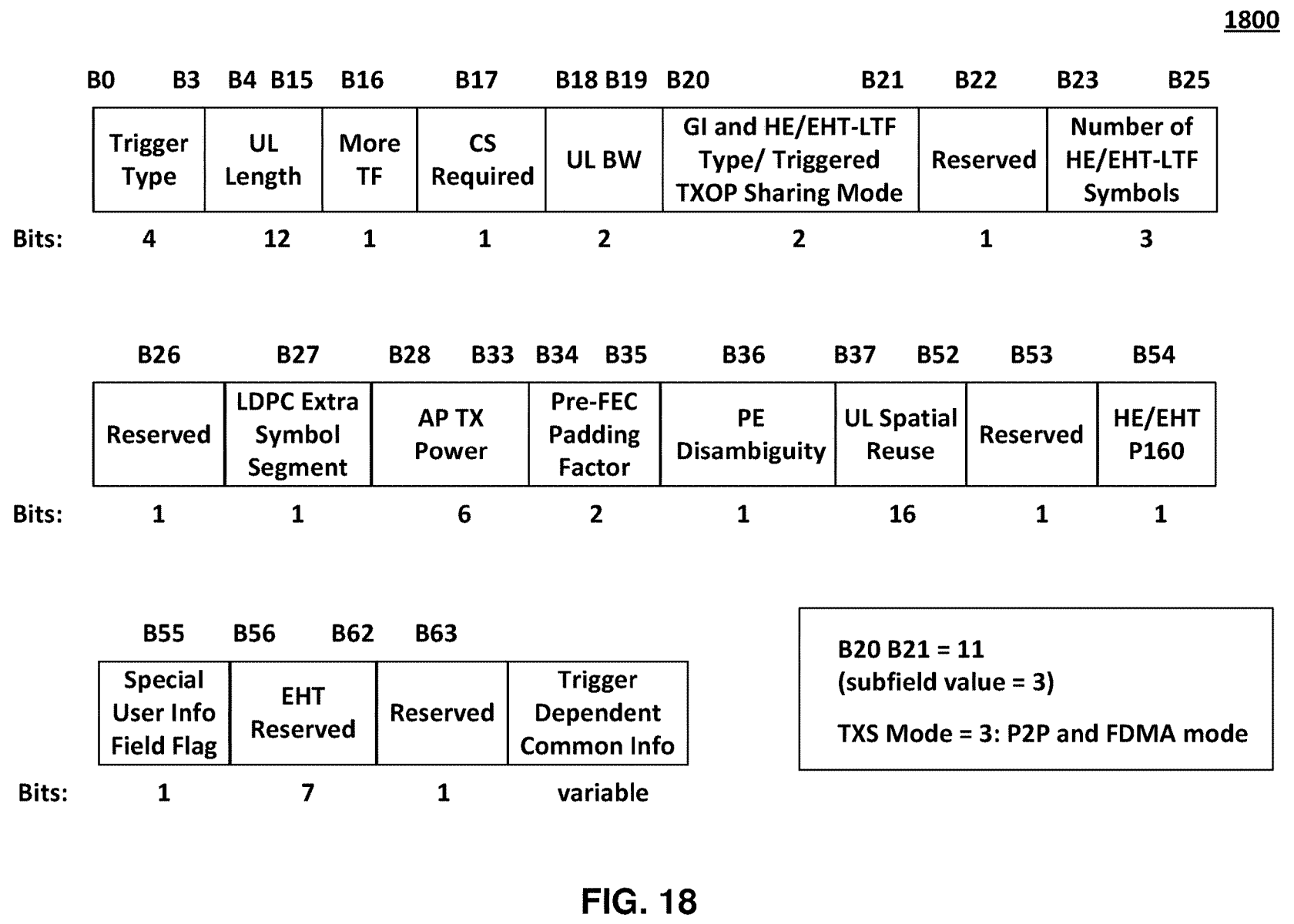

1800

| | B0 B3 | B4 B15 | B16 | B17 | B18 B19 | B20 B21 | B22 | B23 B25 |
|---|---|---|---|---|---|---|---|---|
| | Trigger Type | UL Length | More TF | CS Required | UL BW | GI and HE/EHT-LTF Type/ Triggered TXOP Sharing Mode | Reserved | Number of HE/EHT-LTF Symbols |
| Bits: | 4 | 12 | 1 | 1 | 2 | 2 | 1 | 3 |

| | B26 | B27 | B28 B33 | B34 B35 | B36 | B37 B52 | B53 | B54 |
|---|---|---|---|---|---|---|---|---|
| | Reserved | LDPC Extra Symbol Segment | AP TX Power | Pre-FEC Padding Factor | PE Disambiguity | UL Spatial Reuse | Reserved | HE/EHT P160 |
| Bits: | 1 | 1 | 6 | 2 | 1 | 16 | 1 | 1 |

| | B55 | B56 B62 | B63 | |
|---|---|---|---|---|
| | Special User Info Field Flag | EHT Reserved | Reserved | Trigger Dependent Common Info |
| Bits: | 1 | 7 | 1 | variable |

B20 B21 = 11
(subfield value = 3)
TXS Mode = 3: P2P and FDMA mode

FIG. 18

MULTI-USER FDMA-BASED TRIGGERED TXOP SHARING

CROSS-REFERENCE TO RELATED APPLICATIONS

This application claims the benefit of U.S. Provisional Application No. 63/409,863, filed on Sep. 26, 2022, and U.S. Provisional Application No. 63/413,660, filed on Oct. 6, 2022. The above referenced applications are hereby incorporated by reference in their entireties.

BACKGROUND

An access point (AP) allocates resources of a transmission opportunity (TXOP) to a computing device (e.g., wireless device and/or station (STA)).

SUMMARY

The following summary presents a simplified summary of certain features. The summary is not an extensive overview and is not intended to identify key or critical elements.

An access point (AP) may communicate with a computing device (e.g., wireless device and/or station (STA)). One or more computing devices may communicate with the AP and/or with each other. An AP may transmit a multi-user request-to-sent (MU-RTS) trigger frame comprising a sharing mode subfield set to a non-zero value for a triggered transmission opportunity (TXOP) sharing procedure. The triggered TXOP sharing procedure may be used to allow an AP to allocate a portion of the time within an obtained TXOP to multiple computing devices for transmitting physical layer protocol data units (PPDUs) to peer computing devices simultaneously. Frequency Division Multiple Access (FDMA) may be used to allocate channels to each computing device to communicate with a peer computing device. An MU-RTS TXS (triggered TXOP sharing) trigger (MRTT) frame may comprise information indicating target computing devices. Computing devices may use simultaneous transmit and receive (STR) procedures in single link communication. Computing devices may transmit without STR operation, for example, by eliminating target computing device indications in an MRTT frame and/or by setting a target computing device rule for allocated computing devices. Instead of using adjacent channels for computing device operation, computing devices may use non-adjacent channels for transmitting and receiving, which may reduce adjacent channel interference. STR operation may be performed via a multi-user FDMA-based TXS procedure. For example, an AP may transmit to a first computing device an MRTT frame indicating a first frequency allocation and/or allocating one or more computing devices. The first computing device may transmit a second frame to a second computing device, for example, based on the second computing device not being allocated by the MRTT frame and based on the first computing device having buffered traffic for transmission to the second computing device.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 18 shows an example of a Common Info field of an MRTT frame which may be used in an FDMA-based TXS procedure.

DETAILED DESCRIPTION

Figure 1:
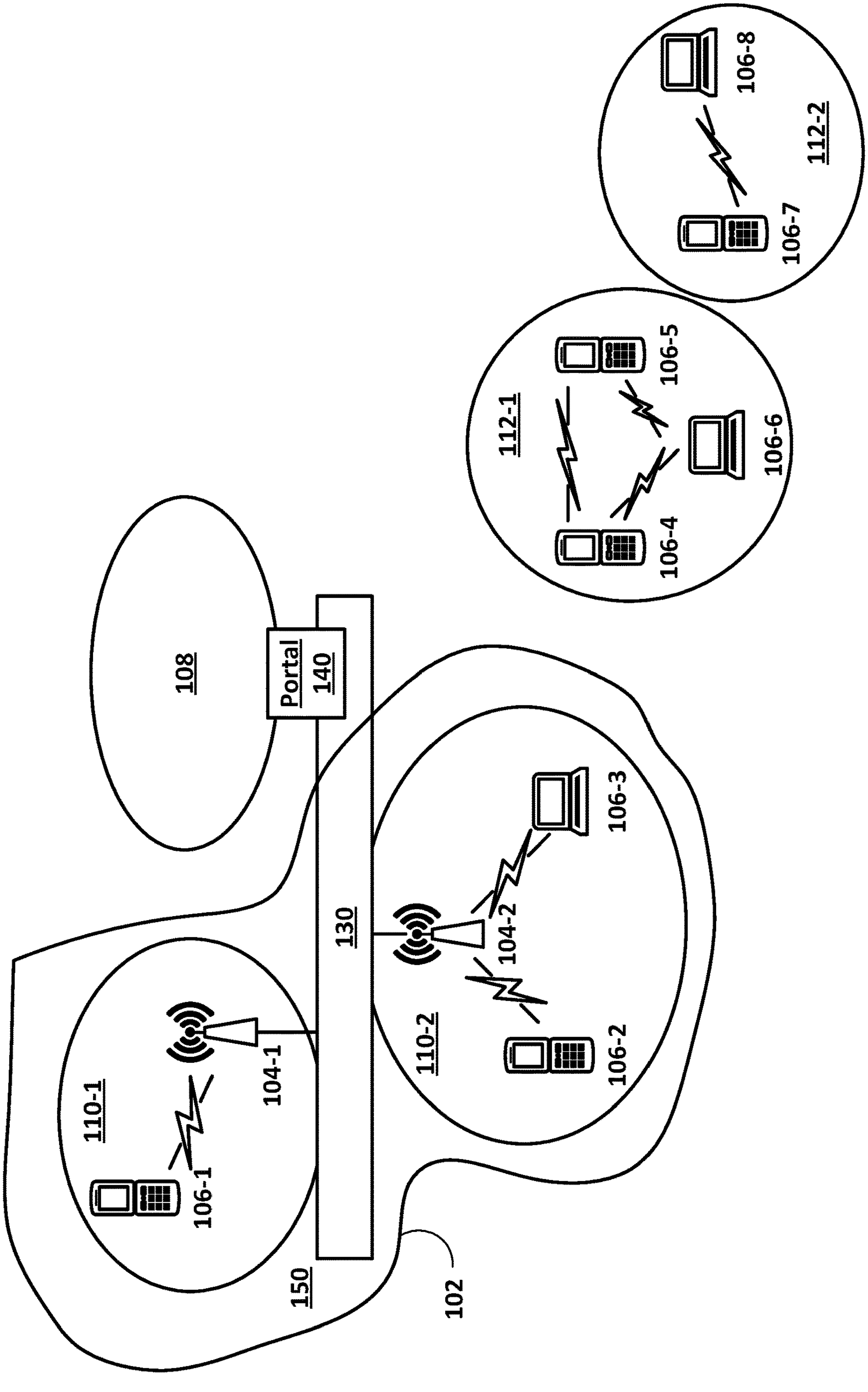
FIG. 1 shows example wireless communication networks.

The accompanying drawings and descriptions provide examples. It is to be understood that the examples shown in the drawings and/or described are non-exclusive, and that features shown and described may be practiced in other examples. Examples are provided for operation of wireless communication systems.

FIG. 1 shows example wireless communication networks. The example wireless communication networks may be a wireless local area network (WLAN) 102. The WLAN 102 may comprise an Institute of Electrical and Electronic Engineers (IEEE) 802.11 infra-structure network, or any other type of communication network. The WLAN 102 may comprise one or more basic service sets (BSSs) 110-1 and 110-2. BSSs 110-1 and 110-2 may each include a set of an access point (AP or AP STA) and at least one station (STA or non-AP STA). For example, BSS 110-1 includes an AP 104-1 and a STA 106-1, and BSS 110-2 includes an AP 104-2 and STAs 106-2 and 106-3. The AP and the at least one STA in a BSS may be configured to perform an association procedure to communicate with each other.

The WLAN 102 may comprise a distribution system (DS) 130. DS 130 may be configured to connect BSS 110-1 and BSS 110-2. DS 130 may enable an extended service set (ESS) 150 by being configured to connect BSS 110-1 and BSS 110-2. The ESS 150 may be a network comprising one or more APs (e.g., APs 104-1 and AP 104-2) that may be connected via the DS 130. The APs included in ESS 150 may have the same service set identification (SSID). WLAN 102 may be coupled to one or more external networks. For example, WLAN 102 may be connected to another network 108 (e.g., 802.X) via a portal 140. Portal 140 may function as a bridge connecting DS 130 of WLAN 102 with the other network 108.

The example wireless communication networks may also, or alternatively, comprise one or more ad-hoc networks and/or independent BSSs (IBSSs). For example, FIG. 1 shows example IBSSs, where STAs 106-4, 106-5 and 106-6 may be configured to form a first IBSS 112-1 and STAs 106-7 and 106-8 may be configured to form a second IBSS 112-2. An ad-hoc network and/or IBSS is a network that includes a plurality of STAs without a centralized communication device, such as an AP. The plurality of STAs may be configured to communicate without requiring the presence of an AP. For example, the plurality of STAs in the IBSS may communicate with each other using peer-to-peer communication (e.g., not via an AP). IBSSs do not include a centralized management entity (e.g., an AP) configured to perform a centralized management. STAs within an IBSS are managed in a distributed manner. STAs forming an IBSS may be fixed and/or mobile. The STAs (e.g., STAs 106-4, 106-5, 106-6, 106-7, 106-8) may or may not be permitted to access the DS 130 to constitute a self-contained network.

A STA may comprise one or more layers in accordance with the open systems interconnection (OSI) model. For example, STAs may comprise a medium access control (MAC) layer that may be in accordance with a defined standard (e.g., an IEEE 802.11 standard, or any other standard). A physical (PHY) layer interface for a radio medium may include the APs and the non-AP stations (STAs). The STA may comprise one or more of a computing device, a mobile terminal, a wireless device, a wireless transmit/receive unit (WTRU), user equipment (UE), a mobile station (MS), a mobile subscriber unit, and/or a user device. For example, with respect to wireless LAN communications, a device participating in uplink multi-user, multiple input, multiple output (MU-MIMO) and/or uplink orthogonal frequency division multiple access (OFDMA) transmission may be referred to as a STA. STAs may not be limited to only participating in wireless LAN communications, and may perform other types of communications, operations, and/or procedures.

A frequency band to be used for communication may include multiple sub-bands and/or frequency channels. For example, messages (e.g., data packets, physical layer protocol data units (PPDUs)) conforming to the IEEE 802.11 standard (e.g., IEEE 802.11n, 802.11ac, 802.11ax, 802.11be, etc., standards) may be sent (e.g., transmitted) over the 2.4, 5 GHz, and/or 6 GHz bands. Each of the bands may be divided into multiple 20 MHz channels. PPDUs conforming to the IEEE 802.11 standard may be sent, for example, via a physical channel with a minimum bandwidth of 20 MHz. Larger channels may be formed through channel bonding. For example, the PPDUs may be sent via physical channels with bandwidths of 40 MHz, 80 MHz, 160 MHz, 520 MHz, or any other frequency greater than 20 MHz, by bonding together multiple 20 MHz channels.

A PPDU may be a composite structure that may comprise a PHY preamble and a payload in the form of a physical layer convergence protocol (PLCP) service data unit (PSDU). For example, the PSDU may comprise a PLCP preamble, a header, and/or one or more MAC protocol data units (MPDUs). Information indicated by the PHY preamble may be used by a receiving device to decode subsequent data in the PSDU. Preamble fields may be duplicated and sent in each of multiple component channels in a bonded channel, for example, if the PPDU is sent via the bonded channel. The PHY preamble may comprise both a legacy portion (e.g., a legacy preamble) and a non-legacy portion (e.g., a non-legacy preamble). The legacy preamble may be used for packet detection, automatic gain control and channel estimation, etc. The legacy preamble also may generally be used to maintain compatibility with legacy devices. The information provided in, and the format and coding of the non-legacy portion of the preamble may be based on the particular IEEE 802.11 protocol to be used to send the payload.

A frequency band may include one or more sub-bands or frequency channels. For example, PPDUs conforming to the IEEE 802.11n, 802.11ac, 802.11ax and/or 802.11be standard amendments may be transmitted over the 2.4 GHz, 5 GHz, and/or 6 GHz bands, each of which may be divided into multiple 20 MHz channels. The PPDUs may be transmitted over a physical channel having a minimum bandwidth of 20 MHz. Larger channels may be formed through channel bonding. For example, PPDUs may be transmitted over physical channels having bandwidths of 40 MHz, 80 MHz, 160 MHz, or 320 MHz by bonding together multiple 20 MHz channels.

Figure 2:
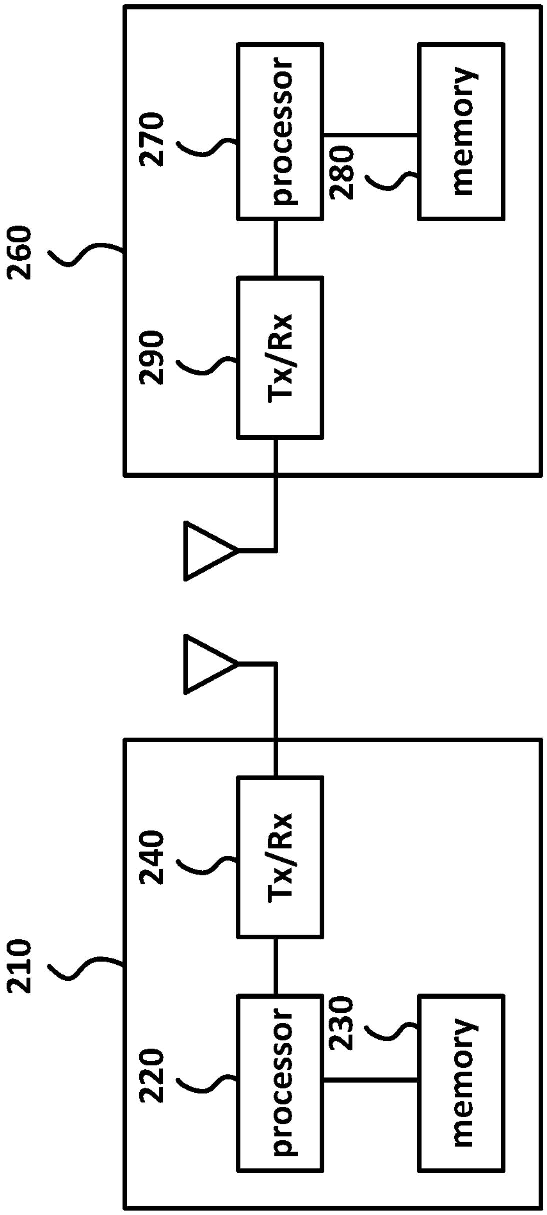
FIG. 2 shows example devices in a communication network.

FIG. 2 shows example devices in a communication network. The communication network of FIG. 2 may comprise multiple devices (e.g., communication devices 210 and 260). The communication devices 210 and 260 may perform various functions and procedures as described herein. For example, the communication device 210 may operate as an AP (e.g., an AP STA) and the communication device 260 may operate as a STA (e.g., a non-AP STA). The communication device 210 may operate as a STA (e.g., a non-AP STA) and the communication device 260 may operate as an AP (e.g., an AP STA). Also, or alternatively, the communication device 210 and the communication device 260 may both operate as STAs (e.g., a non-AP STAs) or may both operate as APs (e.g., AP STAs).

The communication device 210 may comprise at least one processor 220, a memory 230, and/or at least one transceiver (e.g., RF unit) 240. The communication device 260 may comprise at least one processor 270, memory 280, and/or at least one transceiver (e.g., RF unit) 290. The transceivers (e.g., transceivers 240, 290) may send/receive radio signals. The transceivers may operate as a PHY layer (e.g., a PHY layer in accordance with an IEEE 802.11 protocol, a 3rd generation partnership project (3GPP) protocol, etc.). The processors (e.g., processors 220, 270) may operate as a PHY layer and/or MAC layer. The processors may be operatively connected to the transceivers, respectively. The communication devices 210 and/or 260 may be a multi-link device (MLD), that is a device capable of operating over multiple links (e.g., as defined by the IEEE 802.11be standard amendment). A MLD has multiple PHY layers. The multiple PHY layers may be implemented using one or more of transceivers 240 and/or 290. Processor 220 and/or 270 may implement functions of the PHY layer, the MAC layer, and/or a logical link control (LLC) layer of the corresponding communication devices 210 and/or 260.

The processors and/or the transceivers may comprise an application specific integrated circuit (ASIC), other chipset, logic circuit, and/or data processor. The memory (e.g., memory 230, 280) may include read-only memory (ROM), random access memory (RAM), flash memory, memory card, storage medium and/or other storage unit. The procedures described herein may be executed by modules that perform various functions described herein (e.g., in accordance with instructions stored in the memory). The modules can be stored in the memory and executed by the processor. The memory may be integrated with the processor or may be external to the processor. The memory may be operatively connected to the processor. The processor may implement the functions, processes and/or methods as described herein. For example, the processor 220 may be implemented to perform operations of the AP as described herein. For example, the processor 270 may be implemented to perform operations of the STA as described herein. The memory may store instructions that, when executed by one or more processors, cause the communication device to perform methods as described herein. For example, the memory may be a non-transitory computer-readable medium comprising instructions that, when executed by the one or more processors, cause the one or more processors to perform methods and operations described herein. For example, the memory 230 may store instructions that, when executed by the processor 220, cause the processor 220 to perform operations of the AP as described herein. For example, the memory 280 may store instructions that, when executed by the processor 270, cause the processor 270 to perform operations of the STA as described herein.

Figure 3:
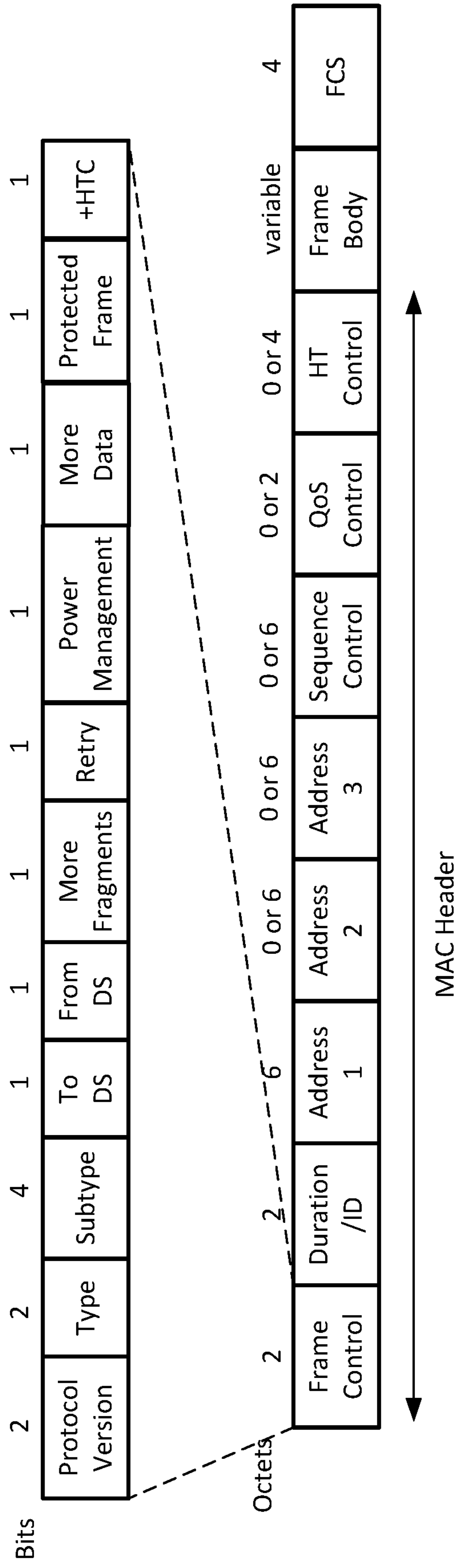
FIG. 3 shows an example format of a Medium Access Control (MAC) frame.

FIG. 3 shows an example format of a MAC frame. In operation, a STA may construct a subset of MAC frames for transmission and may decode a subset of received MAC frames upon validation. The particular subsets of frames that a STA may construct and/or decode may be determined by the functions supported by the STA. A STA may validate a received MAC frame using a frame check sequence (FCS) contained in the frame and may interpret certain fields from the MAC headers of all frames.

As shown in FIG. 3, a MAC frame may comprise a MAC header, a variable length frame body, and a frame check sequence (FCS). The MAC header may comprise a frame control field, an optional duration/ID field, address fields, an optional sequence control field, an optional QoS control field, and an optional high throughput (HT) control field.

The frame control field may comprise the following subfields: protocol version, type, subtype, To DS, From DS, more fragments, retry, power management, more data, protected frame, and +HTC (high throughput control). The protocol version subfield is invariant in size and placement across all revisions of the IEEE 802.11 standard. The value of the protocol version subfield may be 0 for MAC frames.

The type and subtype subfields together identify the function of the MAC frame. There are three frame types: control, data, and management. Each of the frame types has several defined subtypes. Bits within the subtype subfield may be used to indicate a specific modification of the basic data frame (subtype 0). For example, in data frames, the most significant bit (MSB) of the subtype subfield, bit 7 (B7) of the frame control field, is defined as the QoS subfield. For example, if the QoS subfield is set to 1, it may indicate a QoS subtype data frame, which is a data frame that contains a QoS control field in its MAC header. The second MSB of the subtype field, bit 6 (B6) of the frame control field, if set to 1 in data subtypes, may indicate a data frame that contain no frame body field.

The To DS subfield may indicate whether a data frame is destined to the distribution system (DS). The From DS subfield may indicate whether a data frame originates from the DS. The more fragments subfield may be set to 1 in all data or management frames that have another fragment to follow of the MAC service data unit (MSDU) or MAC management protocol data unit (MMPDU) carried by the MAC frame. The more fragments subfield may be set to 0 in all other frames in which the more fragments subfield is present.

The retry subfield may be set to 1 in any data or management frame that is a retransmission of an earlier frame. The retry subfield may be set to 0 in all other frames in which the retry subfield is present. A receiving STA may use this indication to aid in the process of eliminating duplicate frames. These rules may not apply for frames sent by a STA under a block agreement. The power management subfield may be used to indicate the power management mode of a STA.

The More Data subfield may indicate to a STA in power save (PS) mode that bufferable units (Bus) are buffered for that STA at the AP. The more data subfield may be valid in individually addressed data or management frames sent (e.g., transmitted) by an AP to a STA in PS mode. The more data subfield may be set to 1 to indicate that at least one additional buffered BU is present for the STA.

The protected frame subfield may be set to 1, for example, if the frame body field contains information that has been processed by a cryptographic encapsulation algorithm. The +HTC subfield may indicate that the MAC frame contains an HT control field.

The duration/ID field of the MAC header may indicate various contents depending on frame type and subtype and the QoS capabilities of the sending STA. For example, in control frames of the power save poll (PS-Poll) subtype, the duration/ID field may carry an association identifier (AID) of the STA that sent (e.g., transmitted) the frame in the 14 least significant bits (LSB), and the two most significant bits (MSB) may be both set to 1. In other frames sent by STAs, the duration/ID field may contain a duration value (in microseconds) which may be used by a recipient to update a network allocation vector (NAV). The NAV may be a counter that indicates to a STA an amount of time during which the STA must defer from accessing the shared medium.

There may be up to four address fields in the MAC frame format. These fields may be used to indicate the basic service set identifier (BSSID), source address (SA), destination address (DA), transmitting address (TA), and receiving address (RA). Certain frames might not contain some of the address fields. Certain address field usage may be specified by the relative position of the address field (1-4) within the MAC header, independent of the type of address present in that field. For example, the address 1 field always identifies the intended receiver(s) of the frame, and the address 2 field, where present, always identifies the transmitter of the frame.

The sequence control field may comprise two subfields, a sequence number subfield and a fragment number subfield. The sequence number subfield in data frames may indicate the sequence number of the MSDU (if not in an Aggregated MSDU (A-MSDU)) or A-MSDU. The sequence number subfield in management frames may indicate the sequence number of the frame. The fragment number subfield may indicate the number of each fragment of an MSDU or MMPDU. The fragment number may be set to 0 in the first or only fragment of an MSDU or MMPDU and may be incremented by one for each successive fragment of that MSDU or MMPDU. The fragment number may be set to 0 in a MAC protocol data unit (MPDU) containing an A-MSDU, or in an MPDU containing an MSDU or MMPDU that is not fragmented. The fragment number may remain constant in all retransmissions of the fragment.

The QoS control field may identify the traffic category (TC) or traffic stream (TS) to which the MAC frame belongs. The QoS control field may also indicate various other QoS related, A-MSDU related, and mesh-related information about the frame. This information can vary by frame type, frame subtype, and type of sending (e.g., transmitting) STA. The QoS control field is present in all data frames in which the QoS subfield of the subtype subfield is equal to 1.

The HT control field is present in QoS data, QoS null, and management frames as determined by the +HTC subfield of the frame control field. The frame body field is a variable length field that contains information specific to individual frame types and subtypes. It may comprise one or more MSDUs or MMPDUs. The minimum length of the frame body is 0 octets. The FCS field may contain a 32-bit Cyclic Redundancy Check (CRC) code. The FCS field value may be calculated over all of the fields of the MAC header and the frame body field.

Figure 4:
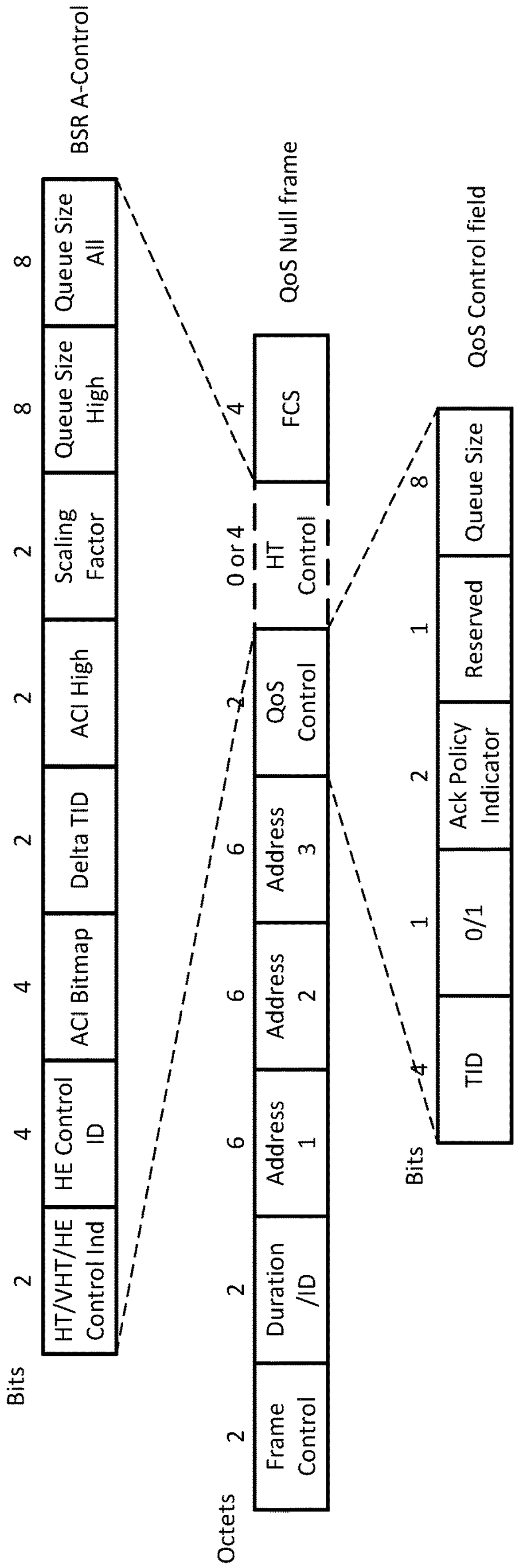
FIG. 4 shows an example of a Quality of Service (QoS) null frame indicating buffer status information.

FIG. 4 shows an example of a QoS null frame indicating buffer status information. A QoS null frame refers to a QoS data frame with an empty frame body. A QoS null frame may comprise a QoS control field and an optional HT control field which may contain a buffer status report (BSR) control subfield. A QoS null frame indicating buffer status information may be sent (e.g., transmitted) by a STA to an AP.

The QoS control field may comprise a traffic identifier (TID) subfield, an ack policy indicator subfield, and a queue size subfield (or a transmission opportunity (TXOP) duration requested subfield). The TID subfield may identify the TC or TS of traffic for which a TXOP is being requested, through the setting of the TXOP duration requested or queue size subfield. The encoding of the TID subfield depends on the access policy (e.g., allowed value 0 to 7 for enhanced distributed channel access (EDCA) access policy to identify user priority for either TC or TS). The ack policy indicator subfield, together with other information, may identify the acknowledgment policy followed upon delivery of the MPDU (e.g., normal ack, implicit block ack request, no ack, block ack, etc.)

The queue size subfield may be an 8-bit field that indicates the amount of buffered traffic for a given TC or TS at the STA for transmission to the AP identified by the receiver address of the frame containing the subfield. The queue size subfield may be present in QoS null frames sent by a STA, for example, if bit 4 of the QoS control field is set to 1. The AP may use information contained in the queue size subfield to determine the TXOP (transmission opportunity) duration assigned to the STA or to determine the uplink (UL) resources assigned to the STA.

In a frame sent by or to a non-High Efficiency (non-HE) STA, the following rules may apply to the queue size value:

- The queue size value is the approximate total size, rounded up to the nearest multiple of 256 octets and expressed in units of 256 octets, of all MSDUs and A-MSDUs buffered at the STA (excluding the MSDU or A-MSDU contained in the present QoS Data frame) in the delivery queue used for MSDUs and A-MSDUs with TID values equal to the value indicated in the TID subfield of the QoS Control field;
- A queue size value of 0 is used solely to indicate the absence of any buffered traffic in the queue used for the specified TID;
- A queue size value of 254 is used for all sizes greater than 64 768 octets;
- A queue size value of 255 is used to indicate an unspecified or unknown size.

In a frame sent by an HE STA to an HE AP, the following rules may apply to the queue size value:

- The queue size value, QS, is the approximate total size in octets, of all MSDUs and A-MSDUs buffered at the STA (including the MSDUs or A-MSDUs contained in the same PSDU as the frame containing the queue size subfield) in the delivery queue used for MSDUs and A-MSDUs with TID values equal to the value indicated in the TID subfield of the QoS control field;
- The queue size subfield comprises a scaling factor subfield in bits B14-B15 of the QoS control field and an unscaled value, UV, in bits B8-B13 of the QoS control field. The scaling factor subfield provides the scaling factor, on.

A STA may obtain the queue size, QS, from a received QoS control field, which contains a scaling factor, SF, and an unscaled value, UV, as follows:

QS=

16 xUV, if SF is equal to 0;

1024+256×UV, if SF is equal to 1;

17408+2048×UV, if SF is equal to 2;

148480+32768×UV, if SF is equal to 3 and UV is less than 62;

>2147328, if SF equal to is 3 and UV is equal to 62;

Unspecified or Unknown, if SF is equal to 3 and UV is equal to 63.

The TXOP duration requested subfield, which may be included instead of the queue size subfield, may indicate the duration, in units of 32 microseconds (us), that the sending STA determines it needs for its next TXOP for the specified TID. The TXOP duration requested subfield may be set to 0 to indicate that no TXOP is requested for the specified TID in the current service period (SP). The TXOP duration requested subfield may be set to a nonzero value to indicate a requested TXOP duration in the range of 32 us to 8160 us in increments of 32 us.

The HT control field may comprise a BSR control subfield which may contain buffer status information used for UL MU operation. The BSR control subfield may be formed by a control ID, an access category index (ACI) bitmap subfield, a delta TID subfield, an ACI high subfield, a scaling factor subfield, a queue size high subfield, and a queue size all subfield of the HT control field.

The ACI bitmap subfield may indicate the access categories for which buffer status is reported (e.g., B0: best effort (AC_BE), B1: background (AC_BK), B2: video (AC_VI), B3: voice (AC_VO), etc.). Each bit of the ACI bitmap subfield may be set to 1 to indicate that the buffer status of the corresponding AC is included in the queue size all subfield, and set to 0 otherwise, except that if the ACI bitmap subfield is 0 and the delta TID subfield is 3, then the buffer status of all 8 TIDs is included.

The delta TID subfield, together with the values of the ACI bitmap subfield, may indicate the number of TIDs for which the STA is reporting the buffer status. The ACI high subfield may indicate the ACI of the AC for which the BSR is indicated in the queue size high subfield. The ACI to AC mapping is defined as ACI value 0 mapping to AC_BE, ACI value 1 mapping to AC_BK, ACI value 2 mapping to AC_VI, and ACI value 3 mapping to AC_VO. The scaling factor subfield may indicate the unit SF, in octets, of the queue size high and queue size all subfields.

The queue size high subfield may indicate the amount of buffered traffic, in units of SF octets, for the AC identified by the ACI high subfield, that is intended for the STA identified by the receiver address of the frame containing the BSR control subfield. The queue size all subfield may indicate the amount of buffered traffic, in units of SF octets, for all Acs identified by the ACI Bitmap subfield, that is intended for the STA identified by the receiver address of the frame containing the BSR control subfield.

The queue size values in the queue size high and queue size all subfields are the total sizes, rounded up to the nearest multiple of SF octets, of all MSDUs and A-MSDUs buffered at the STA (including the MSDUs or A-MSDUs contained in the same PSDU as the frame containing the BSR control subfield) in delivery queues used for MSDUs and A-MSDUs associated with AC(s) that are specified in the ACI high and ACI bitmap subfields, respectively.

A queue size value of 254 in the queue size high and queue size all subfields may indicate that the amount of buffered traffic is greater than 254×SF octets. A queue size value of 255 in the queue size high and queue size all subfields may indicate that the amount of buffered traffic is an unspecified or unknown size. The queue size value of QoS data frames containing fragments may remain constant even if the amount of queued traffic changes as successive fragments are sent (e.g., transmitted).

MAC service may provide peer entities with the ability to exchange MSDUs. To support this service, a local MAC may use the underlying PHY-level service to transport the MSDUs to a peer MAC entity. Such asynchronous MSDU transport may be performed on a connectionless basis.

Figure 5:
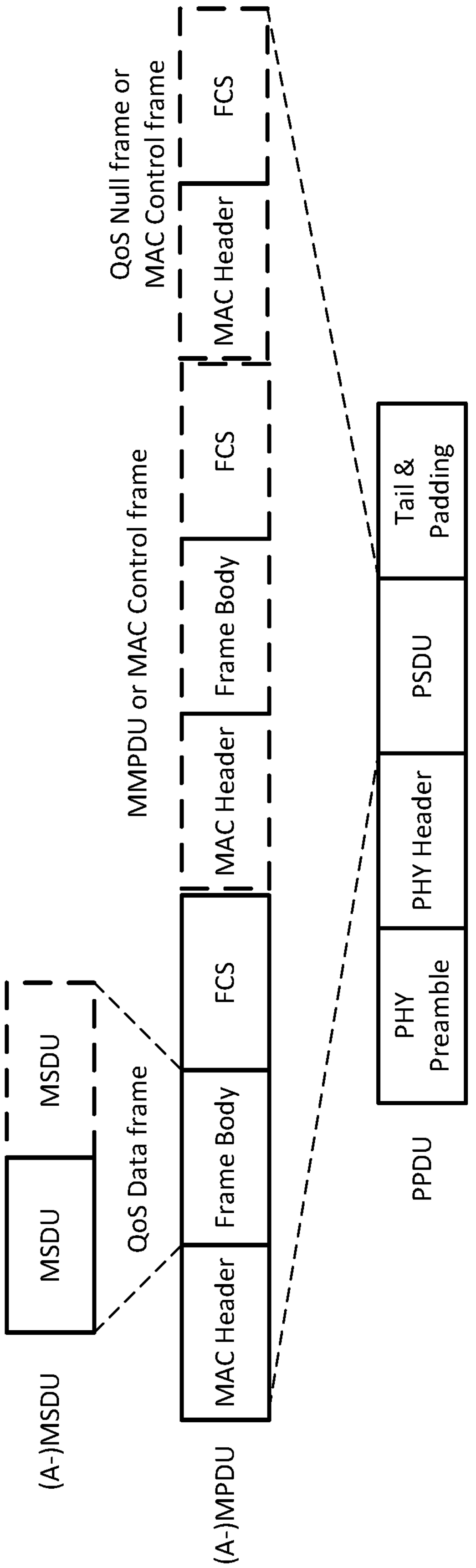
FIG. 5 shows an example format of a physical layer (PHY) protocol data unit (PPDU).

FIG. 5 shows an example format of a PPDU. As shown, the PPDU may comprise a PHY preamble, a PHY header, a PSDU, and tail and padding bits.

The PSDU may comprise one or more MPDUs, such as a QoS data frame, an MMPDU, a MAC control frame, or a QoS null frame. For an MPDU carrying a QoS data frame, the frame body of the MPDU may comprise a MSDU or an A-MSDU. By default, MSDU transport is on a best-effort basis. That is, there is no guarantee that a sent (e.g., transmitted) MSDU will be delivered successfully. The QoS facility may use a traffic identifier (TID) to specify differentiated services on a per-MSDU basis.

A STA may differentiate MSDU delivery according to designated traffic category (TC) or traffic stream (TS) of individual MSDUs. The MAC sublayer entities may determine a user priority (UP) for an MSDU based on a TID value provided with the MSDU. The QoS facility may support eight UP values. The UP values may range from 0 to 7 and may form an ordered sequence of priorities, with 1 being the lowest value, 7 the highest value, and 0 falling between 2 and 3.

An MSDU with a particular UP may belong to a traffic category with that UP. The UP may be provided with each MSDU at the medium access control service access point (MAC SAP) directly in a UP parameter. An aggregate MPDU (A-MPDU) may comprise MPDUs with different TID values.

A STA may deliver buffer status reports (BSRs) to assist an AP in allocating UL MU resources. The STA may either implicitly deliver BSRs in the QoS control field or BSR control subfield of any frame sent (e.g., transmitted) to the AP (unsolicited BSR) or explicitly deliver BSRs in a frame sent to the AP, for example, based on (e.g., in response to) a BSRP Trigger frame (solicited BSR).

The buffer status reported in the QoS control field may comprise a queue size value for a given TID. The buffer status reported in the BSR control field may comprise an ACI bitmap, delta TID, a high priority AC, and two queue sizes. A STA may report buffer status to the AP, in the QoS control field, of sent (e.g., transmitted) QoS null frames and QoS data frames and, in the BSR control subfield (if present), of sent (e.g., transmitted) QoS null frames, QoS data frames, and management frames as defined below.

The STA may report the queue size for a given TID in the queue size subfield of the QoS control field of sent (e.g., transmitted) QoS data frames or QoS null frames; the STA may set the queue size subfield to 255 to indicate an unknown/unspecified queue size for that TID. The STA may aggregate multiple QoS data frames or QoS null frames in an A-MPDU to report the queue size for different TIDs.

The STA may report buffer status in the BSR control subfield of sent (e.g., transmitted) frames if the AP has indicated its support for receiving the BSR control subfield. A High-Efficiency (HE) STA may report the queue size for a preferred AC, indicated by the ACI high subfield, in the queue size high subfield of the BSR control subfield. The STA may set the queue size high subfield to 255 to indicate an unknown/unspecified queue size for that AC. A HE STA may report the queue size for ACs indicated by the ACI bitmap subfield in the queue size all subfield of the BSR control subfield. The STA may set the queue size all subfield to 255 to indicate an unknown/unspecified BSR for those ACs.

In at least some wireless communications (e.g., a Wi-Fi standard), a triggered TXOP sharing procedure may allow an AP to allocate a portion of the time within an obtained TXOP to a STA for transmitting one or more non-trigger-based (non-TB) PPDUs. For the triggered TXOP sharing procedure, the AP may transmit a multi-user request-to-send (MU-RTS) trigger frame with a triggered TXOP sharing mode subfield set to a non-zero value. The MU-RTS trigger frame is a trigger frame for triggering CTS frame(s) from multiple users.

An MU-RTS TXS (triggered TXOP sharing) trigger (MRTT) frame may comprise a MU-RTS trigger frame with a triggered TXOP sharing mode subfield set to a non-zero value (e.g., 1 or 2). During the portion of the allocated time, the STA may transmit the one or more non-TB PPDUs to the AP. In this case, a triggered TXOP sharing mode subfield in an MU-RTS TXS trigger frame may be set to 1.

During the portion of the allocated time, the STA may transmit the one or more non-TB PPDUs to the AP or a peer STA. The peer STA may be a STA with a connection for peer-to-peer (P2P) communication or direct communication with the STA. In this case, a triggered TXOP sharing mode subfield in an MU-RTS TXS trigger frame may be set to 2.

In at least some wireless technologies, STAs may not have STR capability. Procedures according to these embodiments may thus be suitable for at least some STAs (e.g., at least some IEEE 802.11) radios in single link communication. However, with the necessity of lower latency and higher throughput in at least some P2P communications, at least some STAs (e.g., at least some generations of IEEE 802.11 radios) may be designed to support STR operation in single link communication. Using STR operation in single link communication may provide advantages such as improving synchronization of STAs and APs. STAs may use non-adjacent channels for transmitting and receiving, which may provide advantages such as reducing adjacent channel interference.

Figure 6:
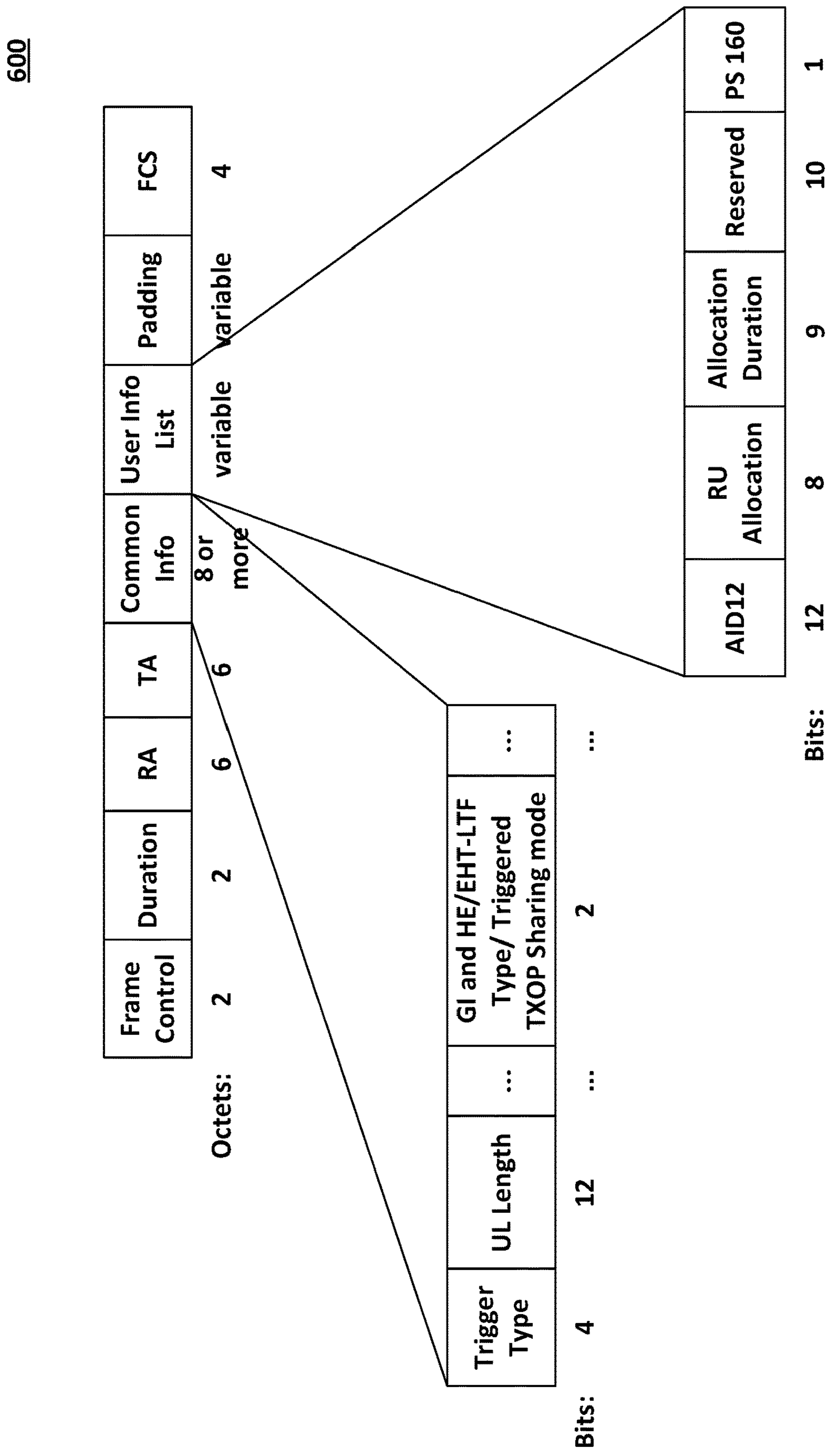
FIG. 6 shows an example of a Multi-User Request-to-Send (MU-RTS) trigger frame which may be used in a triggered Transmit Opportunity (TXOP) sharing (TXS) procedure.

FIG. 6 shows an example of a Multi-User Request-to-Send (MU-RTS) trigger frame which may be used in a triggered Transmit Opportunity (TXOP) sharing (TXS) procedure. The MU-RTS trigger frame may comprise a frame control field, a duration field, a receiver address (RA) field, a transmitter address (TA) field, a common info field, a user info list field, a padding field, and/or frame check sequence (FCS) field. The common info field may be a high-efficiency (HE) variant common info field or an extremely high throughput (EHT) variant common info field.

An EHT variant common info field may comprise one or more of the following subfields: trigger type, UL length, more TF, CS required, UL BW, GI and HE/EHT-LTF Type/Triggered TXOP sharing mode, number of HE/EHT-LTF symbols, LDPC extra symbol segment, AP Tx Power, Pre-FEC padding factor, PE disambiguity, UL spatial reuse, HE/EHT P160, special user info field flag, EHT reserved, reserved, or trigger dependent common info. The trigger type subfield may indicate an MU-RTS trigger frame.

The GI and HE/EHT-LTF Type/Triggered TXOP sharing mode subfield may include a triggered TXOP sharing mode subfield (e.g., when the trigger type subfield indicates an MU-RTS trigger frame). The triggered TXOP sharing mode subfield may be set to a non-zero value (e.g., 1 or 2).

The triggered TXOP sharing mode subfield may indicate that a STA indicated by an AID12 subfield (of the user info list field) of the MU-RTS trigger frame may transmit one or more non-TB PPDUs to the AP during the time indicated by the allocation duration subfield. In this case, the triggered TXOP sharing mode subfield may be set to 1. The triggered TXOP sharing mode subfield may indicate that a STA indicated by an AID12 subfield of the MU-RTS trigger frame may transmit one or more non-TB PPDUs to the AP or to a peer STA during the time indicated by the allocation duration subfield. The peer STA may be a STA with a connection for P2P communication or direct communication with the STA. In this case, the triggered TXOP sharing mode subfield may be set to 2.

An EHT variant user info field may comprise one or more of the following subfields: AID12, RU allocation, allocation duration, reserved, or PS160. The AID12 subfield of the MU-RTS trigger frame may indicate an association identifier (AID) of a STA that may use a time indicated by an allocation duration subfield of the MU-RTS trigger frame. The RU allocation subfield of the MU-RTS trigger frame may indicate the location and size of the RU allocated for a STA indicated by an AID12 subfield, which may be used together with the PS160 subfield. The allocation duration subfield may include an allocation duration subfield (e.g., when the triggered TXOP sharing mode subfield is set to a non-zero value). The allocation duration subfield may indicate a time allocated by an AP transmitting the MU-RTS trigger frame. The allocated time may be a portion of the time of an obtained TXOP by the AP. For example, the allocation duration subfield may indicate a first time period.

Figure 7:
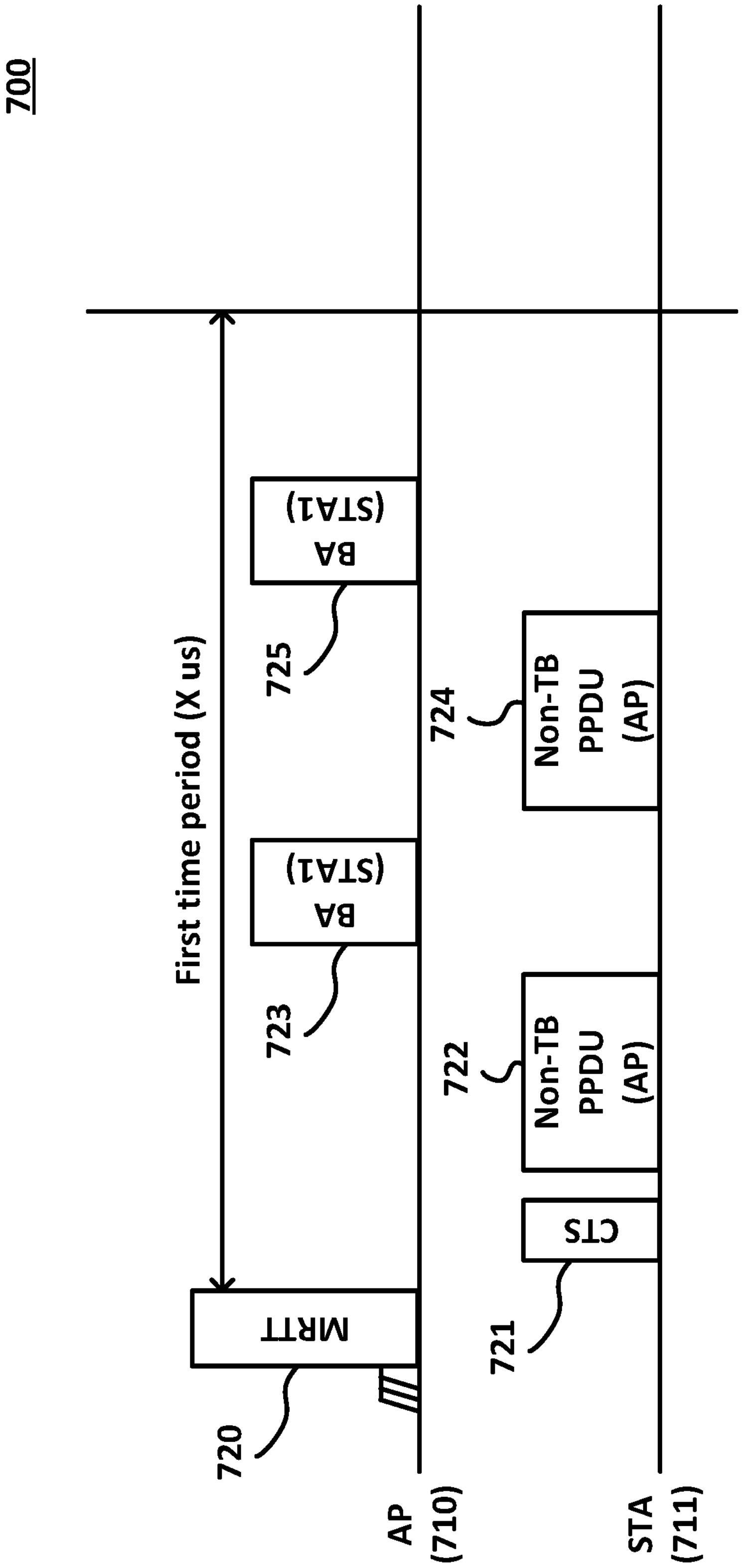
FIG. 7 shows an example of a TXS procedure.

FIG. 7 shows an example of a TXS procedure. The TXS procedure may comprise a Mode 1 procedure. As shown in FIG. 7, the procedure may begin by an AP 710 transmitting an MU-RTS TXS trigger (MRTT) frame 720 to a computing device (e.g., wireless device and/or STA). The computing device may be a STA 711. MRTT frame 720 may allocate a portion of an obtained TXOP to STA 711 and/or may indicate a triggered TXOP sharing mode equal to 1. STA 711 receiving MRTT 720 may use the allocated time duration to transmit one or more non-TB PPDUs 722, 724 to AP 710. MRTT frame 720 may comprise a triggered TXOP sharing mode subfield and/or a first time period.

The first time period may indicate a portion of a time allocated by AP 710 within an obtained TXOP. The first time period may be indicated by a subfield in MRTT frame 720. The first time period may be set to a value of X microseconds (μs). The triggered TXOP sharing mode subfield may be set to 1. The triggered TXOP sharing mode subfield set to 1 may indicate that STA 711 may transmit one or more non-TB PPDUs to AP 710 during the first time period. The one or more non-TB PPDUs may comprise a data frame, a control frame, a management frame, or an action frame. For example, MRTT frame 720 may define a first time period of X μs. A computing device such as the STA 711 may transmit non-TB PPDUs 722, 724 comprising one or more data frame to AP 710 during the first time period, preceded by a CTS frame 721. An AP such as the AP 710 may transmit one or more Block Ack (BA) frames 723, 725 in response to the one or more data frames contained in non-TB PPDUs 722, 724 received from STA 711.

Figure 8:
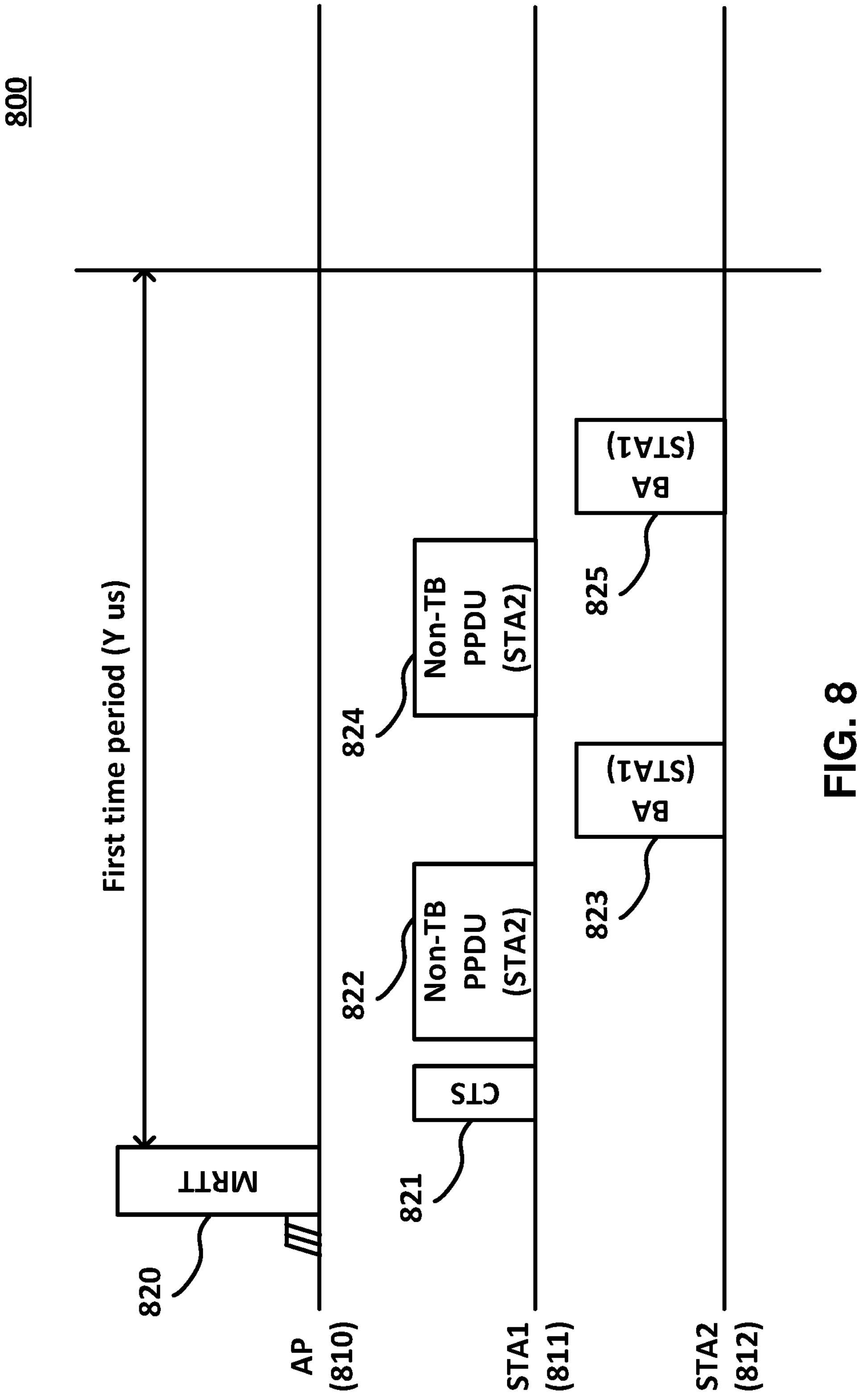
FIG. 8 shows an example of a TXS procedure.

FIG. 8 shows an example of a TXS procedure. The TXS procedure may comprise a Mode 2 procedure. The procedure may begin by an AP 810 transmitting an MRTT frame 820 to a computing device (e.g., wireless device and/or STA) such as a STA 811. An MRTT frame such as the MRTT frame 820 may allocate a portion of an obtained TXOP to STA 811 and may indicate a triggered TXOP sharing mode equal to 2. A STA such as the STA 811 receiving MRTT 820 may use the allocated time duration to transmit one or more non-TB PPDUs 822, 824 to STA2 812. An MRTT frame such as the MRTT frame 820 may comprise a triggered TXOP sharing mode subfield and/or a first time period. The first time period may indicate a portion of a time allocated by AP 810 within an obtained TXOP. The first time period may be indicated by a subfield in MRTT frame 820. The first time period may be set to a value of Y μs.

The triggered TXOP sharing mode subfield may be set to 2. The triggered TXOP sharing mode subfield set to 2 may indicate that STA 811 may transmit one or more non-TB PPDUs to AP 810 and/or to a peer computing device (e.g., wireless device and/or STA) during the first time period. The peer STA may be a STA with a connection for P2P communication and/or direct communication with STA 811. The one or more non-TB PPDUs may comprise a data frame, a control frame, a management frame, or an action frame.

For example, MRTT frame 820 may define a first time period of Y μs. STA 811 may transmit non-TB PPDUs 822, 824 comprising one or more data frame to STA 812 during the first time period, preceded by a CTS frame 821. A STA such as the STA 812 may transmit one or more Block Ack (BA) frames 823, 825 in response to the one or more data frames contained in non-TB PPDUs 822, 824 received from the STA 811.

The triggered TXOP sharing procedure may be used to allow an AP to allocate a portion of the time within an obtained TXOP to multiple STAs for transmitting PPDUs to other peer STAs simultaneously. Frequency Division Multiple Access (FDMA) may be used to allocate channels to each STA to communicate with a peer STA. In the triggered TXOP sharing procedure for multiple STAs, the AP may transmit a MRTT frame with a triggered TXOP sharing mode subfield set to 2. The trigger frame may comprise an information element indicating a direct wireless link between peer STAs, including the AID of the target STA. The direct wireless link is established according to the tunneled direct link setup (TDLS) protocol.

During the portion of the allocated time, multiple STAs may transmit one or more non-TB PPDUs to the AP or peer STAs in channels. The peer STA may be a STA with a connection for peer-to-peer (P2P) communication or direct communication with the STA. In this case, a triggered TXOP sharing mode subfield in an MU-RTS TXS trigger frame may be set to 2.

Figure 9:
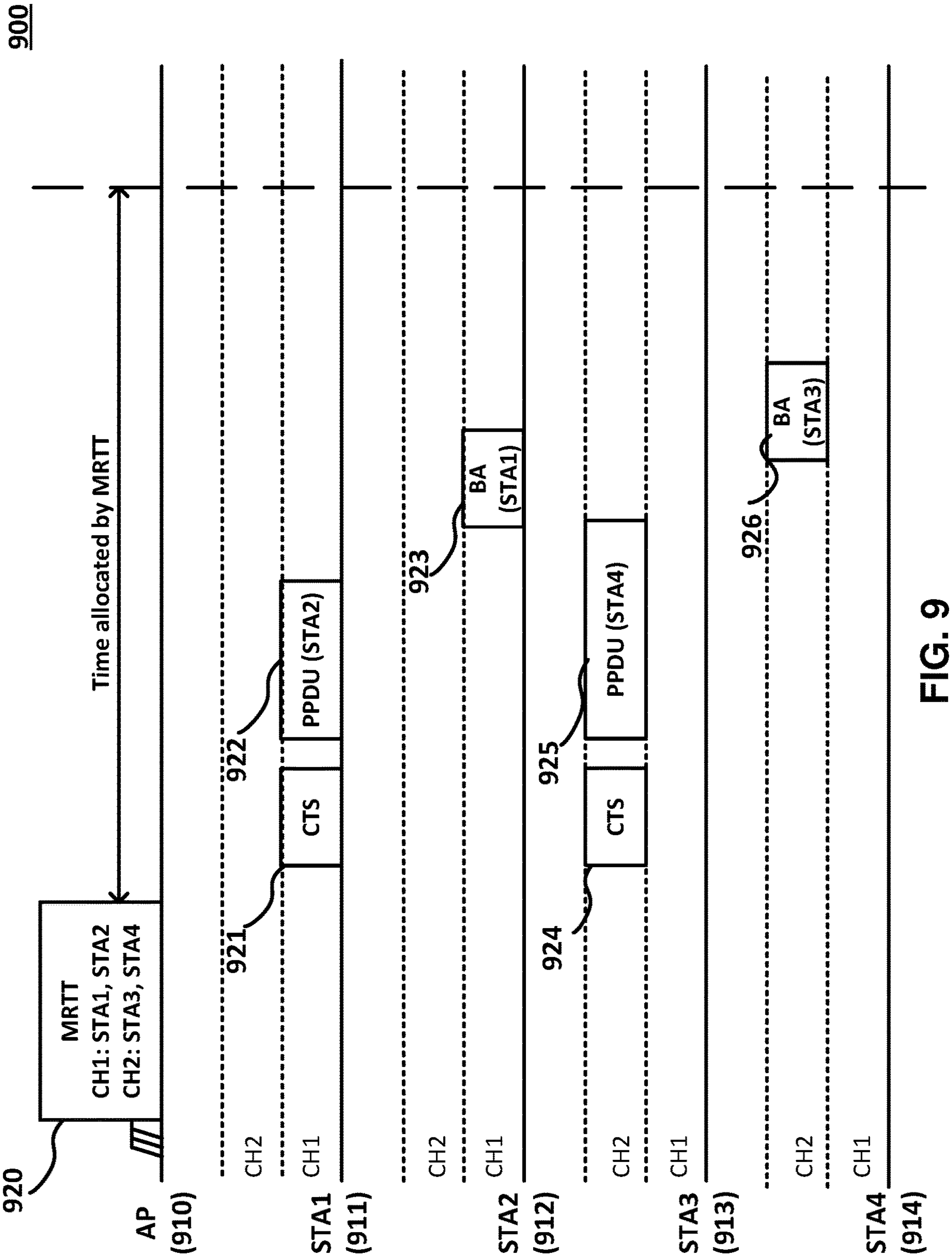
FIG. 9 shows an example of a frequency division multiple access (FDMA) based TXS procedure for supporting multiple users with dedicated peer-to-peer (P2P) links.

FIG. 9 shows an example of a frequency division multiple access (FDMA) based TXS procedure for supporting multiple users with dedicated peer-to-peer (P2P) links. FIG. 9 shows example 900, which includes an AP 910 and a plurality of computing devices (e.g., wireless devices and/or STAs) such as STAs 911, 912, 913, and 914. STAs 911, 912, 913, and 914 may be associated with AP 910. In example 900, AP 910 may transmit a MRTT frame 920 to allocate a portion of an obtained TXOP to associated STAs. MRTT frame 920 may be a broadcast frame. An MRTT frame such as the MRTT frame 920 may be designed to enable multiple STAs to communicate simultaneously in different channels during the time allocated by MRTT frame 920. The multiple STAs may each communicate with the AP or with a respective peer STA. An MRTT frame such as the MRTT frame 920 may indicate for each STA allocated by MRTT frame 920 a target STA to which the allocated STA shall transmit during the allocated time. A Target AID for an allocated STA may be provided in a User Info field for the allocated STA in MRTT frame 920. Additionally or alternatively, MRTT frame 920 may indicate for each allocated STA a respective channel to use for transmission.

In example 900, MRTT frame 920 may allocate a portion of the obtained TXOP to STAs 911 and 913 to transmit respective PPDUs to STAs 912 and 914. An MRTT frame such as the MRTT frame 920 may comprise a triggered TXOP sharing mode subfield. The triggered TXOP sharing mode may be set to 2 indicating that STAs 911 and 913 may transmit during the allocated time either to AP 910 and/or to a peer STA. Additionally, MRTT frame 920 may assign STAs 911 and 913 a first channel (CH1) and second channel (CH2), respectively, for transmission of the respective PPDUs to STAs 912 and 914.

A STA such as the STA 911 may transmit a CTS frame 921 to AP 910, followed by a PPDU 922 to STA 912, for example, based on (e.g., in response to) MRTT frame 920 having the triggered TXOP sharing mode set to 2. A STA such as the STA 911 may transmit PPDU 922 on the first channel (CH1) assigned to it in MRTT frame 910. A STA such as the STA 911 may transmit CTS frame 921 on the first channel (CH1) and/or the second channel (CH2). Similarly, a STA such as the STA 913 may transmit a CTS frame 924 to AP 910, followed by a PPDU 925 to STA 914. A STA such as the STA 913 may transmit PPDU 925 on the second channel (CH2) assigned to it in MRTT frame 910. A STA such as the STA 913 may transmit CTS frame 924 on the first channel (CH1) and/or the second channel (CH2).

PPDUs such as the PPDUs 922 and 925 transmitted respectively by STAs 911 and 913 may include a data frame, a control frame, a management frame, and/or an action frame. In example 900, PPDUs 922 and 925 include data frames. As such, STAs 912 and 914 may transmit one or more Block Ack (BA) frames 923 and 926 respectively, for example, based on (e.g., in response to) the data frames contained in PPDUs 922 and 925.

According to an FDMA based TXS procedure of at least some wireless technologies, enabling dedicated multiple P2P links in a TXS procedure requires various modifications to the MRTT frame as well as to AP/STA behavior as defined in the current IEEE 802.11 standard. First, the MRTT frame must include additional bits for the AP to signal the target STA for each allocated STA. In addition, a STA allocated with the modified MRTT frame would only be able to transmit to the target STA indicated in the MRTT frame. This limits the flexibility of the allocated STA to transmit to other peer STAs to which it may have buffered traffic (e.g., latency sensitive traffic) for transmission. Furthermore, the AP must have knowledge of the peer STAs of STAs allocated by the MRTT frame. This would require that this information be communicated to the AP by the STAs, increasing signaling overhead.

Another shortcoming of FDMA based TXS procedures in at least some wireless technologies is that the modified MRTT frame does not support P2P transmissions to different peer STAs by an allocated STA during an allocated time portion of a TXOP. This deficiency is further described below with respect to FIG. 10, which illustrates another example 1000 of the FDMA based TXS procedure.

Figure 10:
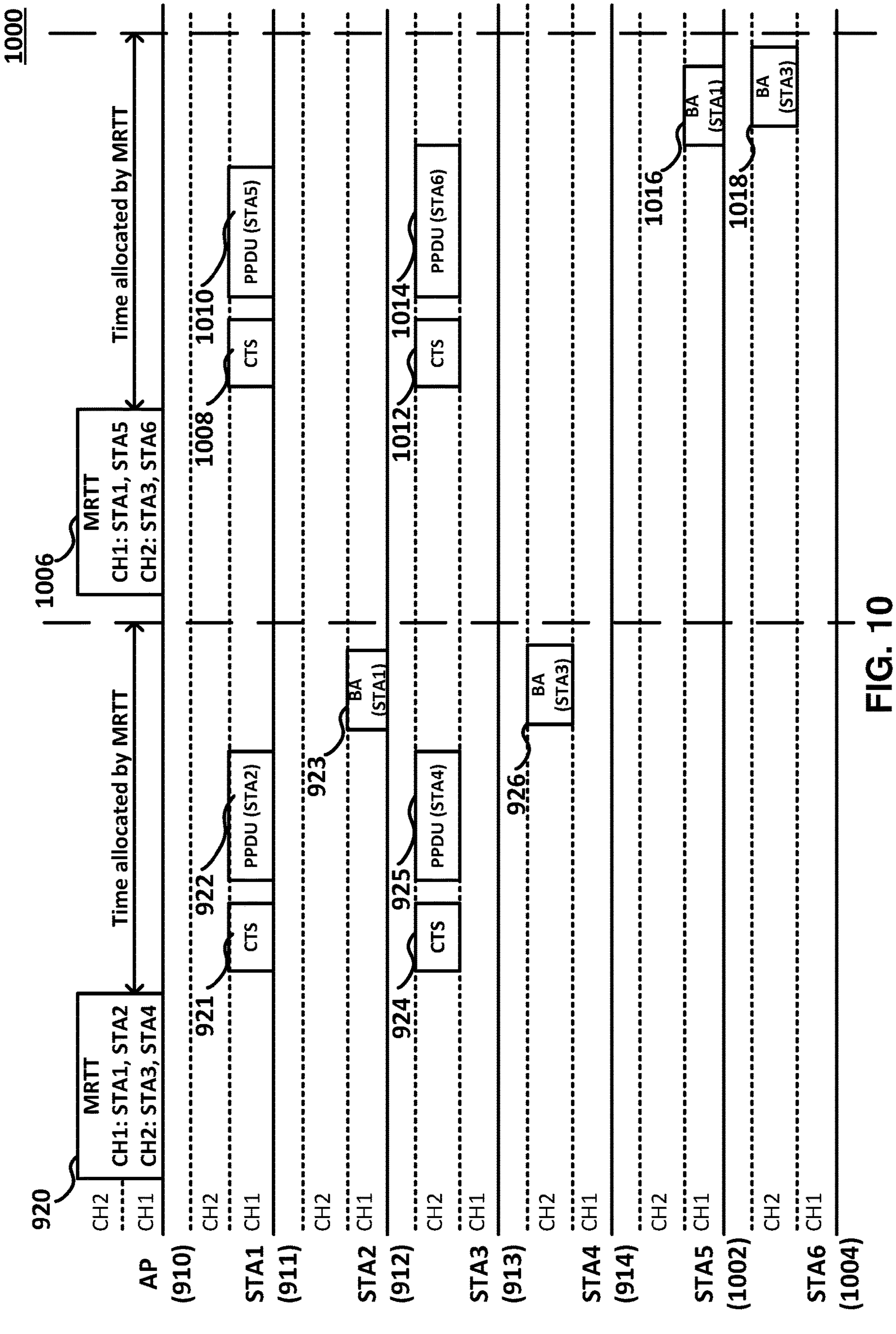
FIG. 10 shows an example of an FDMA-based TXS procedure.

FIG. 10 shows an example of an FDMA-based TXS procedure. FIG. 10 shows an example 1000, which includes AP 910 and computing devices (e.g., wireless devices and/or STAs) such as STAs 911-914 and 1002-1004. Example 1000 may begin by AP 910 transmitting MRTT frame 920 described above (e.g., such as described with respect to FIG. 9). An MRTT frame such as the MRTT frame 920 may allocate a portion of an obtained TXOP to STAs 911 and 913 to transmit respective PPDUs to STAs 912 and 914. Additionally or alternatively, MRTT frame 920 may assign STAs 911 and 913 a first channel (CH1) and second channel (CH2), respectively, for transmission of the respective PPDUs to STAs 912 and 914.

STA 911 may transmit CTS frame 921 to AP 910, followed by PPDU 922 to STA 912 on the first channel (CH1), for example, based on (e.g., in response to) MRTT frame 920. Similarly, STA 913 may transmit CTS frame 924 to AP 910, followed by PPDU 925 to STA 914 on the second channel (CH2). STAs 912 and 914 may transmit one or more Block Ack (BA) frames 923 and 926 respectively, for example, based on (e.g., in response to) the data frames contained in PPDUs 922 and 925.

For example, such as described with respect to FIG. 9, MRTT frame 920 may not support P2P transmissions to different peer STAs by an allocated computing device (e.g., wireless device and/or STA) during an allocated time portion of a TXOP. As such, in order for STAs 911 and 913 to be able to transmit PPDUs to different peer STAs than STAs 912 and 914, AP 910 must transmit a further MRTT frame 1006 allocating a portion of another obtained TXOP to STAs 911 and 913 and indicating new target STAs for STAs 911 and 913.

An MRTT frame such as the MRTT frame 1006 may indicate STAs 1002 and 1004 as respective target STAs for STA 911 and 913. In addition, MRTT frame 1006 may assign STAs 911 and 913 a first channel (CH1) and second channel (CH2), respectively, for transmission. A STA such as the STA 911 may transmit a CTS frame 1008 to AP 910, followed by a PPDU 1010 to STA 1002. Similarly, STA 913 may transmit a CTS frame 1012 to AP 910, followed by a PPDU 1014 to STA 1004. STAs such as the STAs 1002 and 1004 may transmit one or more Block Ack (BA) frames 1016 and 1018, respectively, for example, based on (e.g., in response to) the data frames contained in PPDUs 1010 and 1014.

The FDMA based TXS procedure in at least some wireless technologies requires the AP to send a further MRTT frame to enable an allocated computing device (e.g., wireless device and/or STA) to transmit to different peer computing devices (e.g., wireless devices and/or STAs). This increases overhead at both the AP and the STA side. One solution to mitigate this problem may include improving scheduling flexibility by eliminating the target STA indications from the MRTT frame and by allowing an allocated STA to choose by itself its target STA(s) for the allocated time. An example 1100 illustrating such modified operation of the FDMA based TXS procedure is provided in FIG. 11.

Figure 11:
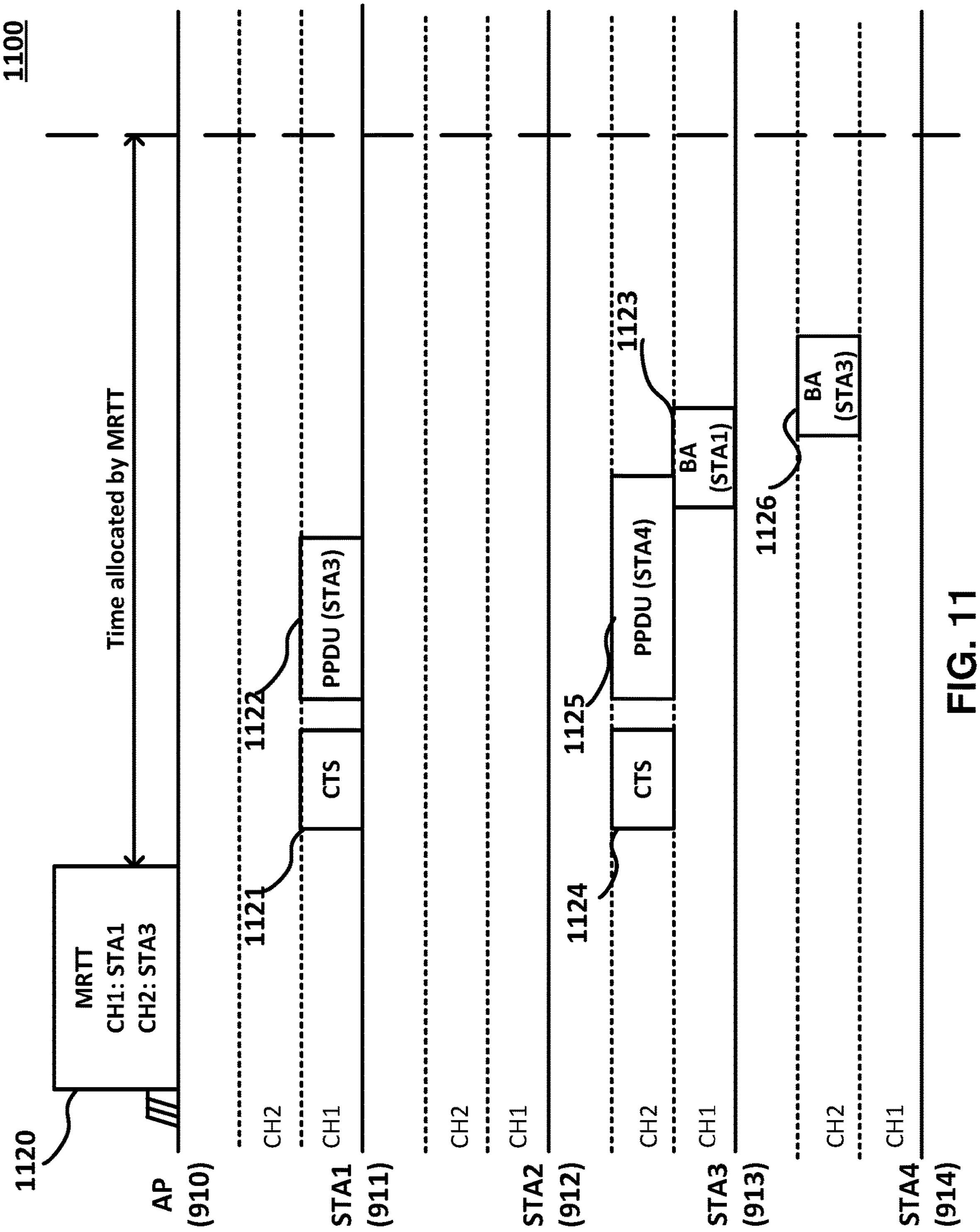
FIG. 11 shows an example of a modified operation of an FDMA-based TXS procedure.

FIG. 11 shows an example of a modified operation of an FDMA-based TXS procedure. FIG. 11 shows an example 1100, which includes AP 910 and computing devices (e.g., wireless devices and/or STAs) such as STAs 911-914. Example 1100 may begin by AP 910 transmitting an MRTT frame 1120. An MRTT frame such as the MRTT frame 920 may comprise a triggered TXOP sharing mode subfield set to 2. An MRTT frame such as the MRTT frame 1120 may allocate a portion of an obtained TXOP to STAs 911 and 913. Additionally or alternatively, MRTT frame 1120 may assign STAs 911 and 913 a first channel (CH1) and second channel (CH2), respectively, for transmission during the allocated portion of the TXOP. An MRTT frame such as the MRTT frame 1120 may not include target STAs to which allocated STAs 911 and 913 shall transmit during the allocated time. A STA such as the STA 911 may choose STA 913 as a target STA for a first transmission during the allocated time. Similarly, STA 913 may choose STA 914 as a target STA for a first transmission during the allocated time.

Subsequently, STA 911 may transmit a CTS frame 1121 to AP 910, followed by a PPDU 1122 to STA 913 on the first channel (CH1). Similarly, STA 913 may transmit a CTS frame 1124 to AP 910, followed by a PPDU 1125 to STA 914 on the second channel (CH2). STAs such as the STAs 913 and 914 may transmit one or more Block Ack (BA) frames 1123 and 1126 respectively based on (e.g., in response to) the data frames contained in PPDUs 1122 and 1125. As MRTT frame 1120 may not indicate the target STAs for the allocated time, STAs 911 and 913 may perform subsequent transmissions to other peer STAs, which may be different than STAs 913 and 914, during any remaining time of the allocated time of the TXOP, without requiring a further MRTT frame from the AP.

This flexibility may require simultaneous transmit and receive (STR) capability at the STAs. As shown in example 1100, in order to transmit PDDU 1125 to STA 914 and receive PPDU 1122 from STA 911, STA 913 may have to transmit and receive, simultaneously, in the first and second channels (CH1 and CH2). Currently, such STR capability is not supported in IEEE 802.11 radios configured for single link communication. As described herein, this may be addressed by enabling computing devices (e.g., wireless devices and/or STAs) allocated by an MRTT frame to avoid simultaneous transmit/receive situations arising in response to the MRTT frame. Target STA constraints are eliminated from the MRTT frame, allowing an allocated STA to choose its target STA(s) for the allocated time. As such, transmissions from the allocated STA to different peer STAs may be performed during the allocated time based on a single MRTT frame transmitted from the AP. This may reduce signaling overhead for the FDMA based TXS procedure.

Figure 12:
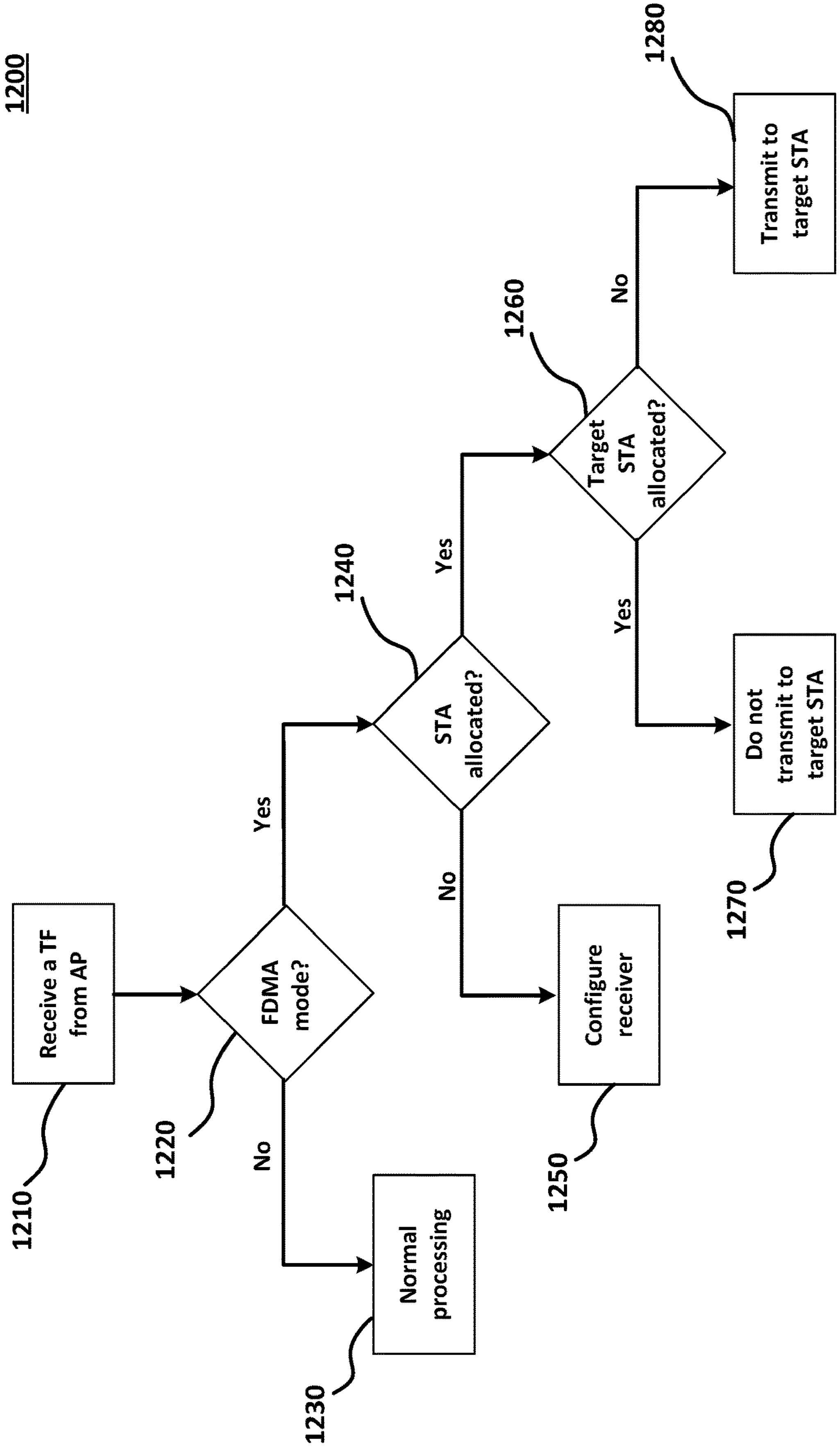
FIG. 12 shows an example process.

FIG. 12 shows an example process. An example process 1200 may be performed by a first computing device (e.g., wireless device and/or STA). The process 1200 may start in step 1210, which includes receiving a trigger frame from an AP. The AP may be an AP with which the STA is associated. The trigger frame may be a frame that allocates a time portion of a TXOP obtained by the AP to one or more STAs associated with the AP. The trigger frame may indicate a sharing mode for the allocated time portion of the TXOP. The sharing mode indicated in the trigger frame permits an allocated STA, such as the first STA, to transmit to the AP or to another STA using its indicated frequency allocation (TXS mode 2).

The trigger frame may indicate a plurality of frequency allocations for a plurality of computing devices (e.g., wireless devices and/or STAs). The plurality of frequency allocations may correspond to a respective plurality of channels (e.g., 20 MHz channels) supported by the AP. The plurality of channels may be orthogonal (non-overlapping). The plurality of frequency allocations may comprise a first frequency allocation for the first STA performing process 1200.

The trigger frame may be an MRTT frame. The trigger frame, which may be an MRTT frame, may include a Common Info field that indicates the sharing mode. The trigger frame, which may be an MRTT frame, may include a first User Info field comprising the first frequency allocation for the first STA. The first User Info field may comprise an RU Allocation subfield comprising the first frequency allocation for the first STA. The first User Info field may also comprise an Allocation Duration subfield comprising a time period for transmitting during the TXOP.

Next, the process 1200 may proceed to step 1220, which includes determining whether FDMA mode is enabled in the trigger frame. For example, step 1220 may include checking the trigger frame for an indication of FDMA mode use. Step 1220 may include checking a Common Info field of the trigger frame, which may be an MRTT frame, for the indication of FDMA mode use. The Common Info field may comprise an FDMA mode subfield comprising the indication of FDMA mode use. The Common Info field may comprise a TXS Mode subfield, the TXS Mode subfield providing both the sharing mode and the indication of FDMA mode use. The trigger frame, which may be an MRTT frame, may include a first User Info field for the first STA that includes an indication of FDMA mode use for the first STA.

Prior to the process 1200, the first STA may transmit a frame (e.g., an association request frame, a re-association request frame, or a probe request frame) to the AP comprising an indication of FDMA support. The indication of FDMA support may inform the AP whether the first STA supports FDMA operations, including FDMA based TXS. The frame may include a MAC Capabilities Information field comprising an indication of FDMA support bit. The AP may use the indication of FDMA support from the first STA to determine whether to include the first STA in FDMA based operations, including FDMA based TXS. In the foregoing, it may be supposed that the first STA supports FDMA mode and has signaled a positive indication of FDMA support to the AP prior to the process 1200.

If the answer is no in step 1220 (i.e., FDMA mode is disabled in the trigger frame), the process 1200 may proceed to step 1230, in which the first STA may implement normal processing of the trigger frame in accordance with current IEEE 802.11 rules for STAs. Otherwise, process 1200 may transition to step 1240, which may include determining whether the first STA is allocated by the trigger frame. Step 1240 may include reading a plurality of User Info fields of the trigger frame, which may be an MRTT frame, to determine STAs allocated by the trigger frame. Step 1240 may include reading all of the User Info fields of the trigger frame. The first STA may determine that it is allocated by the trigger frame based on reading a User Info field having an AID12 subfield corresponding to an AID of the first STA.

If, for example, the first STA is not allocated by the trigger frame, the process 1200 may proceed to step 1250, which may include configuring a receiver of the first STA to monitor a plurality of frequency channels supported by the FDMA mode. As the first STA is not allocated by the trigger frame, the first STA may be a target STA of a plurality of peer STAs during the FDMA based TXS procedure. If, for example, the first STA is allocated by the trigger frame in step 1240, the process 1200 may proceed to step 1260, which may include determining whether a target STA of the first STA is allocated by the trigger frame. In an embodiment, the target STA may be selected from a set of candidate STAs for transmission. The target STA may be a second STA that is added to the set of candidate STAs based on the first STA having buffered traffic for transmission to the second STA. In an embodiment, step 1260 may include checking whether the trigger frame includes a User Info field for the target STA.

If the answer is yes in step 1260 (i.e., the target STA is allocated in the trigger frame), the process 1200 may proceed to step 1270, in which the first STA may not transmit to the target (second) STA. The second STA may be removed from the set of candidate STAs for transmission based on the second STA belonging to the plurality of STAs allocated by the trigger frame. If, for example, the target STA is removed from the set of candidate STAs for transmission, then the process 1200 may return to step 1260, in which another target STA, if any, may be selected from the set of candidate STAs for transmission and the same processing repeated with respect to the other target STA.

If, for example, the target (second) STA is not allocated by the trigger frame in step 1260, the process 1200 may proceed to step 1280, in which the first STA may proceed to transmit to the target (second) STA during the allocated time portion of the TXOP. An Allocation Duration subfield of the User Info field allocating the first STA may include a time period for the first STA to transmit a frame to the target STA. In an embodiment, the first STA may transmit a Clear to Send (CTS) frame to the AP prior to transmitting the frame to the target STA. The first STA may receive a BA frame from the target STA in response to the transmitted frame. The first STA may transmit a further frame, via the first frequency allocation, to a third STA after receiving the BA frame from the second STA, on condition that the third STA does not belong to the plurality of STAs allocated by the first frame.

Figure 13:
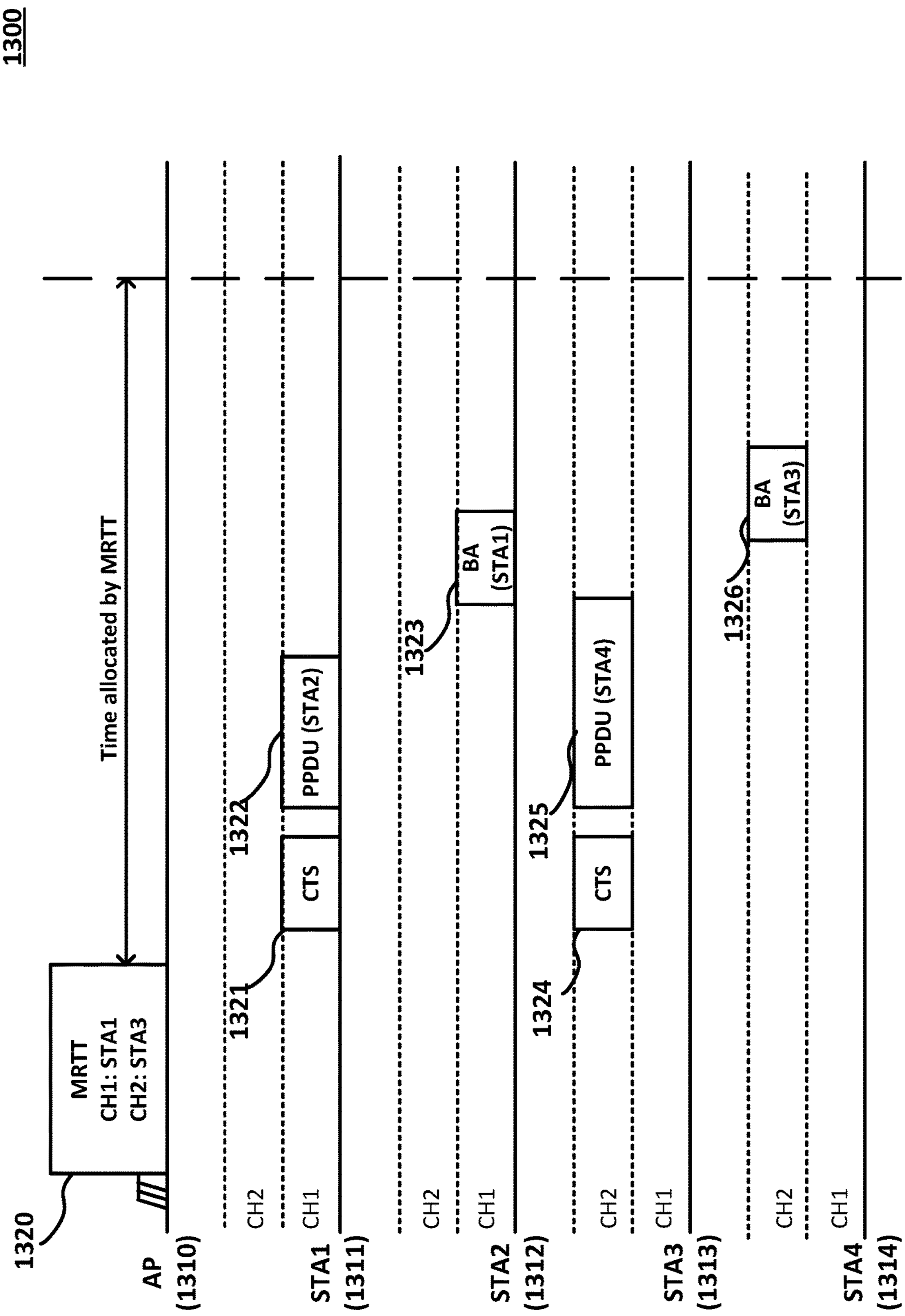
FIG. 13 shows an example of an FDMA-based TXS procedure.

FIG. 13 shows an example of an FDMA-based TXS procedure. FIG. 13 shows an example 1300, which includes AP 1310 and computing devices (e.g., wireless devices and/or STAs) such as STAs 1311-1314. STAs 1311-1314 may be associated with AP 1310. An AP such as the AP 1310 and STAs such as the STAs 1311-1314 may support an FDMA mode according to which AP 1310 and STAs 1311-1314 may operate over multiple frequency channels (e.g., 20 MHz channels).

Example 1300 may begin by AP 1310 transmitting an MRTT frame 1320. An MRTT frame such as the MRTT frame 1320 may comprise a triggered TXOP sharing mode subfield set to 2. An MRTT frame such as the MRTT frame 1320 may allocate a portion of an obtained TXOP to STAs 1311 and 1313. An MRTT frame such as the MRTT frame 1320 may assign STAs 1311 and 1313 a first channel (CH1) and second channel (CH2), respectively, for transmission during the allocated time portion of the TXOP. An MRTT frame such as the MRTT frame 1320 may not include target STAs to which allocated STAs 1311 and 1313 shall transmit during the allocated time (e.g., such as described with respect to FIG. 11). A STA such as the STA 1311 may choose STA 1312 as a target STA for a first transmission during the allocated time. Similarly, a STA such as the STA 1313 may choose STA 1314 as a target STA for a first transmission during the allocated time. The selection of a target STA by a transmitting STA may be as described herein with reference to process 1200. Accordingly, a STA such as the STA 1311 may not choose STA 1313 as a target STA because STA 1313 may also be allocated by MRTT frame 1320. Similarly, STA 1313 may not choose STA 1311 as a target STA because STA 1311 may also be allocated by MRTT frame 1320.

After choosing the target STAs, STA 1311 may transmit a CTS frame 1321 to AP 1310, followed by a PPDU 1322 to STA 1312 on the first channel (CH1). Similarly, STA 1313 may transmit a CTS frame 1324 to AP 1310, followed by a PPDU 1325 to STA 1314 on the second channel (CH2). STAs such as the STAs 1312 and 1314 may transmit one or more Block Ack (BA) frames 1323 and 1326 respectively in response to the data frames contained in PPDUs 1322 and 1325.

As MRTT frame 1320 may not indicate the target STAs for the allocated time, and STAs 1311-1314 that receive the MRTT frame perform process 1200, STAs 1311 and 1313 may perform subsequent transmissions to other peer STAs, which may be different than STAs 1311 and 1313, or the AP, during any remaining time of the allocated time of the TXOP. Accordingly, simultaneous transmit and receive (STR) operation at the STAs may be avoided. Having a triggered TXOP sharing mode subfield in an MU-RTS TXS trigger frame may be set to 2, the STA may transmit one or more PPDUs to the AP or a peer STA.

Figure 14:
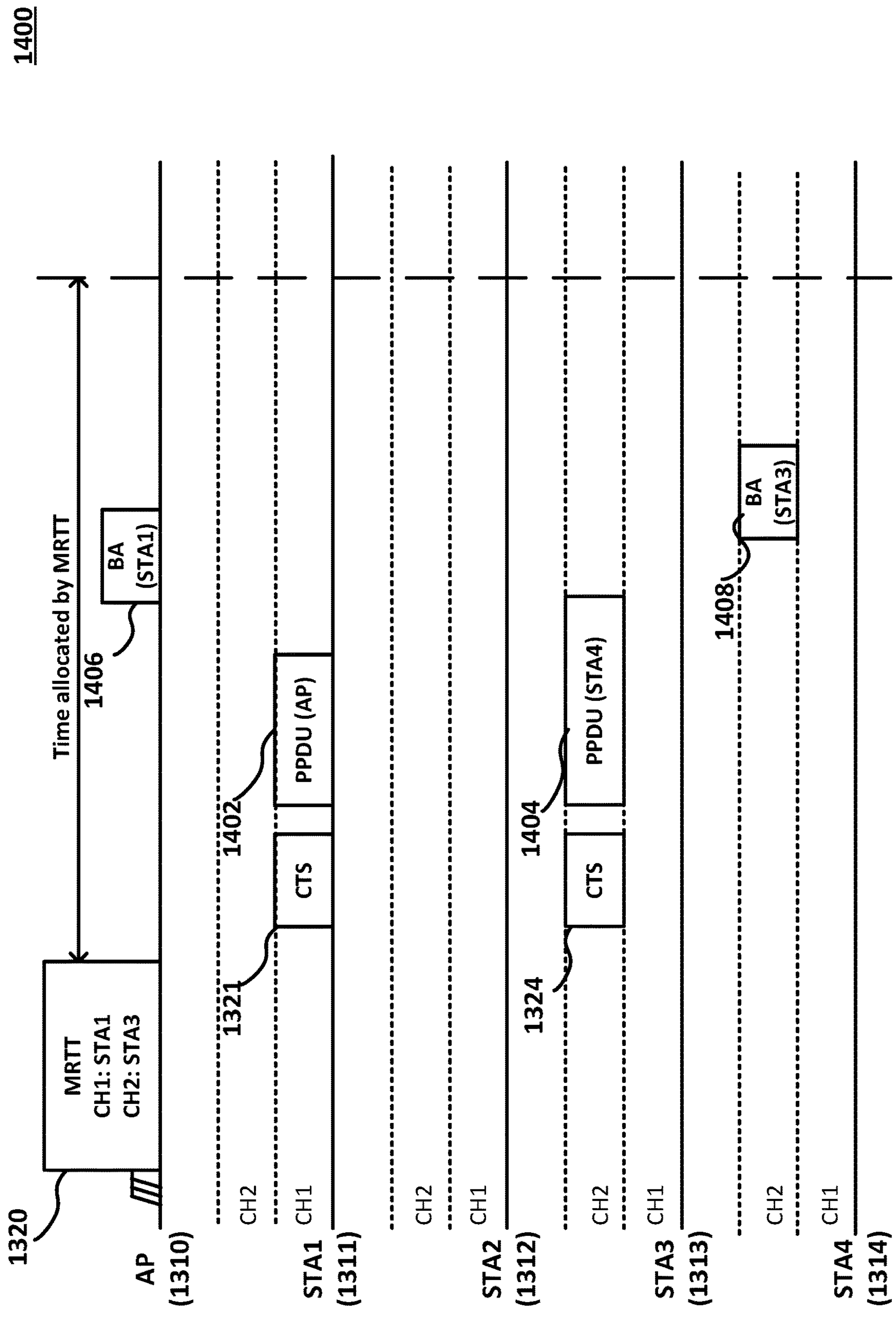
FIG. 14 shows an example of an FDMA-based TXS procedure.

FIG. 14 shows an example of an FDMA-based TXS procedure. FIG. 14 shows an example 1400, which includes AP 1310 and computing devices (e.g., wireless devices and/or STAs) such as STAs 1311-1314. STAs 1311-1314 may be associated with AP 1310. An AP such as the AP 1310 and computing devices such as the STAs 1311-1314 may support an FDMA mode according to which AP 1310 and STAs 1311-1314 may operate over multiple frequency channels (e.g., 20 MHz channels).

Example 1400 may begin by AP 1310 transmitting MRTT frame 1320 described above (e.g., such as described with respect to FIG. 13). An MRTT frame such as the MRTT frame 1320 may comprise a triggered TXOP sharing mode subfield set to 2. MRTT frame 1320 may allocate a portion of an obtained TXOP to STAs 1311 and 1313. Additionally, MRTT frame 1320 may assign STAs 1311 and 1313 a first channel (CH1) and second channel (CH2), respectively, for transmission during the allocated portion of the TXOP. An MRTT frame such as the MRTT frame 1320 may not include target STAs to which allocated STAs 1311 and 1313 shall transmit during the allocated time (e.g., such as described with respect to FIG. 13).

A STA such as the STA 1311 may choose AP 1310 for a first transmission during the allocated time. A STA such as the STA 1313 may choose STA 1314 as a target STA for a first transmission during the allocated time. The selection of a target STA by a transmitting STA may be as described herein with reference to process 1200. Accordingly, STA 1313 may not choose STA 1311 as a target STA because STA 1311 may also be allocated by MRTT frame 1320.

After choosing the AP as a target for the first transmission during the allocated time, STA 1311 may transmit a CTS frame 1321 to AP 1310, followed by a PPDU 1402 to AP 1310 on the first channel (CH1). Similarly, after choosing STA 1314 as a target STA for the first transmission during the allocated time, STA 1313 may transmit a CTS frame 1324 to AP 1310, followed by a PPDU 1404 to STA 1314 on the second channel (CH2). An AP such as the AP 1310 and a STA such as the STA 1314 may transmit one or more Block Ack (BA) frames 1406 and 1408 respectively in response to the data frames contained in PPDUs 1402 and 1404.

Figure 15:
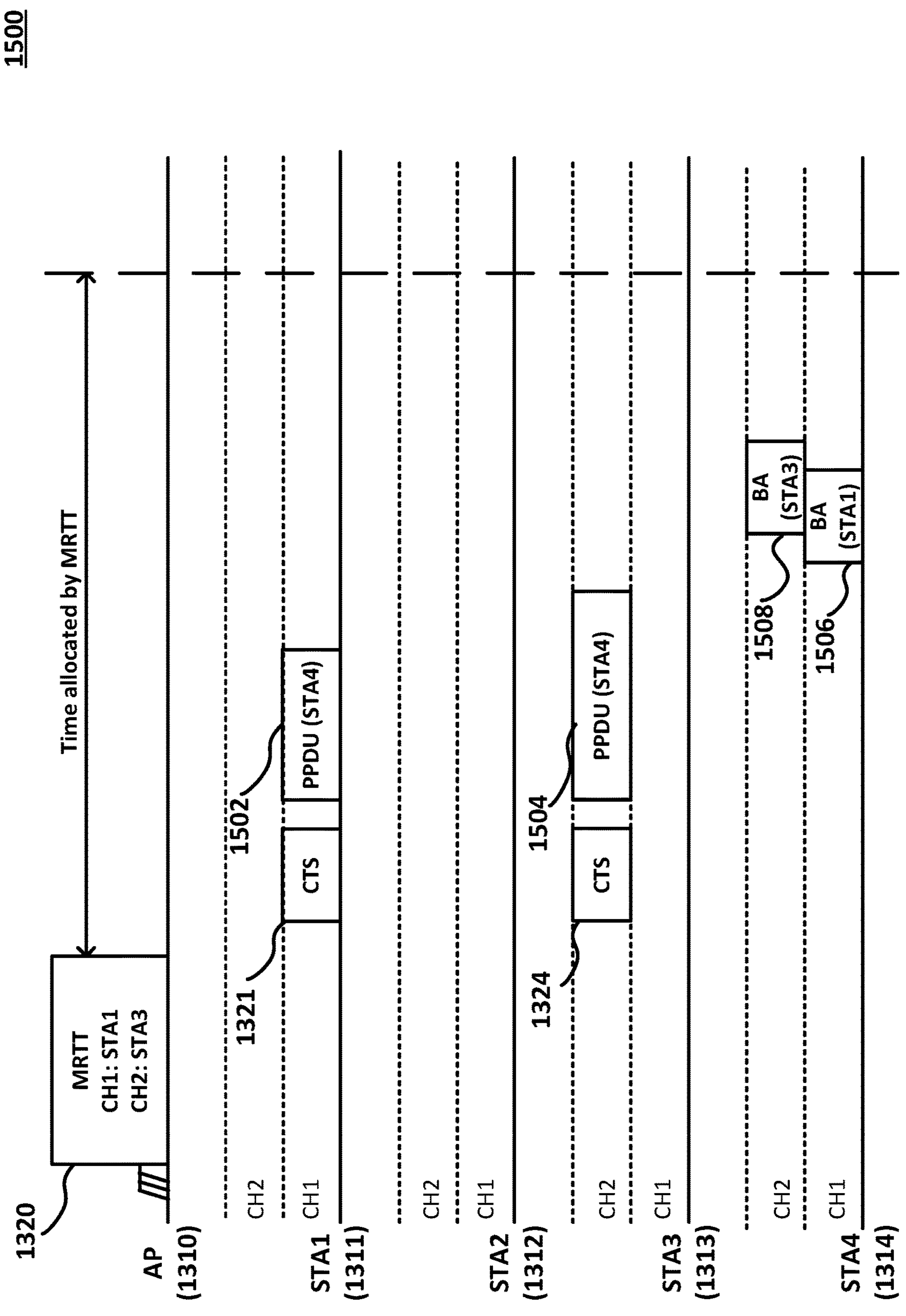
FIG. 15 shows an example of an FDMA-based TXS procedure.

FIG. 15 shows an example of an FDMA-based TXS procedure. FIG. 15 shows an example 1500 includes AP 1310 and computing devices (e.g., wireless devices and/or STAs) such as STAs 1311-1314. Computing devices such as the STAs 1311-1314 may be associated with AP 1310. An AP such as the AP 1310 and STAs such as the STAs 1311-1314 may support an FDMA mode according to which AP 1310 and STAs 1311-1314 may operate over multiple frequency channels (e.g., 20 MHz channels).

Example 1500 may begin by AP 1310 transmitting MRTT frame 1320 (e.g., such as described with respect to FIG. 13). An MRTT frame such as the MRTT frame 1320 may comprise a triggered TXOP sharing mode subfield set to 2. An MRTT frame such as the MRTT frame 1320 may allocate a portion of an obtained TXOP to STAs 1311 and 1313. Additionally, MRTT frame 1320 may assign STAs 1311 and 1313 a first channel (CH1) and second channel (CH2), respectively, for transmission during the allocated portion of the TXOP. An MRTT frame such as the MRTT frame 1320 may not include target STAs to which allocated STAs 1311 and 1313 shall transmit during the allocated time (e.g., such as described with respect to FIG. 13).

A computing device (e.g., wireless device and/or STA) such as the STA 1311 may choose STA 1314 as a target STA for a first transmission during the allocated time. Similarly, STA 1313 may also choose STA 1314 as a target STA for a first transmission during the allocated time. The selection of a target STA by a transmitting STA may be as described above with reference to process 1200. Accordingly, STA 1311 may not choose STA 1313 as a target STA because STA 1313 is also allocated by MRTT frame 1320. Similarly, STA 1313 may not choose STA 1311 as a target STA because STA 1311 is also allocated by MRTT frame 1320. As STA 1314 is not allocated by MRTT frame 1320, and assuming that both STAs 1311 and 1313 have buffered traffic to STA 1314, STA 1314 may be the target STA for multiple transmissions, on multiple frequency channels, during the allocated time.

A computing device (e.g., wireless device and/or STA) such as the STA 1311 may transmit CTS frame 1321 to AP 1310, followed by a PPDU 1502 to STA 1314 on the first channel (CH1), for example, based on (e.g., after or in response to) choosing STA 1314 as a target STA. Similarly, STA 1313 may transmit a CTS frame 1324 to AP 1310, followed by a PPDU 1504 to STA 1314 on the second channel (CH2). STA 1314 may transmit one or more Block Ack (BA) frames 1506 and 1508 respectively in response to the data frames contained in PPDUs 1502 and 1504.

A computing device (e.g., wireless device and/or STA) such as STA 1314 may require multiple RF receiver chains in order to receive PPDUs 1502 and 1504 simultaneously on the first and second frequency channels respectively. A STA such as STA 1314 may not require STR capability as the operation of example 1500 may not have STA 1314 transmitting and receiving at the same time.

Figure 16:
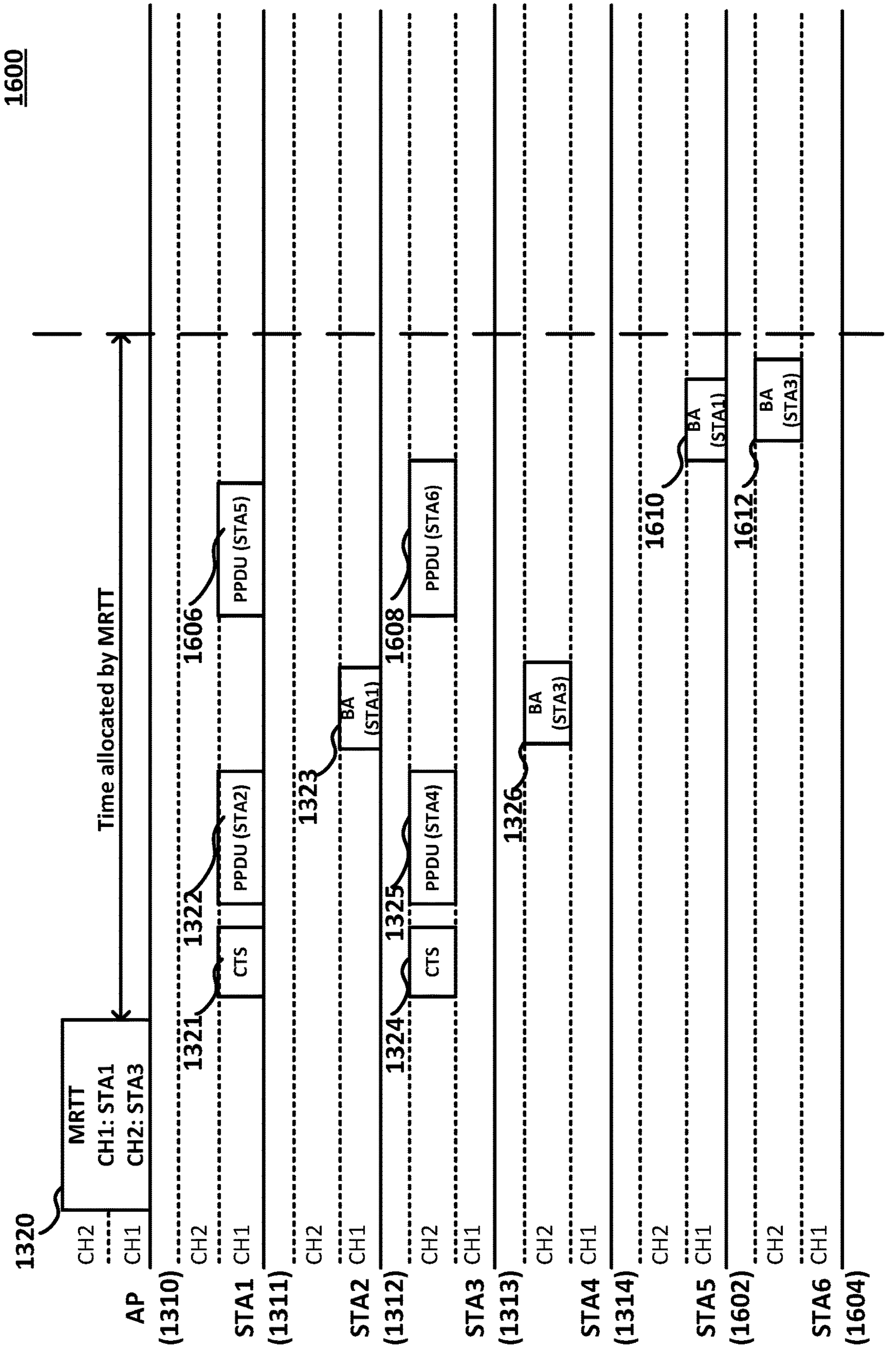
FIG. 16 shows an example of an FDMA-based TXS procedure.

FIG. 16 shows an example of an FDMA-based TXS procedure. FIG. 16 shows an example 1600, which includes AP 1310 and computing devices (e.g., wireless devices and/or STAs) such as STAs 1311-1314 and 1602-1604. STAs 1311-1314 and 1602-1604 may be associated with AP 1310. AP 1310 and STAs 1311-1314 and 1602-1604 may support an FDMA mode according to which AP 1310 and STAs 1311-1314 and 1602-1604 may operate over multiple frequency channels (e.g., 20 MHz channels).

Example 1600 may begin by AP 1310 transmitting MRTT frame 1320 described above (e.g., such as described with respect to FIG. 13). MRTT frame 1320 may comprise a triggered TXOP sharing mode subfield set to 2. An MRTT frame such as the MRTT frame 1320 may allocate a portion of an obtained TXOP to STAs 1311 and 1313. Additionally, MRTT frame 1320 may assign STAs 1311 and 1313 a first channel (CH1) and second channel (CH2), respectively, for transmission during the allocated portion of the TXOP. An MRTT frame such as the MRTT frame 1320 may not include target STAs to which allocated STAs 1311 and 1313 shall transmit during the allocated time (e.g., such as described with respect to FIG. 11). A STA such as STA 1311 may choose STA 1312 as a target STA for a first transmission during the allocated time. Similarly, STA 1313 may choose STA 1314 as a target STA for a first transmission during the allocated time. STA 1311 may transmit a CTS frame 1321 to AP 1310, followed by a PPDU 1322 to STA 1312 on the first channel (CH1), for example, based on (e.g., after or in response to) choosing STA 1312 as a target STA. STA 1313 transmits a CTS frame 1324 to AP 1310, followed by a PPDU 1325 to STA 1314 on the second channel (CH2), for example, based on (e.g., after or in response to) choosing STA 1314 as a target STA. STAs 1312 and 1314 may transmit one or more Block Ack (BA) frames 1323 and 1326 respectively in response to the data frames contained in PPDUs 1322 and 1325.

STAs 1311 and 1313 may choose STAs 1602 and 1604 respectively as target STAs for a second transmission during the allocated time, for example, based on (e.g., after or in response to) receiving BA frames 1323 and 1326 respectively, and assuming that time remains in the allocated portion of the TXOP. As such, STA 1311 may transmit a PPDU 1606 to STA 1602 on the first channel (CH1) and STA 1313 may transmit a PPDU 1608 to STA 1604 on the second channel (CH2). STAs such as the STAs 1602 and 1604 may transmit one or more Block Ack (BA) frames 1610 and 1612 respectively in response to the data frames contained in PPDUs 1606 and 1608.

An MRTT frame such as the MRTT frame 1320 may be used to enable multiple P2P transmissions to different peer STAs during an allocated time portion of a TXOP. This may be advantageous compared to MRTT frame 920 used in the FDMA based TXS procedure, in which target STAs may be specified for an entire allocated time portion and a further MRTT frame 1006 may be required to be transmitted by the AP in order to enable transmission to different peer STAs in a subsequent allocated time.

Figure 17:
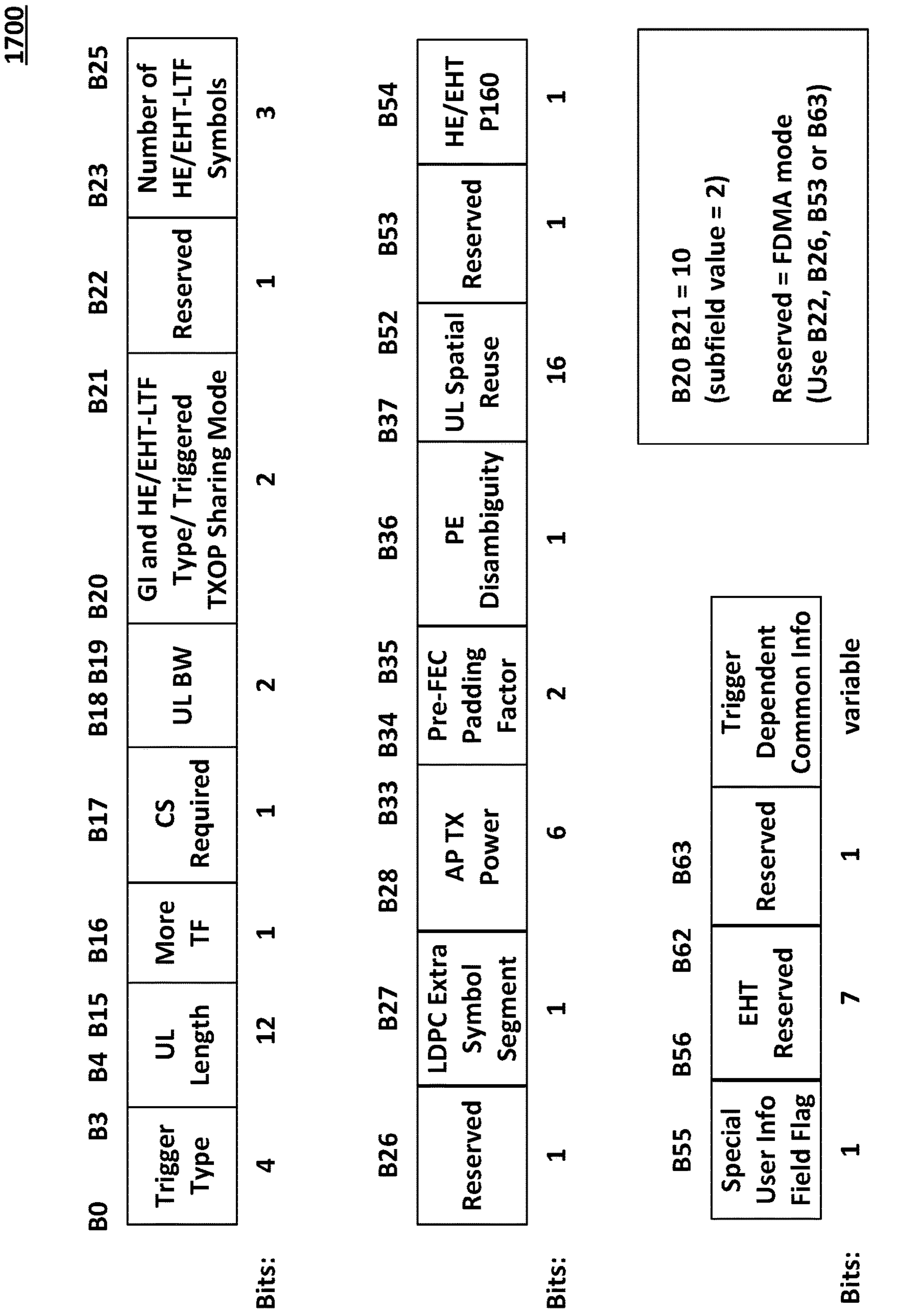
FIG. 17 shows an example of a Common Info field of an MRTT frame which may be used in an FDMA-based TXS procedure.

FIG. 17 shows an example of a Common Info field of an MRTT frame which may be used in an FDMA-based TXS procedure. The MRTT frame may be transmitted by an AP to associated computing devices (e.g., wireless devices and/or STAs). Example Common Info field 1700 may include a triggered TXOP sharing mode subfield (bits 20 and 21). Triggered TXOP sharing mode subfield may indicate a TXS operation mode of the associated STAs. The triggered TXOP sharing mode subfield may be set to 2 (bit 20 to 1 and bit 21 to 0) to indicate a triggered TXOP sharing mode 2. According to the triggered TXOP sharing mode 2, a STA may transmit either to the AP or to another STA during an allocated time portion of a TXOP.

A Common Info field such as the Common Info field 1700 may include a FDMA mode use subfield. The FDMA mode use subfield may indicate whether FDMA based TXS operation is in use. The FDMA mode use subfield may be located in bit 63 of Common Info field 1700, for example, if Common Info field 1700 is an HE variant Common Info field. The FDMA mode use subfield may be located in one of bit 22, bit 26, bit 53, or bit 63 of Common Info field 1700, for example, if Common Info field 1700 is an EHT variant Common Info field (e.g., such as shown in FIG. 17).

FIG. 18 shows an example of a Common Info field of an MRTT frame which may be used in an FDMA-based TXS procedure. The MRTT may be transmitted by an AP to associated computing devices (e.g., wireless devices and/or STAs). A Common Info field such as the Common Info field 1800 may include a Triggered TXOP sharing mode subfield (bits 20 and 21). The Triggered TXOP sharing mode subfield may indicate a TXS operation mode of the associated STAs. The triggered TXOP sharing mode subfield of the Common Info field may be set to 3 (bits 20 and 21 each set to 1) to indicate a triggered TXOP sharing (TXS) mode 3. A TXS mode such as TXS mode 3 may indicate jointly the TXS mode 2 operation and FDMA mode use.

Figure 19:
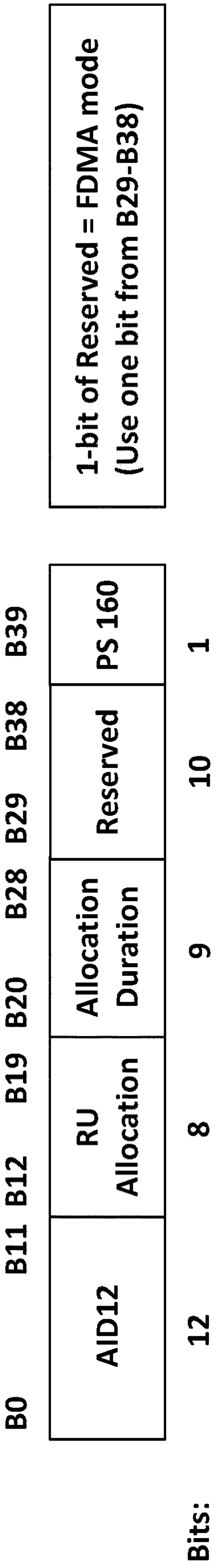
FIG. 19 shows an example of a User Info field of an MRTT frame which may be used in an FDMA-based TXS procedure.

FIG. 19 shows an example of a User Info field of an MRTT frame which may be used in an FDMA-based TXS procedure. The MRTT may be transmitted by an AP to associated computing devices (e.g., wireless devices and/or STAs). A User Info field such as User Info field 1900 may comprise an AID12 subfield, an RU Allocation subfield, an Allocation Duration subfield, reserved bits, and a PS160 subfield. One of the reserved bits of User Info field 1900 may indicate that the FDMA based TXS operation is in use for the STA whose AID is indicated in the AID12 subfield. FDMA mode use may be located in one of the bits 29-39 of User Info field 1900, for example, if User Info field 1900 is an HE variant user info field in a MU-RTS TXS Trigger frame. FDMA mode use may be located in one of the bits 29-38 of User Info field 1900, for example, if User Info field 1900 is an EHT variant User Info field (e.g., such as shown in FIG. 19).

An MRTT frame including User Info field 1900 may further include a Common Info field, for example, such as described with respect to FIGS. 17 and 18. The Common Info field may include a triggered TXOP sharing mode subfield that indicates a TXS operation mode of the associated STAs. The triggered TXOP sharing mode subfield may be set to 2 to indicate a triggered TXOP sharing mode 2. According to the triggered TXOP sharing mode 2, a STA may transmit either to the AP or to another STA during an allocated time portion of a TXOP.

Figure 20:
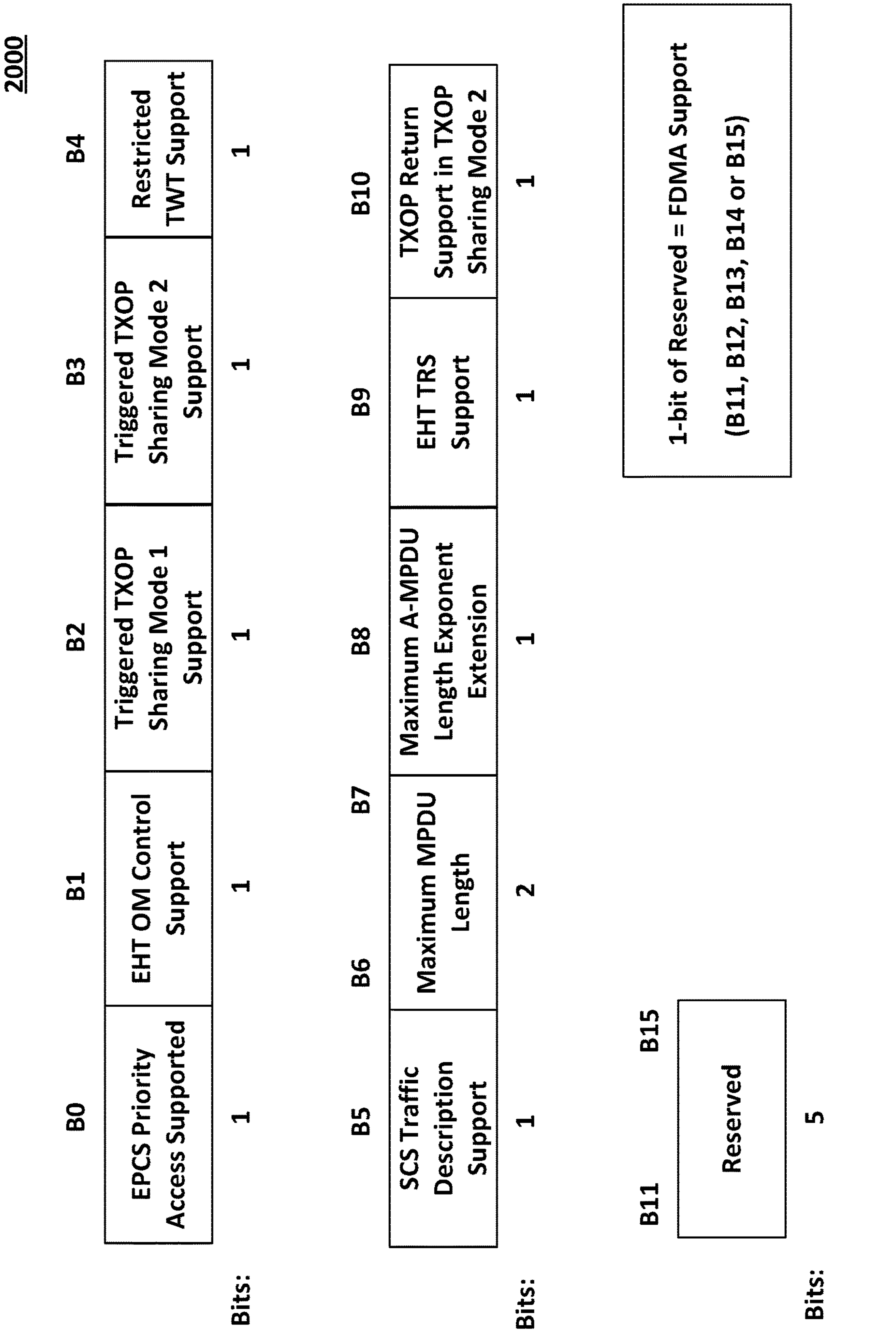
FIG. 20 shows an example of a MAC Capabilities Information field.

FIG. 20 shows an example of a MAC Capabilities Information field. A MAC Capabilities Information field 2000 may be included in an EHT Capabilities element which may be used by a computing device (e.g., wireless device and/or STA) to indicate FDMA support. The MAC Capabilities Information field may be transmitted by the STA to the AP in an association request frame, a re-association request frame, or a probe request frame. A MAC Capabilities Information field such as MAC Capabilities Information field 2000 may comprise a triggered TXOP Sharing Mode 2 Support subfield (Bit 3). The triggered TXOP Sharing Mode 2 Support subfield may be set to 1 when the AP supports TXS mode 2. In an example, one of the reserved bits (bits 11-15) of MAC Capabilities Information field 2000 may be used to indicate support by the STA for FDMA operation.

Figure 21:
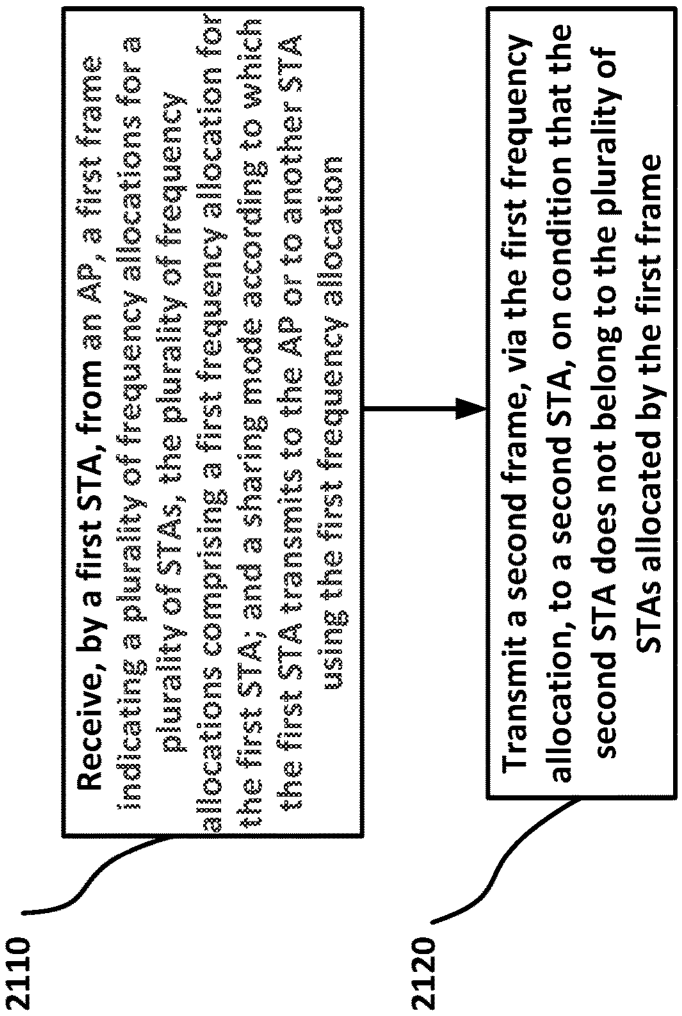
FIG. 21 shows an example process.

FIG. 21 shows an example process. An example process 2100 may be performed by a first computing device (e.g., wireless device and/or STA), such as STA 1311 or 1313, for example, in the context of an FDMA-based TXS procedure. The process 2100 may include, in step 2110, receiving by a first STA, from an AP, a first frame indicating a plurality of frequency allocations for a plurality of STAs. The plurality of frequency allocations may comprise a first frequency allocation for the first STA. The first frame may also indicate a sharing mode. The first STA may transmit to the AP or to another STA using the first frequency allocation, for example, based on the sharing mode. The sharing mode may be TXS Mode 2. In an embodiment, the first STA is associated with the AP.

The first frame may be an MRTT frame. The MRTT frame may include a Common Info field that includes the sharing mode. The Common Info field may further include an FDMA mode subfield comprising an indication of FDMA mode use. The Common Info field may include a TXS Mode subfield, the TXS Mode subfield providing both the sharing mode and the indication of FDMA mode use. The sharing mode may be TXS Mode 3. The MRTT frame may include a first User Info field for the first STA, the first User Info field comprising an indication of FDMA mode use for the first STA. The sharing mode may be TXS Mode 2.

The first frame may include a first User Info field comprising the first frequency allocation for the first STA. The first User Info field may include an RU Allocation subfield comprising the first frequency allocation for the first STA and an Allocation Duration subfield comprising a time period for transmitting a frame in response to the first frame.

In step 2120, process 2100 may include transmitting a second frame, via the first frequency allocation, to a second STA, on a condition that the second STA does not belong to the plurality of STAs allocated by the first frame. The second STA may be associated with the AP. The first STA may transmit a CTS frame prior to transmitting the second frame STA. The second frame may include a PPDU. The first STA may receive a BA frame from the second STA in response to the second frame.

The first STA may determine that it has buffered traffic for transmission to the second STA and may add the second STA to a set of candidate STAs for transmission. The first STA may further determine that the first STA has buffered traffic for transmission to a third STA and may add the third STA to a set of candidate STAs for transmission. The first STA may remove the third STA from the set of candidate STAs for transmission based on the third STA belonging to the plurality of STAs allocated by the first frame.

The first STA may transmit the second frame, via the first frequency allocation, to the second STA, for example, if the second STA does not belong to the plurality of STAs allocated by the first frame. The condition that the second STA does not belong to the plurality of STAs allocated by the first frame may be checked by reading a plurality of User Info fields of the first frame to determine STAs allocated by the first frame.

The process 2100 may further include determining a set of candidate computing devices (e.g., wireless devices and/or STAs) for transmission based on buffered traffic availability at the first STA; determining that all STAs of the set of candidate STAs for transmission belong to the plurality of STAs allocated by the first frame; and transmitting a third frame, via the first frequency allocation, to the AP based on the determination. The process 2100 may further include transmitting, by the first STA to the AP, a further frame comprising an indication of FDMA support. The further frame may comprise a MAC Capabilities Information field comprising the indication of FDMA support. The further frame may include an association request frame, a re-association request frame, or a probe request frame.

Figure 22:
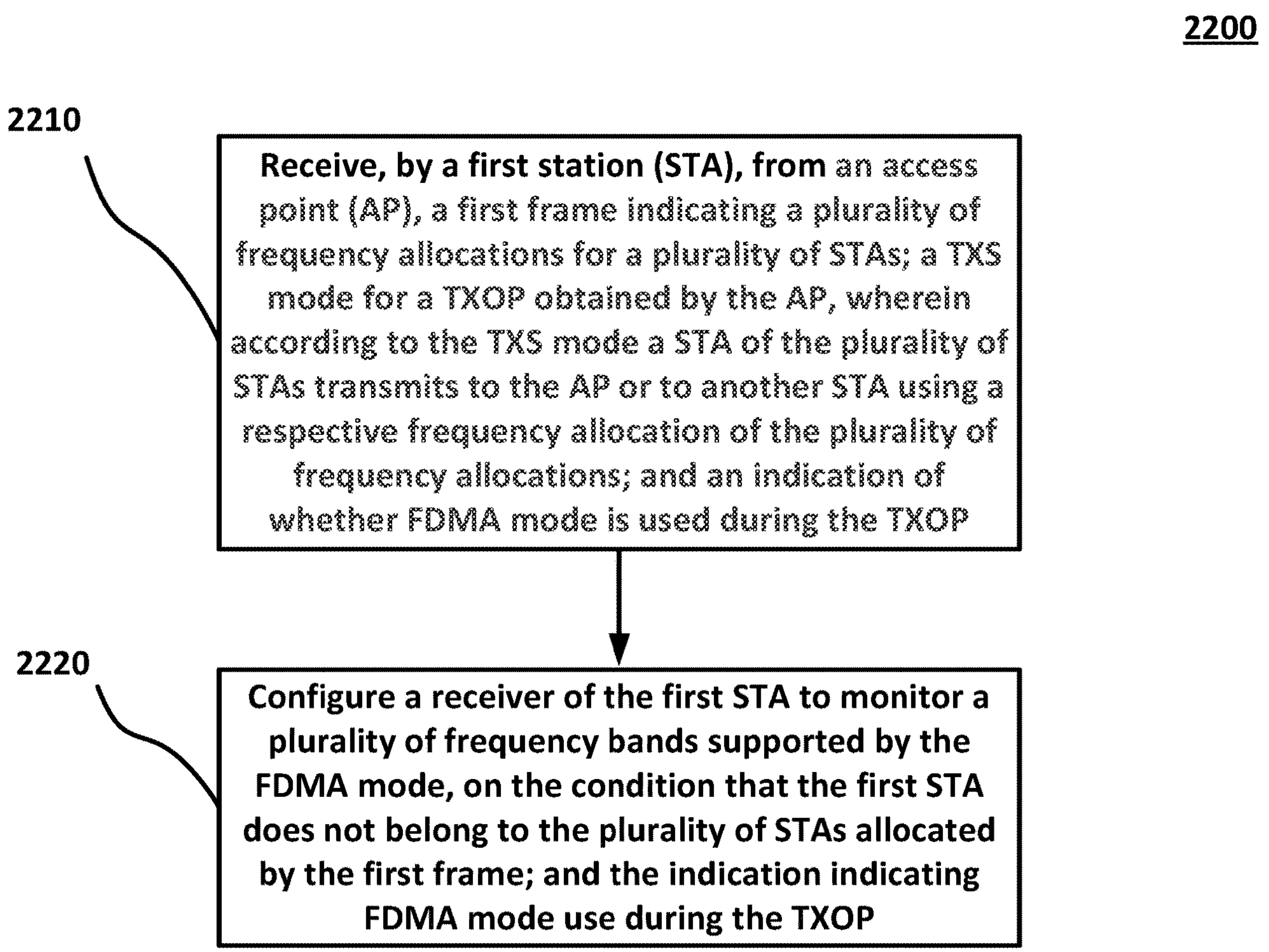
FIG. 22 shows an example process.

FIG. 22 shows an example process. An example process 2200 may be used by a first computing device (e.g., wireless device and/or STA), such as STA 1312 or 1314, for example, in a FDMA-based TXS procedure. Process 2200 may include, in step 2210, receiving by a first STA, from an AP, a first frame indicating a plurality of frequency allocations for a plurality of STAs. The first frame may further indicate a TXS mode for a TXOP obtained by the AP. A STA of the plurality of STAs may transmit to the AP or to another STA using a respective frequency allocation of the plurality of frequency allocations, for example, based on the TXS mode. The first frame may further include an indication of whether FDMA mode is used during the TXOP. The first STA may be associated with the AP.

The first frame may be an MRTT frame. The MRTT frame may include a Common Info field that may include the sharing mode. The sharing mode may be TXS Mode 2. The Common Info field may further include an FDMA mode subfield comprising an indication of FDMA mode use. The Common Info field may include a TXS Mode subfield, the TXS Mode subfield providing both the sharing mode and the indication of FDMA mode use. The sharing mode may be TXS Mode 3. In step 2220, process 2200 may include configuring a receiver of the first STA to monitor a plurality of frequency bands supported by the FDMA mode, on the conditions that: the first STA does not belong to the plurality of STAs allocated by the first frame; and the indication indicating FDMA mode use during the TXOP.

The first frame comprises a User Info field comprising a frequency allocation for a second STA of the plurality of STAs. The User Info field may comprise an Allocation Duration subfield comprising a time period for transmitting a frame by the second STA using the frequency allocation. Process 2200 may further comprise, on condition that the first STA receives a second frame from the second STA, transmitting BA frame to the second STA in response to the second frame, for example, based on the first STA not belonging to the plurality of STAs allocated by the first frame and wherein the indication indicates FDMA mode use during the TXOP. The second frame may comprise a PPDU.

Figure 23:
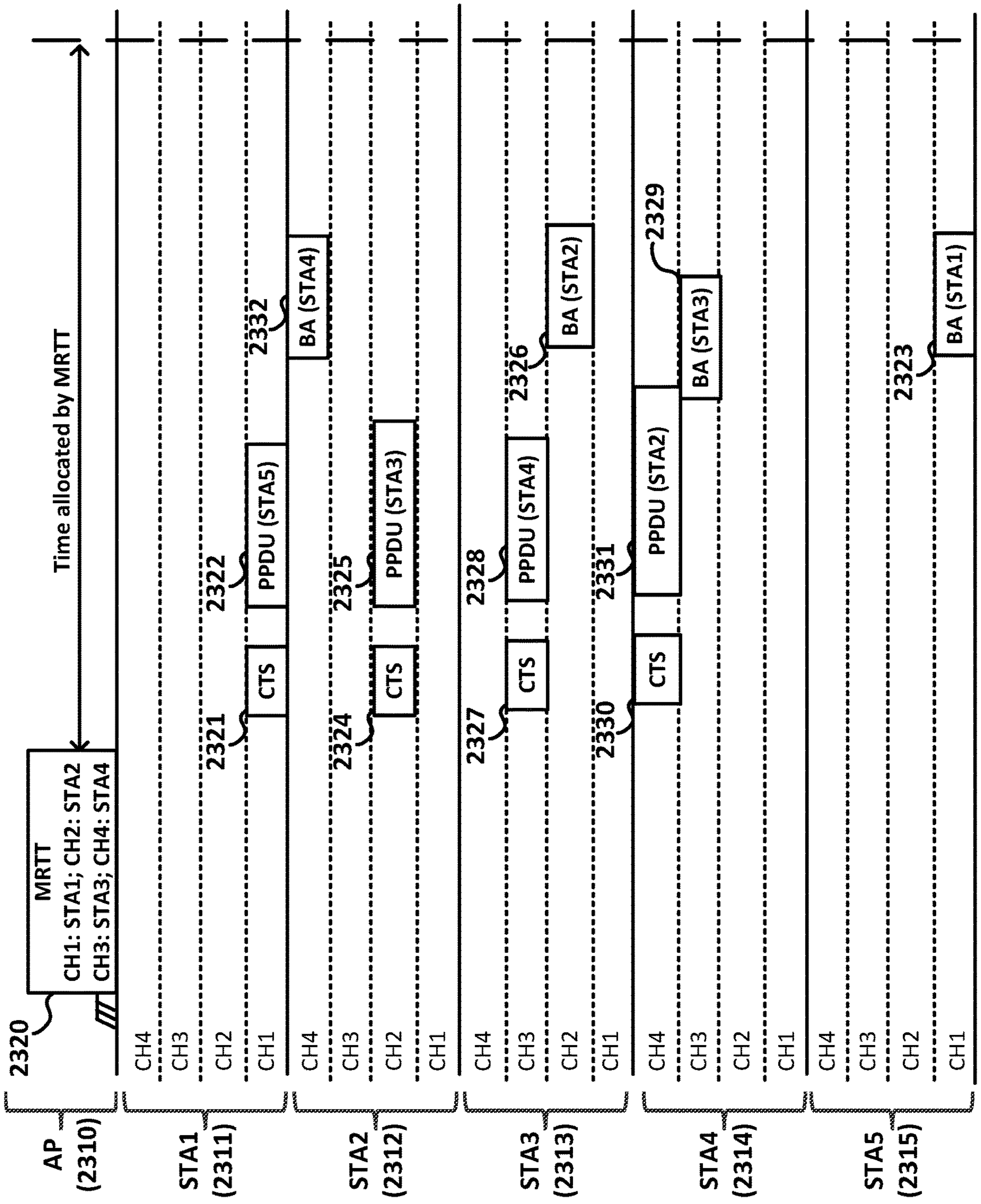
FIG. 23 shows an example of the modified operation of an FDMA based TXS procedure in an environment having simultaneous transmit and receive (STR) capable radios.

FIG. 23 shows an example of the modified operation of the FDMA based TXS procedure in an environment having STR capable radios. FIG. 23 shows an example 2300, which includes AP 2310 and computing devices (e.g., wireless devices and/or STAs) such as STAs 2311-2315. Example 2300 may begin by AP 2310 transmitting an MRTT frame 2320. An MRTT frame such as the MRTT frame 2320 may comprise a triggered TXOP sharing mode subfield set to 2. An MRTT frame such as the MRTT frame 2320 may allocate a portion of an obtained TXOP to STAs 2311-2314. Additionally, MRTT frame 2320 may assign STAs 2311-2314 a first channel (CH1), a second channel (CH2), a third channel (CH3), and a fourth channel (CH4), respectively, for transmission during the allocated portion of the TXOP. An MRTT frame such as the MRTT frame 2320 may not include target STAs to which allocated STAs 2311-2314 shall transmit during the allocated time (e.g., such as described with respect to FIG. 11). A STA such as the STA 2311 may choose STA 2315, and STA 2312 may choose STA 2313, as target STAs for a first transmission during the allocated time. Similarly, STA 2313 may choose STA 2314, and STA 2314 may choose STA 2312, as target STAs for a first transmission during the allocated time.

Subsequently, STA 2311 may transmit a CTS frame 2321 to AP 2310, followed by a PPDU 2322 to STA 2315 on the first channel (CH1). Similarly, STA 2312 may transmit a CTS frame 2324 to AP 2310, followed by a PPDU 2325 to STA 2313 on the second channel (CH2); STA 2313 may transmit a CTS frame 2327 to AP 2310, followed by a PPDU 2328 to STA 2314 on the third channel (CH3); and STA 2314 may transmit a CTS frame 2330 to AP 2310, followed by a PPDU 2331 to STA 2312 on the fourth channel (CH4). STAs 2315, 2313, 2314, and 2312 may transmit one or more Block Ack (BA) frames 2323, 2326, 2329, and 2332 respectively in response to the data frames contained in PPDUs 2322, 2325, 2328, and 2331.

As MRTT frame 2320 may not indicate the target STAs for the allocated time, STAs 2311-2314 may perform subsequent transmissions to other peer STAs, which may be different than STAs 2315, 2313, 2314 and 2312, respectively, during any remaining time of the allocated time of the TXOP, without requiring a further MRTT frame from AP 2310. This flexibility may require STR capability at some of the STAs. To transmit PDDU 2325 to STA 2313 and receive PPDU 2331 from STA 2314, STA 2312 may transmit and receive, simultaneously, in the second and fourth channels (CH2 and CH4) respectively. Similarly, in order to transmit PDDU 2328 to STA 2314 and receive PPDU 2325 from STA 2312, STA 2313 may transmit and receive, simultaneously, in the third and second channels (CH3 and CH2) respective. Similarly, in order to transmit PDDU 2331 to STA 2312 and receive PPDU 2328 from STA 2313, STA 2314 may transmit and receive, simultaneously, in the fourth and third channels (CH4 and CH3) respectively. It can be envisioned that STR capability may be supported by future IEEE 802.11 radios configured for single link communication. Operation including simultaneous transmit and receive by STAs may thus be tolerated. Reception quality may be degraded resulting in poor receiver performance, for example, if an STR operation involves a STA transmitting on a channel adjacent to the channel on which the STA is simultaneously receiving.

Improvements described herein may mitigate the adverse effects of adjacent channels in an STR operation by using guard bands to lessen the interference of the transmission on the channel of reception. As the transmitter and receiver are located in the same STA, performance gain due to this solution may be minimal. The guard bands may decrease the bandwidth of the channel used for transmission and/or reception.

Improvements described herein may address this problem by enabling STAs allocated by an MRTT frame to avoid simultaneously transmitting and receiving on adjacent channels in response to the MRTT frame. Target STA constraints may be eliminated from the MRTT frame, allowing an allocated STA to freely choose its target STA(s) on condition that a target STA is either not allocated by the trigger frame or allocated in a non-adjacent channel for the allocated time. As such, transmissions from the allocated STA to different peer STAs may be performed during the allocated time based on a single MRTT frame transmitted from the AP. This may reduce signaling overhead for the FDMA based TXS procedure in addition to reducing interference to the receiver operating in the adjacent channel in the STR operation.

Figure 24:
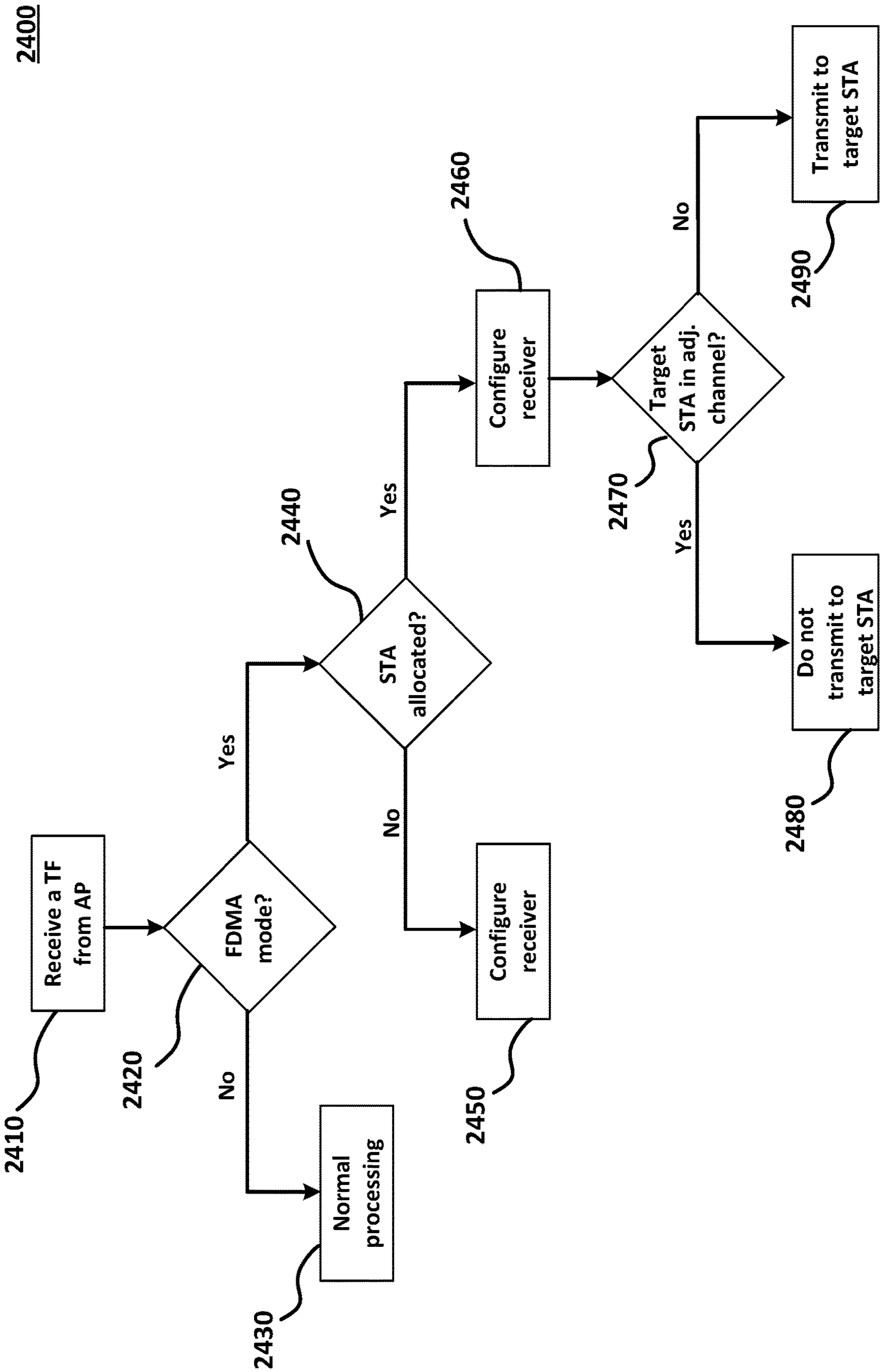
FIG. 24 shows an example process.

FIG. 24 shows an example process according. An example process 2400 may be performed by a first computing device (e.g., wireless device and/or STA). As Process 2400 may start in step 2410, which may include receiving a trigger frame from an AP. The AP may be an AP with which the STA is associated. The STA and the AP have STR capability. In an embodiment, the trigger frame may be a frame that allocates a time portion of a TXOP obtained by the AP to one or more STAs associated with the AP. The trigger frame may also indicate a sharing mode for the allocated time portion of the TXOP. The sharing mode indicated in the trigger frame permits an allocated STA, such as the first STA, to transmit to the AP or to another STA using its indicated frequency allocation (TXS mode 2).

The trigger frame may indicate a plurality of frequency allocations for a plurality of STAs. The plurality of frequency allocations may correspond to a respective plurality of channels (e.g., 20 MHz channels) supported by the AP. The plurality of channels may be orthogonal (non-overlapping). The plurality of frequency allocations may comprise a first frequency allocation for the first STA performing process 2400.

The trigger frame may be an MRTT frame. The trigger frame may include a Common Info field that indicates the sharing mode, for example, if the trigger frame is an MRTT frame. The trigger frame may include a first User Info field comprising the first frequency allocation for the first STA, for example, if the trigger frame is an MRTT frame. The first User Info field may comprise an RU Allocation subfield comprising the first frequency allocation for the first STA. The first User Info field may also comprise an Allocation Duration subfield comprising a time period for transmitting during the TXOP.

Next, process 2400 proceeds to step 2420, which may include determining whether FDMA mode is enabled in the trigger frame. Step 2420 may include checking the trigger frame for an indication of FDMA mode use. Step 2420 may include checking a Common Info field of the trigger frame for the indication of FDMA mode use, for example, if the trigger frame is an MRTT frame. The Common Info field may comprise an FDMA mode subfield comprising the indication of FDMA mode use. The Common Info field may comprise a TXS Mode subfield, the TXS Mode subfield providing both the sharing mode and the indication of FDMA mode use. The trigger frame may include a first User Info field for the first STA that may include an indication of FDMA mode use for the first STA, for example, if the trigger frame is an MRTT frame.

Prior to process 2400, the first STA may transmit a frame (e.g., an association request frame, a re-association request frame, or a probe request frame) to the AP comprising an indication of FDMA support. The indication of FDMA support may inform the AP whether the first STA supports FDMA operations, including FDMA based TXS. The frame may include a MAC Capabilities Information field comprising an indication of FDMA support bit. The AP may use the indication of FDMA support from the first STA to determine whether to include the first STA in FDMA based operations, including FDMA based TXS. In at least some wireless technologies, the first STA may support FDMA mode and may have signaled a positive indication of FDMA support to the AP prior to process 2400. The frame may also include an indication of STR support by the first STA.

If the answer is no in step 2420 (i.e., FDMA mode is disabled in the trigger frame), process 2400 may proceed to step 2430, in which the first STA may implement normal processing of the trigger frame (e.g., such as in accordance with current IEEE 802.11 rules for STAs). Otherwise, process 2400 may transition to step 2440, which may include determining whether the first STA is allocated by the trigger frame. Step 2440 may include reading a plurality of User Info fields of the trigger frame to determine STAs allocated by the trigger frame, for example, if the trigger frame is an MRTT frame. Step 2440 may include reading all of the User Info fields of the trigger frame. The first STA may determine that it is allocated by the trigger frame based on reading a User Info field having an AID12 subfield corresponding to an AID of the first STA.

If, for example, the first STA is not allocated by the trigger frame, process 2400 may proceed to step 2450, which may include configuring a receiver of the first STA to monitor a plurality of frequency channels supported by the FDMA mode. As the first STA may not be allocated by the trigger frame, the first STA may be a target STA of a plurality of peer STAs during the FDMA based TXS procedure according to embodiments.

Otherwise, if the first STA is allocated a first frequency allocation by the trigger frame in step 2440, process 2400 may proceed to step 2460, which may include configuring a receiver of the first STA to monitor a plurality of frequency bands not including a first frequency band corresponding to the first frequency allocation of the first STA. The first STA may be a target STA of a plurality of peer STAs in a plurality of frequency bands not including the first frequency band during the FDMA based TXS procedure according to embodiments, for example, if the first STA is allocated only the first frequency allocation by the trigger frame, and as the first STA has STR capability.

Process 2400 then proceeds to step 2470, which may include determining whether a target STA of the first STA is allocated by the trigger frame in a channel adjacent to the channel corresponding to the first frequency allocation of the first STA (hereinafter, adjacent channel). The target STA may be selected from a set of candidate STAs for transmission. The target STA may be a second STA that is added to the set of candidate STAs based on the first STA having buffered traffic for transmission to the second STA. Step 2470 may include checking whether the trigger frame includes a User Info field for the target STA. Step 2470 may be executed before step 2460.

If the answer is yes in step 2470 (i.e., the target STA is allocated in an adjacent channel in the trigger frame), process 2400 proceeds to step 2480, in which the first STA may not transmit to the target (second) STA. The second STA may be removed from the set of candidate STAs for transmission based on the determination of step 2470. Process 2400 may return to step 2470, in which another target STA, if any, is selected from the set of candidate STAs for transmission and the same processing repeated with respect to the other target STA, for example, if the target STA is removed from the set of candidate STAs for transmission.

If the answer is no in step 2470, process 2400 proceeds to step 2490, in which the first STA may transmit to the target (second) STA during the allocated time portion of the TXOP. An Allocation Duration subfield of the User Info field allocating the first STA may include a time period for the first STA to transmit a frame to the target STA. In an embodiment, the first STA may transmit a Clear to Send (CTS) frame to the AP prior to transmitting the frame to the target STA. The first STA may receive a BA frame from the target STA in response to the transmitted frame.

The first STA may transmit a further frame, via the first frequency allocation, to a third STA after receiving the BA frame from the second STA, on condition that the third STA either does not belong to the plurality of STAs allocated by the first frame or is allocated by the first frame a third frequency allocation that is non-adjacent to the first frequency allocation of the first STA.

Figure 25:
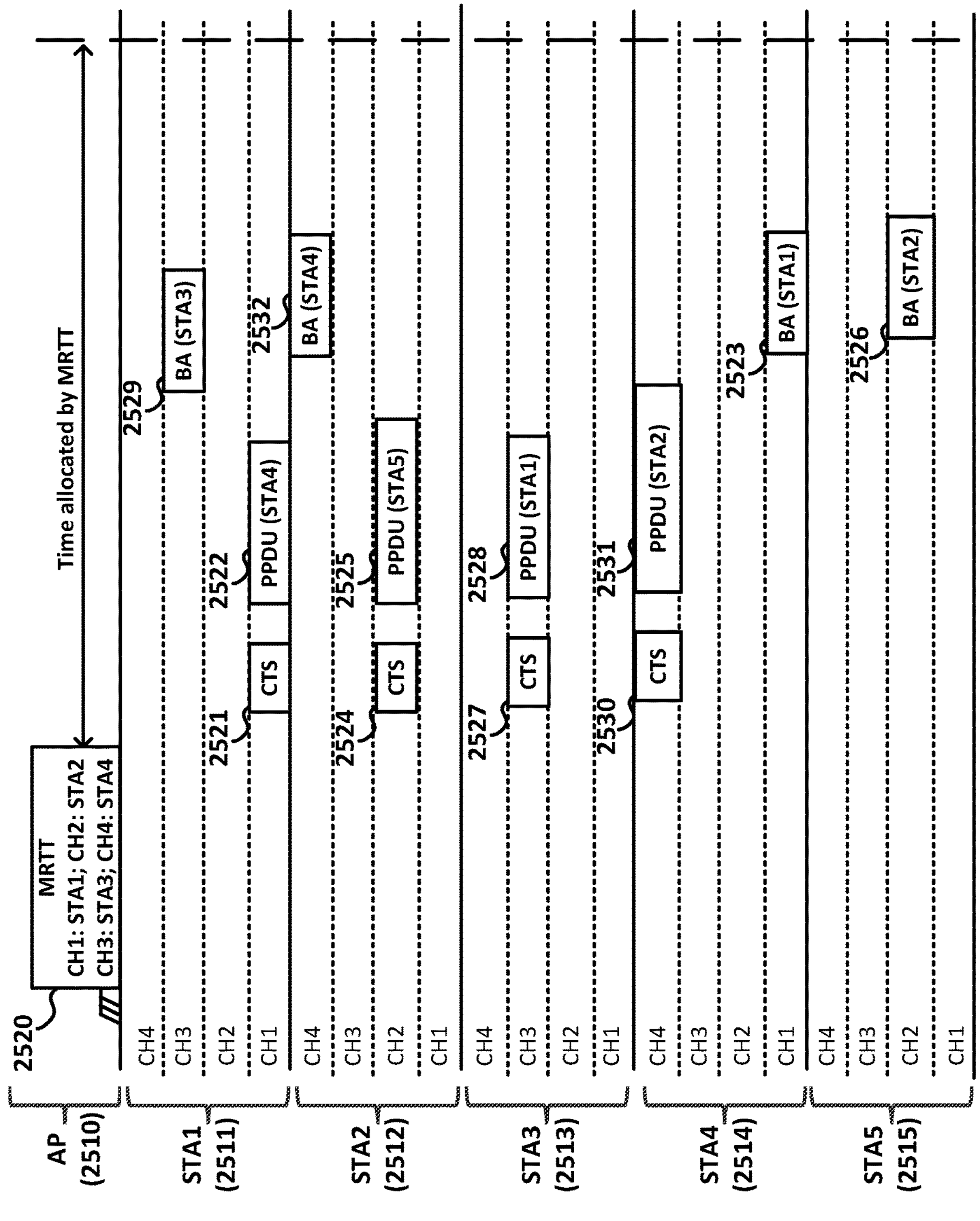
FIG. 25 shows an example of an FDMA based TXS procedure.

FIG. 25 shows an example of an FDMA based TXS procedure. FIG. 25 shows example 2500, which includes AP 2510 and computing devices (e.g., wireless devices and/or STAs) such as STAs 2511-2515. STAs such as the STAs 2511-2515 may be associated with AP 2510. An AP such as the AP 2510 and STAs such as the STAs 2511-2515 may support an FDMA mode according to which AP 2510 and/or STAs 2511-2515 may operate over multiple frequency channels (e.g., 20 MHz channels). AP 2510 and/or STAs 2511-2515 may support STR operation in single link communication according to which AP 2510 and/or STAs 2511-2515 may simultaneously transmit and receive in different channels of the multiple frequency channels.

Example 2500 may begin by AP 2510 transmitting an MRTT frame 2520. An MRTT frame such as the MRTT frame 2520 may comprise a triggered TXOP sharing mode subfield set to 2. An MRTT frame such as the MRTT frame 2520 may allocate a portion of an obtained TXOP to STAs 2511-2514. Additionally, MRTT frame 2520 may assign STAs 2511-2514 a first channel (CH1), a second channel (CH2), a third channel (CH3), and a fourth channel (CH4), respectively, for transmission during the allocated time portion of the TXOP. An MRTT frame such as the MRTT frame 2520 may not include target STAs to which allocated STAs 2511-2514 shall transmit during the allocated time (e.g., such as described with respect to FIG. 23).

STAs 2511-2515 may be configured to operate in accordance with example process 2400 described above. In example 2500, STA 2511 may have buffered traffic for STAs 2512 and 2514. STA 2511 may not choose STA 2512 as a target STA for a first transmission during the allocated time, for example, based on STA 2512 being allocated in CH2, which may be adjacent to CH1 allocated to STA 2511. STA 2511 may choose STA 2514, allocated in non-adjacent channel CH4, as a target STA for the first transmission during the allocated time. In example 2500, STA 2512 may have buffered traffic for STAs 2511, 2513, and 2515. STA 2512 allocated in CH2 may not choose either of STAs 2511 and 2513 allocated in adjacent channels CH1 and CH3 respectively for a first transmission during the allocated time. STA 2512 may choose non-allocated STA 2515 as a target STA for the first transmission. In a similar fashion, STA 2513 (allocated in CH3) may choose STA 2511 (allocated in non-adjacent channel CH1), but neither of STAs 2512 (allocated in adjacent channel CH2) or 2514 (allocated in adjacent channel CH4), as a target STA for a first transmission during the allocated time. Similarly, STA 2514 (allocated in CH4) may choose STA 2512 (allocated in non-adjacent channel CH2) as a target STA for a first transmission during the allocated time but may not choose STA 2513 (allocated in adjacent channel CH3) as a target STA for the first transmission.

A STA such as the STA 2511 may transmit a CTS frame 2521 to AP 2510, followed by a PPDU 2522 to STA 2514 on the first channel (CH1), for example, based on choosing the target STAs. Similarly, STA 2512 may transmit a CTS frame 2524 to AP 2510, followed by a PPDU 2525 to STA 2515 on the second channel (CH2); STA 2513 may transmit a CTS frame 2527 to AP 2510, followed by a PPDU 2528 to STA 2511 on the third channel (CH3); and STA 2514 may transmit a CTS frame 2530 to AP 2510, followed by a PPDU 2531 to STA 2512 on the fourth channel (CH4). STAs 2514, 2515, 2511 and 2512 may transmit one or more Block Ack (BA) frames 2523, 2526, 2529 and 2532 respectively in response to the data frames contained in PPDUs 2522, 2525, 2528 and 2531.

STAs 2511-2514 may perform subsequent transmissions to other peer STAs, which may be different than STAs 2514, 2515, 2511 and 2512, respectively, or to the AP, during any remaining time of the allocated time of the TXOP, for example, based on MRTT frame 2520 not indicating the target STAs for the allocated time.

Figure 26:
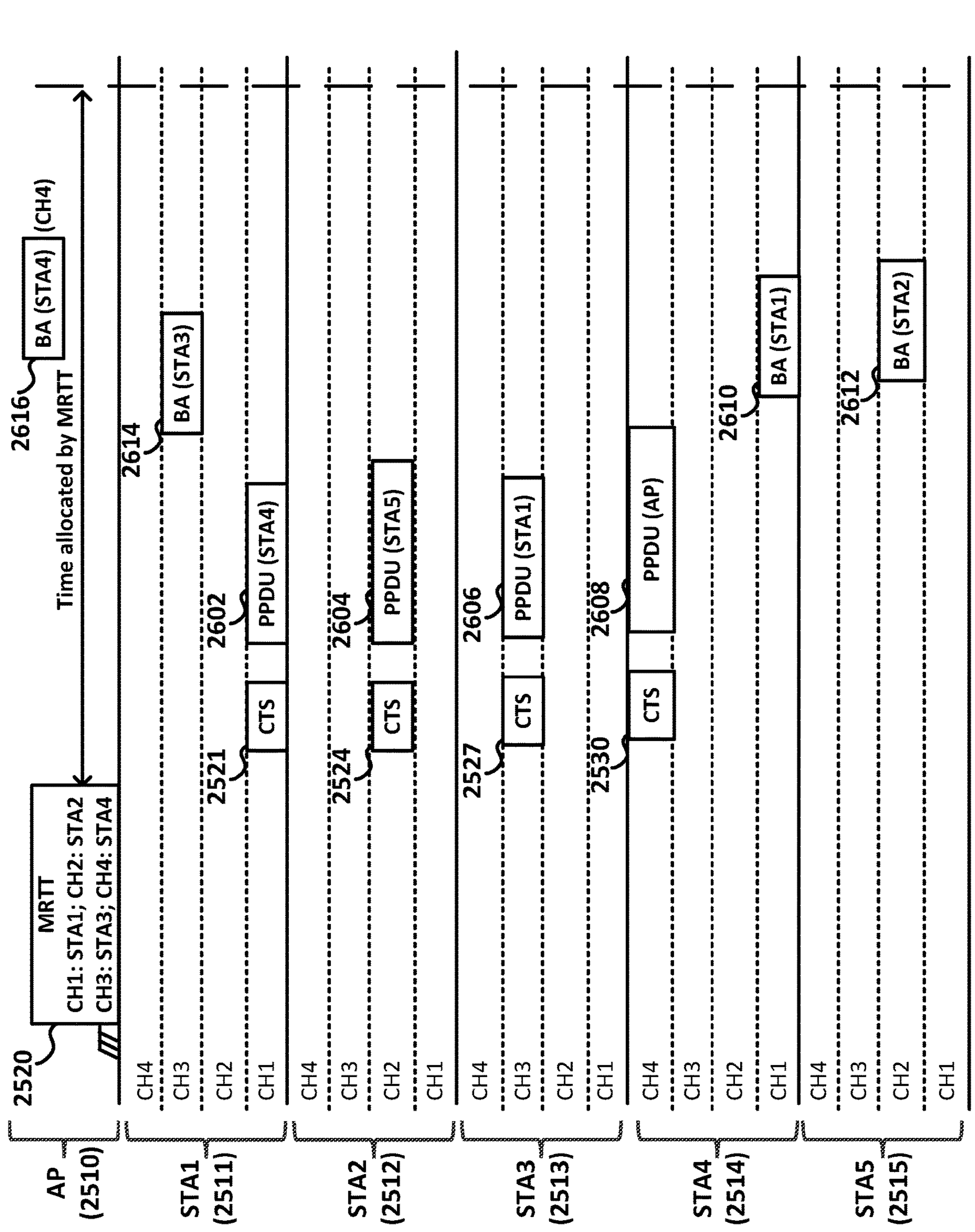
FIG. 26 shows another example of an FDMA based TXS procedure.

FIG. 26 shows another example of an FDMA based TXS procedure. FIG. 26 shows an example 2600, which includes AP 2510 and computing devices (e.g., wireless devices and/or STAs) such as STAs 2511-2515. STAs 2511-2515 may be associated with AP 2510. An AP such as the AP 2510 and STAs such as the STAs 2511-2515 may support an FDMA mode according to which AP 2510 and/or STAs 2511-2515 may operate over multiple frequency channels (e.g., 20 MHz channels). AP 2510 and/or STAs 2511-2515 may support STR operation in single link communication according to which AP 2510 and/or STAs 2511-2515 may simultaneously transmit and receive in different channels of the multiple frequency channels.

Example 2600 may begin by AP 2510 transmitting MRTT frame 2520. An MRTT frame such as the MRTT frame 2520 may comprise a triggered TXOP sharing mode subfield set to 2. An MRTT frame such as the MRTT frame 2520 may allocate a portion of an obtained TXOP to STAs 2511-2514. Additionally, MRTT frame 2520 may assign STAs 2511-2514 a first channel (CH1), a second channel (CH2), a third channel (CH3), and a fourth channel (CH4), respectively, for transmission during the allocated time portion of the TXOP. MRTT frame 2520 may not include target STAs to which allocated STAs 2511-2514 shall transmit during the allocated time (e.g., such as described with respect to FIG. 25).

STAs 2511-2515 may be configured to operate in accordance with example process 2400 described above. In example 2600, STA 2511 may have buffered traffic for STAs 2512 and 2514. STA 2511 may not choose STA 2512 as a target STA for a first transmission during the allocated time, for example, based on STA 2512 being allocated in CH2, which may be adjacent to CH1 allocated to STA 2511. STA 2511 however may choose STA 2514, allocated in non-adjacent channel CH4, as a target STA for the first transmission during the allocated time. In example 2600, STA 2512 may have buffered traffic for STAs 2511, 2513, and 2515. STA 2512 allocated in CH2 may not choose either of STAs 2511 and 2513 allocated in adjacent channels CH1 and CH3 respectively for a first transmission during the allocated time. STA 2512 may choose non-allocated STA 2515 as a target STA for the first transmission. In a similar fashion, STA 2513 (allocated in CH3) may choose STA 2511 (allocated in non-adjacent channel CH1), but neither of STAs 2512 (allocated in adjacent channel CH2) or 2514 (allocated in adjacent channel CH4), as a target STA for a first transmission during the allocated time. In example 2600, STA 2514 (allocated in CH4) may have buffered traffic for AP 2510 and for STA 2513 for transmission during the allocated time. As STA 2513 is allocated in adjacent channel CH4, STA 2514 may not choose STA 2513 as a target STA for a first transmission during the allocated time. As such, STA 2514 may choose AP 2510 as a target for the first transmission during the allocated time.

A STA such as the STA 2511 may transmit a CTS frame 2521 to AP 2510, followed by a PPDU 2602 to STA 2514 on the first channel (CH1), for example, based on (e.g., after or in response to) choosing the target STAs. Similarly, STA 2512 may transmit a CTS frame 2524 to AP 2510, followed by a PPDU 2604 to STA 2515 on the second channel (CH2); and STA 2513 transmits a CTS frame 2527 to AP 2510, followed by a PPDU 2606 to STA 2511 on the third channel (CH3). A STA such as the STA 2514 may transmit a CTS frame 2530 to AP 2510, followed by a PPDU 2608 to AP 2510 on the fourth channel (CH4), for example, based on (e.g., after or in response to) choosing the AP as a target for the first transmission during the allocated time. STAs 2514, 2515, 2511 and AP 2510 may transmit one or more Block Ack (BA) frames 2610, 2612, 2614 and 2616 respectively, for example, based on (e.g., in response to) the data frames contained in PPDUs 2602, 2604, 2606 and 2608.

Figure 27:
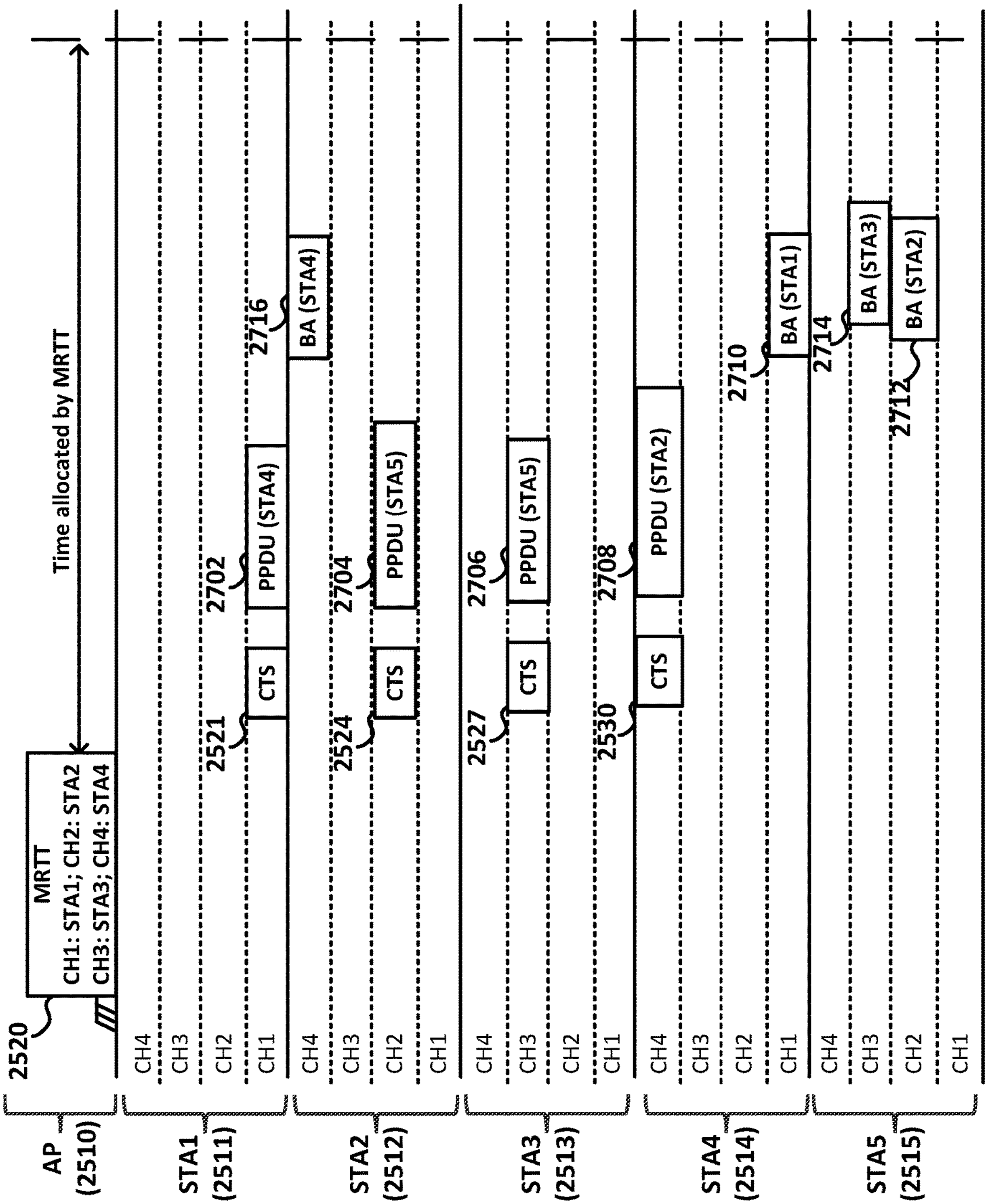
FIG. 27 shows another example of an FDMA based TXS procedure.

FIG. 27 shows another example of an FDMA based TXS procedure. FIG. 27 shows an example 2700, which includes AP 2510 and computing devices (e.g., wireless devices and/or STAs) such as STAs 2511-2515. STAs 2511-2515 may be associated with AP 2510. An AP such as the AP 2510 and STAs such as the STAs 2511-2515 may support an FDMA mode according to which AP 2510 and/or STAs 2511-2515 may operate over multiple frequency channels (e.g., 20 MHz channels). AP 2510 and/or STAs 2511-2515 may support STR operation in single link communication according to which AP 2510 and/or STAs 2511-2515 may simultaneously transmit and receive in different channels of the multiple frequency channels.

Example 2700 may begin by AP 2510 transmitting MRTT frame 2520 (e.g., such as described with respect to FIG. 25). An MRTT frame such as the MRTT frame 2520 may comprise a triggered TXOP sharing mode subfield set to 2. MRTT frame 2520 may allocate a portion of an obtained TXOP to STAs 2511-2514. Additionally, MRTT frame 2520 may assign STAs 2511-2514 a first channel (CH1), a second channel (CH2), a third channel (CH3), and a fourth channel (CH4), respectively, for transmission during the allocated time portion of the TXOP. MRTT frame 2520 may not include target STAs to which allocated STAs 2511-2514 shall transmit during the allocated time (e.g., such as described with respect to FIG. 25).

STAs such as the STAs 2511-2515 may be configured to operate in accordance with example process 2400 described above. In example 2700, STA 2511 may have buffered traffic for STAs 2512 and 2514. STA 2511 may not choose STA 2512 as a target STA for a first transmission during the allocated time, for example, based on STA 2512 being allocated in CH2, which may be adjacent to CH1 allocated to STA 2511. STA 2511 may choose STA 2514, allocated in non-adjacent channel CH4, as a target STA for the first transmission during the allocated time. In example 2700, STA 2512 may have buffered traffic for STAs 2511, 2513, and 2515. STA 2512 allocated in CH2 may not choose either of STAs 2511 and 2513 allocated in adjacent channels CH1 and CH3 respectively for a first transmission during the allocated time. STA 2512 may choose non-allocated STA 2515 as a target STA for the first transmission. In a similar fashion, STA 2513 (allocated in channel CH3) may choose non-allocated STA 2515, but neither of STAs 2512 (allocated in adjacent channel CH2) or 2514 (allocated in adjacent channel CH4), as a target STA for a first transmission during the allocated time. Similarly, STA 2514 (allocated in CH4) may choose STA 2512 (allocated in non-adjacent channel CH2) as a target STA for a first transmission during the allocated time but may not choose STA 2513 (allocated in adjacent channel CH3) as a target STA for the first transmission.

STA 2511 may transmit a CTS frame 2521 to AP 2510, followed by a PPDU 2702 to STA 2514 on the first channel (CH1), for example, based on (e.g., after or in response to) choosing the target STAs. Similarly, STA 2512 may transmit a CTS frame 2524 to AP 2510, followed by a PPDU 2704 to STA 2515 on the second channel (CH2); STA 2513 may transmit a CTS frame 2527 to AP 2510, followed by a PPDU 2706 to STA 2515 on the third channel (CH3), and STA 2514 may transmit a CTS frame 2530 to AP 2510, followed by a PPDU 2708 to STA 2512 on the fourth channel (CH4). STAs 2514, 2515 and 2512 may transmit one or more Block Ack (BA) frames 2710, 2712, 2714 and 2716 respectively in response to the data frames contained in PPDUs 2702, 2704, 2706 and 2708.

STAs that perform STR operations simultaneously transmit and receive only on non-adjacent channels (e.g., such as described with respect to FIG. 24). For example, STA 2512 may transmit PPDU 2704 on CH2 and may simultaneously receive PPDU 2708 on non-adjacent channel CH4. Similarly, STA 2514 may transmit PPDU 2708 on CH4 and may simultaneously receive PPDU 2702 on non-adjacent channel CH1. As such, receiver performance may not be adversely impacted by the STR operations.

A STA such as the STA 2515 which is not allocated by MRTT frame 2520 may be a target STA for multiple transmissions, on multiple frequency channels, during the allocated time. For example, STA 2515 may be a target STA for PPDU 2704 from STA 2512 on CH2 and for PPDU 2706 from STA 2513 on CH3. As such, STA 2515 may require multiple RF receiver chains in order to receive simultaneously on the CH2 and CH3 respectively.

Figure 28:
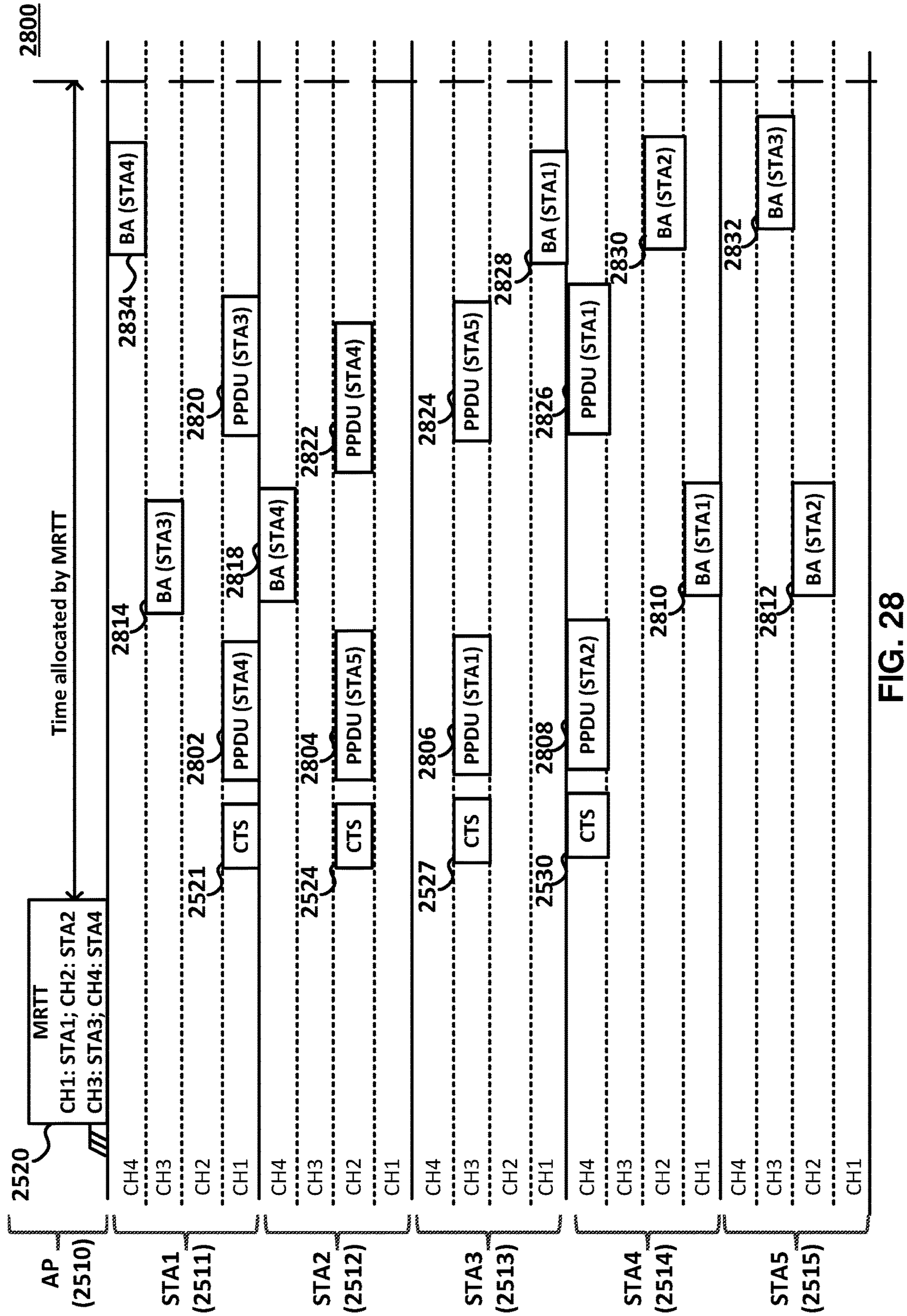
FIG. 28 shows another example of an FDMA based TXS procedure.

FIG. 28 shows another example of an FDMA based TXS procedure. FIG. 28 shows an example 2800, which includes AP 2510 and computing devices (e.g., wireless devices and/or STAs) such as STAs 2511-2515. STAs 2511-2515 may be associated with AP 2510. An AP such as the AP 2510 and STAs such as the STAs 2511-2515 may support an FDMA mode according to which AP 2510 and/or STAs 2511-2515 may operate over multiple frequency channels (e.g., 20 MHz channels). AP 2510 and/or STAs 2511-2515 may support STR operation in single link communication according to which AP 2510 and/or STAs 2511-2515 may simultaneously transmit and receive in different channels of the multiple frequency channels.

Example 2800 may begin by AP 2510 transmitting MRTT frame 2520 (e.g., such as described with respect to FIG. 25). MRTT frame 2520 may comprise a triggered TXOP sharing mode subfield set to 2. MRTT frame 2520 may allocate a portion of an obtained TXOP to STAs 2511-2514. Additionally, MRTT frame 2520 may assign STAs 2511-2514 a first channel (CH1), a second channel (CH2), a third channel (CH3); and a fourth channel (CH4), respectively, for transmission during the allocated time portion of the TXOP. MRTT frame 2520 may not include target STAs to which allocated STAs 2511-2514 shall transmit during the allocated time (e.g., such as described with respect to FIG. 25).

STAs 2511-2515 may be configured to operate in accordance with example process 2400 described above. In example 2800, STA 2511 may have buffered traffic for STAs 2512 and 2514. STA 2511 may not choose STA 2512 as a target STA for a first transmission during the allocated time, for example, based on STA 2512 being allocated in CH2, which may be adjacent to CH1 allocated to 2511. STA 2511 may choose STA 2514, allocated in non-adjacent channel CH4, as a target STA for the first transmission during the allocated time. STA 2512 may have buffered traffic for STAs 2511, 2513, and 2515. STA 2512 allocated in CH2 may not choose either of STAs 2511 and 2513 allocated in adjacent channels CH1 and CH3 respectively for a first transmission during the allocated time. STA 2512 may choose non-allocated STA 2515 as a target STA for the first transmission. In a similar fashion, STA 2513 (allocated in CH3) may choose STA 2511 (allocated in non-adjacent channel CH1), but neither of STAs 2512 (allocated in adjacent channel CH2) or 2514 (allocated in adjacent channel CH4), as a target STA for a first transmission during the allocated time. Similarly, STA 2514 (allocated in CH4) may choose STA 2512 (allocated in non-adjacent channel CH2) as a target STA for a first transmission during the allocated time but may not choose STA 2513 (allocated in adjacent channel CH3) as a target STA for the first transmission.

STA 2511 may transmit a CTS frame 2521 to AP 2510, followed by a PPDU 2802 to STA 2514 on the first channel (CH1), for example, based on (e.g., after or in response to) choosing the target STAs. Similarly, STA 2512 may transmit a CTS frame 2524 to AP 2510, followed by a PPDU 2804 to STA 2515 on the second channel (CH2); STA 2513 may transmit a CTS frame 2527 to AP 2510, followed by a PPDU 2806 to STA 2511 on the third channel (CH3); and STA 2514 may transmit a CTS frame 2530 to AP 2510, followed by a PPDU 2808 to STA 2512 on the fourth channel (CH4). STAs 2514, 2515, 2511 and 2512 may transmit one or more Block Ack (BA) frames 2810, 2812, 2814 and 2816 respectively in response to the data frames contained in PPDUs 2802, 2804, 2806 and 2808.

STAs 2511-2514 may choose STAs 2513, 2514, 2515 and 2511 respectively as target STAs for a second transmission during the allocated time, for example, based on (e.g., after or in response to) receiving BA frames 2810, 2812, 2814 and 2816 respectively, and/or based on time remaining in the allocated portion of the TXOP. The chosen STAs 2513, 2514, 2515 and 2511 may be allocated in non-adjacent channels to the channels allocated to STAs 2511-2514, respectively. As such, STA 2511 may transmit a PPDU 2820 to STA 2513 on the first channel (CH1); STA 2512 may transmit a PPDU 2822 to STA 2514 on the second channel (CH2); STA 2513 may transmit a PPDU 2824 to STA 2515 on the third channel (CH3); and STA 2514 may transmit a PPDU 2826 to STA 2511 on the fourth channel (CH4). STAs 2513, 2514, 2515 and 2511 may transmit one or more Block Ack (BA) frames 2828, 2830, 2832 and 2834 respectively in response to the data frames contained in PPDUs 2820, 2822, 2824 and 2826.

An MRTT frame such as the MRTT frame 2520 may be used to enable multiple P2P transmissions to different peer STAs during an allocated time portion of a TXOP. This may provide improvements compared to MRTT frame 920 used in the FDMA based TXS procedure, in which target STAs may be specified for an entire allocated time portion and a further MRTT frame 1006 may be required to be transmitted by the AP in order to enable transmission to different peer STAs in a subsequent allocated time.

Figure 29:
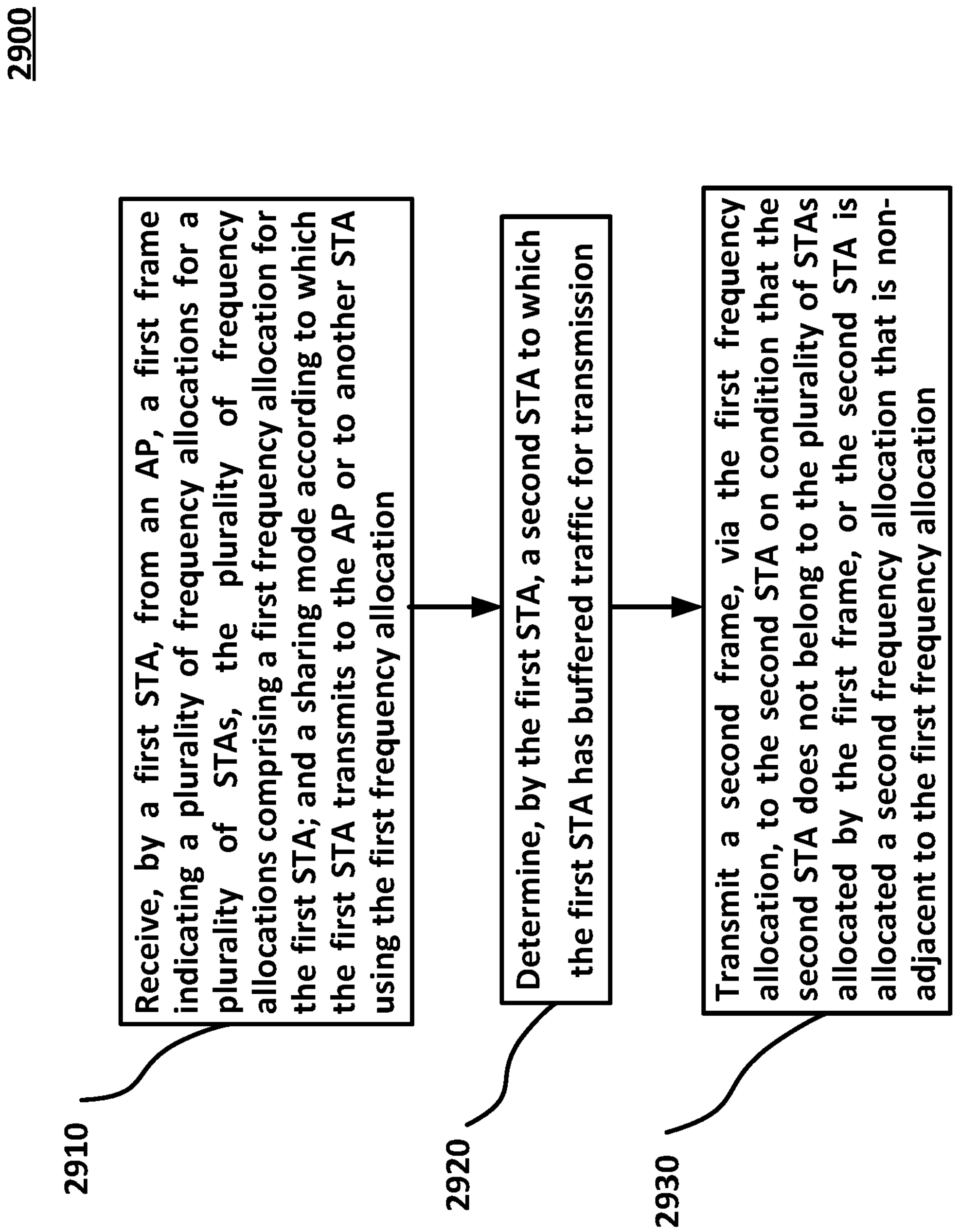
FIG. 29 shows an example process.

FIG. 29 shows an example process. Example process 2900 may be performed by a first computing device (e.g., wireless device and/or STA), such as STAs 2511, 2512, 2513 or 2514, for example, in the context of an FDMA-based TXS procedure. Process 2900 may include, in step 2910, receiving, by a first STA, from an AP, a first frame indicating a plurality of frequency allocations for a plurality of STAs. The plurality of frequency allocations may comprise a first frequency allocation for the first STA. The first frame may indicate a sharing mode. The first STA may transmit to the AP or to another STA using the first frequency allocation, for example, based on the sharing mode. The sharing mode may be TXS Mode 2. In an embodiment, the first STA is associated with the AP. The first STA may have simultaneous transmit-receive (STR) capability.

The first frame may be an MRTT frame. The MRTT frame may include a Common Info field that may include the sharing mode. The Common Info field may include an FDMA mode subfield comprising an indication of FDMA mode use. The Common Info field may include a TXS Mode subfield, the TXS Mode subfield providing both the sharing mode and the indication of FDMA mode use. The sharing mode may be TXS Mode 3.

The MRTT frame may include a first User Info field for the first STA, the first User Info field comprising an indication of FDMA mode use for the first STA. The sharing mode may be TXS Mode 2. The first frame may include a first User Info field comprising the first frequency allocation for the first STA. The first User Info field may include an RU Allocation subfield comprising the first frequency allocation for the first STA and an Allocation Duration subfield comprising a time period for transmitting a frame in response to the first frame.

In step 2920, process 2900 may include determining, by the first STA, a second STA to which the first STA has buffered traffic for transmission. The first STA may determine that it has buffered traffic for transmission to the second STA and may add the second STA to a set of candidate STAs for transmission. The first STA may determine that the first STA has buffered traffic for transmission to a third STA and may add the third STA to a set of candidate STAs for transmission. The first STA may remove the third STA from the set of candidate STAs for transmission based on the third STA being allocated a third frequency allocation that is adjacent to the first frequency allocation.

In step 2930, process 2900 may include transmitting a second frame, via the first frequency allocation, to the second STA on a condition that the second STA does not belong to the plurality of STAs allocated by the first frame and/or that the second STA is allocated a second frequency allocation that is non-adjacent to the first frequency allocation. Process 2900 may include configuring a receiver of the first STA to monitor a plurality of frequency bands not including a first frequency band corresponding to the first frequency allocation of the first STA. A plurality of frequency bands may correspond to the plurality of frequency allocations indicated in the first frame.

The second STA may be associated with the AP. The second STA may have STR capability. The first STA may transmit a CTS frame prior to transmitting the second frame STA. The second frame may include a PPDU. The first STA may receive a BA frame from the second STA in response to the second frame.

The first STA may transmit the second frame, via the first frequency allocation, to the second STA, for example, wherein the second STA may not belong to the plurality of STAs allocated by the first frame and/or wherein the second STA may be allocated by the first frame a second frequency allocation that is non-adjacent to the first frequency allocation. The condition that the second STA does not belong to the plurality of STAs allocated by the first frame and/or that the second STA is allocated by the first frame a second frequency allocation that is non-adjacent to the first frequency allocation may be checked by reading a plurality of User Info fields of the first frame to determine STAs allocated by the first frame.

Process 2900 may include determining a set of candidate STAs for transmission based on buffered traffic availability at the first STA; determining that every STA of the set of candidate STAs for transmission is allocated by the first frame a respective frequency allocation that is adjacent to the first frequency allocation by the first frame; and transmitting a third frame, via the first frequency allocation, to the AP based on the determination. Process 2900 may include transmitting, by the first STA to the AP, a frame comprising an indication of FDMA support. The frame may comprise a MAC Capabilities Information field comprising the indication of FDMA support (e.g., such as described with respect to FIG. 20). The frame may include an association request frame, a re-association request frame, or a probe request frame. Process 2900 may further include transmitting, by the first STA to the AP, a frame comprising an indication of STR support.

Figure 30:
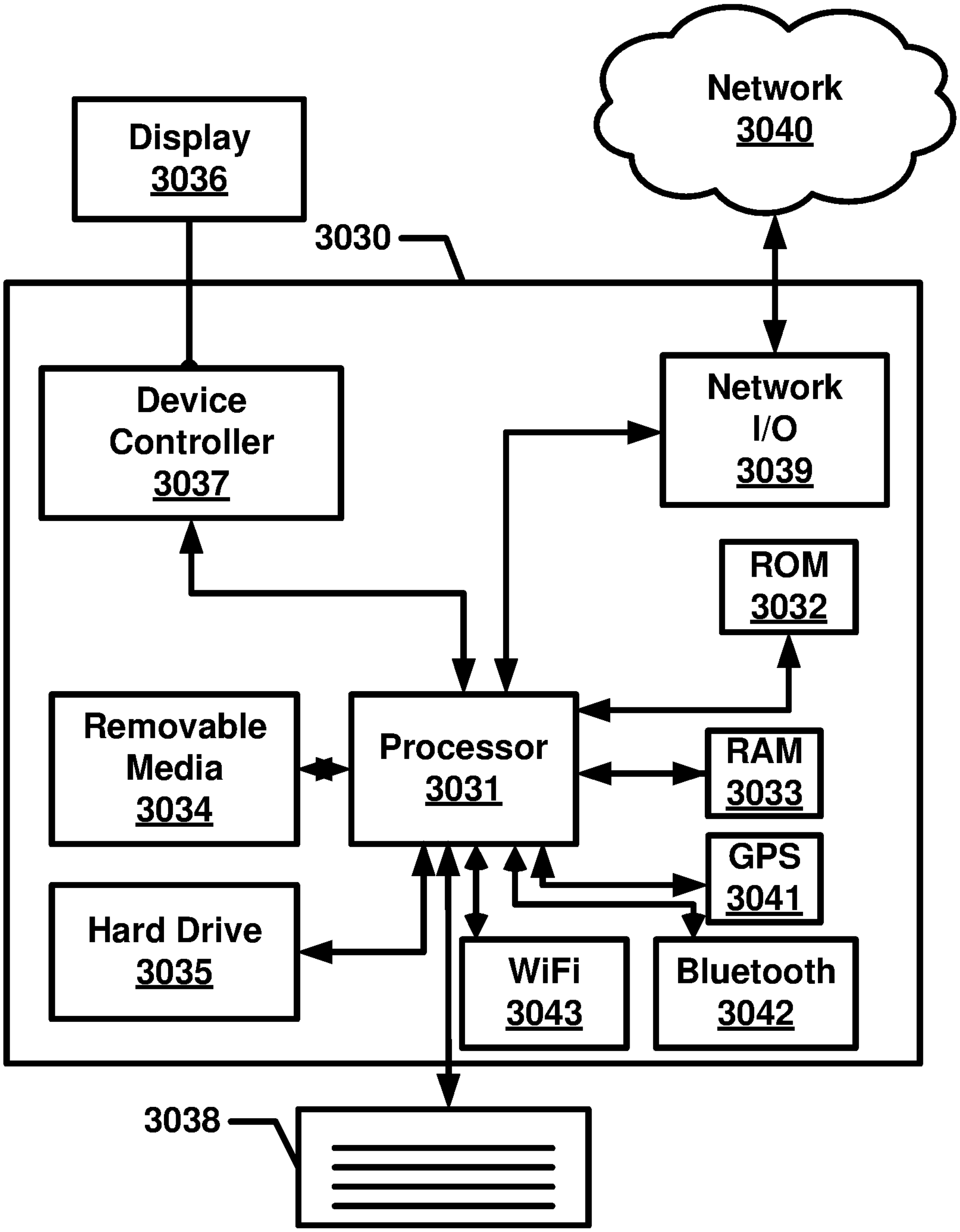
FIG. 30 shows example elements of a computing device that may be used to implement any of the various devices described herein.

FIG. 30 shows example elements of a computing device that may be used to implement any of the various devices described herein, including, for example, a STA (e.g., 110, 711, 811, 812, 911, 912, 913, 914, 1002, 1004, 1311, 1312, 1313, 1314, 1602, 1604, 2311, 2312, 2313, 2314, 2315, 2511, 2512, 2513, 2514, 2515), an AP (e.g., 104, 120, 710, 810, 910, 1310, 2310, 2510), a non-AP/STA MLD, communication devices (e.g., 210, 260), and/or any computing and/or communication device described herein. The computing device 3030 may include one or more processors 3031, which may execute instructions stored in the random-access memory (RAM) 3033, the removable media 3034 (such as a Universal Serial Bus (USB) drive, compact disk (CD) or digital versatile disk (DVD), or floppy disk drive), or any other desired storage medium. Instructions may also be stored in an attached (or internal) hard drive 3035. The computing device 3030 may also include a security processor (not shown), which may execute instructions of one or more computer programs to monitor the processes executing on the processor 3031 and any process that requests access to any hardware and/or software components of the computing device 3030 (e.g., ROM 3032, RAM 3033, the removable media 3034, the hard drive 3035, the device controller 3037, a network interface 3039, a GPS 3041, a Bluetooth interface 3042, a Wi-Fi interface 3043, etc.). The computing device 3030 may include one or more output devices, such as the display 3036 (e.g., a screen, a display device, a monitor, a television, etc.), and may include one or more output device controllers 3037, such as a video processor. There may also be one or more user input devices 3038, such as a remote control, keyboard, mouse, touch screen, microphone, etc. The computing device 3030 may also include one or more network interfaces, such as a network interface 3039, which may be a wired interface, a wireless interface, or a combination of the two. The network interface 3039 may provide an interface for the computing device 3030 to communicate with a network 3040 (e.g., a RAN, or any other network). The network interface 3039 may include a modem (e.g., a cable modem), and the external network 3040 may include communication links, an external network, an in-home network, a provider's wireless, coaxial, fiber, or hybrid fiber/coaxial distribution system (e.g., a DOCSIS network), or any other desired network. Additionally, the computing device 3030 may include a location-detecting device, such as a global positioning system (GPS) microprocessor 3041, which may be configured to receive and process global positioning signals and determine, with possible assistance from an external server and antenna, a geographic position of the computing device 3030.

The example in FIG. 30 may be a hardware configuration, although the components shown may be implemented as software as well. Modifications may be made to add, remove, combine, divide, etc. components of the computing device 3030 as desired. Additionally, the components may be implemented using basic computing devices and components, and the same components (e.g., processor 3031, ROM storage 3032, display 3036, etc.) may be used to implement any of the other computing devices and components described herein. For example, the various components described herein may be implemented using computing devices having components such as a processor executing computer-executable instructions stored on a computer-readable medium, as shown in FIG. 30. Some or all of the entities described herein may be software based, and may co-exist in a common physical platform (e.g., a requesting entity may be a separate software process and program from a dependent entity, both of which may be executed as software on a common computing device).

A computing device may perform a method comprising multiple operations. A first computing device may receive, from an access point (AP), a first frame indicating: a plurality of frequency allocations for a plurality of computing devices, wherein the plurality of frequency allocations comprise a first frequency allocation for the first computing device; and a sharing mode in which the first computing device is allowed to transmit to another computing device using the first frequency allocation. The first computing device may transmit to a second computing device, via the first frequency allocation, and based on the second computing device not belonging to the plurality of computing devices, a second frame. The first STA may receive the first frame comprising: a signal during a triggered transmit opportunity (TXOP) sharing (TXS) mode for a TXOP obtained by the AP; an indication that a computing device of the plurality of computing devices transmits to the AP or to another computing device using a frequency allocation of the plurality of frequency allocations; and an indication of whether a Frequency Division Multiple Access (FDMA) mode is used during the TXOP. A receiver of the first computing device may be configured to monitor a plurality of frequency subchannels supported by the FDMA mode, based on the first computing device not belonging to the plurality of computing devices allocated by the first frame and based on the indication indicating FDMA mode use during the TXOP. The first frame may comprise: a second frequency allocation for a second computing device; a sharing mode for the first computing device; and an indication that the first computing device is allowed, based on the sharing mode, to transmit to another computing device using the first frequency allocation. The first computing device may transmit, to the second computing device, via the first frequency allocation, and based on the second frequency allocation being non-adjacent to the first frequency allocation, a second frame. It may be determined that the first computing device has buffered traffic for transmission to the second computing device. The second computing device may be added to a set of candidate computing devices. A third computing device may be added to a set of candidate computing devices based on data being available for transmission to the third computing device. The first computing device may transmit a Clear to Send (CTS) frame prior to transmitting the second frame. The first computing device may receive, from the second computing device and based on the second frame, a BlockAck (BA) frame. the first computing device may transmit to a third computing device, via the first frequency allocation, and based on the third STA not belonging to the plurality of computing devices allocated by the first frame, a third frame. The first computing device may receive a BlockAck (BA) frame from the second computing device based on the second frame. The first frame may be a trigger frame. The first frame may be a multi-user (MU) Request to Send (RTS) Transmit Opportunity (TXOP) Sharing (TXS) Trigger (MRTT) frame. The first frame may comprise a Common Info field, and wherein the Common Info field comprises the sharing mode. The first frame may comprise an indication of FDMA mode use. The third computing device may be removed, based on the third computing device belonging to the plurality of computing devices allocated by the first frame, from the set of candidate computing devices. The second frame may be transmitted to the second computing device, via the first frequency allocation, and based on the second computing device not belonging to the plurality of computing devices allocated by the first frame. The Common Info field may comprise an FDMA mode subfield comprising the indication of FDMA mode use. The sharing mode may be TXS Mode 2. The Common Info field may comprise a TXS Mode subfield which provides the sharing mode and the indication of FDMA mode use. The sharing mode may be TXS Mode 3. The MRTT frame may further comprise a first User Info field for the first computing device which comprises an indication of FDMA mode use for the first computing device. The first frame may comprise first User Info field comprising the first frequency allocation for the first computing device. The first User Info field may comprise an RU Allocation subfield comprising the first frequency allocation for the first computing device. The first User Info field may comprise an Allocation Duration subfield comprising a time period for transmitting the second frame. The determining may comprise reading a plurality of User Info fields of the first frame to determine computing devices allocated by the first frame. Reading the plurality of User Info fields of the first frame may comprise reading all of the User Info fields of the first frame. A set of candidate computing devices may be determined for transmission based on buffered traffic availability at the first computing device. It may be determined that all computing devices of the set of candidate computing devices for transmission belong to the plurality of computing devices allocated by the first frame. A third frame may be transmitted, via the first frequency allocation, to the AP. Another frame may be transmitted comprising an indication of FDMA support. The another frame may comprise a MAC Capabilities Information field comprising the indication of FDMA support. The another frame may include an association request frame, a re-association request frame, or a probe request frame. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive, from an access point (AP), a first frame indicating: a plurality of computing device allocations; a plurality of frequency allocations for a plurality of computing devices; a signal during a triggered transmit opportunity (TXOP) sharing (TXS) mode for a TXOP obtained by the AP; an indication that a computing device of the plurality of computing devices transmits to the AP or to another computing device using a frequency allocation of the plurality of frequency allocations; and an indication of whether FDMA mode is used during the TXOP. The first computing devices may configure, based on the first computing devices not belonging to the plurality of computing devices allocated by the first frame and based on the indication indicating FDMA mode use during the TXOP, a receiver of the first computing device to monitor a plurality of frequency subchannels supported by the FDMA mode. The first frame may be a trigger frame. The first frame may be a multi-user (MU) Request to Send (RTS) Transmit Opportunity (TXOP) Sharing (TXS) Trigger (MRTT) frame. The first frame may comprise a Common Info field. The Common Info field may comprise the sharing mode. The Common Info field may further comprise the indication of whether FDMA mode is used during the TXOP. The Common Info field may further comprise an FDMA mode subfield comprising the indication of whether FDMA mode is used during the TXOP. The sharing mode may be TXS Mode 2. The Common Info field may comprise a TXS Mode subfield which provides the sharing mode and the indication of whether FDMA mode is used during the TXOP. The sharing mode may be TXS Mode 3. The first frame may comprise a User Info field comprising a frequency allocation for a second computing device of the plurality of computing devices. The User Info field may comprise an RU Allocation subfield comprising the frequency allocation for the second computing device. The User Info field may comprise an Allocation Duration subfield comprising a time period for transmitting a frame by the second computing device using the frequency allocation. The first computing device may not belong to the plurality of computing devices allocated by the first frame. The indication may indicate FDMA mode use during the TXOP. A BlockAck (BA) frame may be transmitted to the second computing device based on the second frame, based on the first computing device receiving a second frame from a second computing device of the plurality of computing devices. The second frame may comprise a physical layer (PHY) protocol data unit (PPDU). A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive from an access point (AP) a first frame indicating: a first frequency allocation for the first computing device; a second frequency allocation for a second computing device; and a sharing mode according to which the first computing device is allowed to transmit to another computing device using the first frequency allocation. The first computing device may transmit to the second computing device, via the first frequency allocation, and based on the second frequency allocation being non-adjacent to the first frequency allocation, a second frame. A receiver of the first computing device may be configured to monitor a plurality of frequency bands that exclude a first frequency band corresponding to the first frequency allocation of the first computing device. A set of candidate computing devices may be determined based on buffered traffic availability at the first computing device. It may be determined that every computing device of the set of candidate computing devices is allocated, by the first frame, a frequency allocation that is adjacent to the first frequency allocation by the first frame. A third frame may be transmitted to the AP via the first frequency allocation. An indication of FDMA support may be transmitted. The second computing device may be added to a set of candidate computing devices for transmission. A third computing device may be determined to which the first computing device has buffered traffic for transmission. The third computing device may be added to the set of candidate computing device for transmission. The third computing device may be removed from the set of candidate computing devices for transmission based on the third computing device being allocated a third frequency allocation that is adjacent to the first frequency allocation. The second computing device may be allocated by the first frame a second frequency allocation that is non-adjacent to the first frequency allocation, further comprising transmitting the second frame, via the first frequency allocation, to the second computing device. A Clear to Send (CTS) frame may be transmitted prior to transmitting the second frame. A Block-Ack (BA) frame may be received from the second computing device based on the second frame. A third frame may be transmitted to a third computing device based on receiving the BA frame from the second computing device, via the first frequency allocation, and based on the third computing device not belonging to the plurality of computing device allocated by the first frame or the third computing device being allocated by the first frame a third frequency allocation that is non-adjacent to the first frequency allocation. The first frame may be a trigger frame. The trigger frame may be a multi-user (MU) Request to Send (RTS) Transmit Opportunity (TXOP) Sharing (TXS) Trigger (MRTT) frame. The MRTT frame may comprise a Common Info field. The Common Info field may comprise the sharing mode. The Common Info field may further comprise an indication of FDMA mode use. The Common Info field may further comprise an FDMA mode subfield comprising the indication of FDMA mode use. The sharing mode may be TXS Mode 2. The Common Info field may comprise a TXS Mode subfield, the TXS Mode subfield providing both the sharing mode and the indication of FDMA mode use. The sharing mode may be TXS Mode 3. The MRTT frame may further comprise a first User Info field for the first computing device, the first User Info field comprising an indication of FDMA mode use for the first computing device. The first frame may comprise a first User Info field comprising the first frequency allocation for the first computing device. The first User Info field may comprise an RU Allocation subfield comprising the first frequency allocation for the first computing device. The first User Info field may comprise an Allocation Duration subfield comprising a time period for transmitting the second frame. The determining may comprise reading a plurality of User Info fields of the first frame to determine computing devices allocated by the first frame. Reading the plurality of User Info fields of the first frame comprises reading all of the User Info fields of the first frame. The further frame may comprise a MAC Capabilities Information field comprising the indication of FDMA support. The further frame may include an association request frame, a re-association request frame, or a probe request frame. The plurality of frequency bands may correspond to the plurality of frequency allocations indicated in the first frame. The first computing device may have simultaneous transmit-receive (STR) capability. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive, from an access point (AP), a first frame indicating: a plurality of frequency allocations comprising a first frequency allocation for the first computing device; and a sharing mode according to which the first computing device is allowed to transmit to another computing device using the first frequency allocation. A second computing device may be determined by the first computing device based on the second computing device not being allocated by the first frame for transmission of a second frame via the first frequency allocation. The first computing device may transmit the second frame to the second computing device via the first frequency allocation. The first computing device may determine that the first computing device has buffered traffic for transmission to the second computing device. The second computing device may be added to a set of candidate computing devices for transmission. A third computing device may be determined to which the first computing device has buffered traffic for transmission. The third computing device may be added to the set of candidate computing devices for transmission. The third computing device may be removed from the set of candidate computing devices for transmission based on the third computing device belonging to the plurality of computing devices allocated by the first frame. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive, from an access point (AP), a first frame indicating: a plurality of frequency allocations comprising a first frequency allocation for the first computing device; and a sharing mode according to which the first computing device is allowed to transmit to another computing device using the first frequency allocation. A second frame may be not transmitted via the first frequency allocation to the second computing device based on the second computing device being allocated in the first frame. A third frame may be transmitted, via the first frequency allocation, to a third computing device, based on the third computing device no belonging to the plurality of computing devices allocated by the first frame. The first computing device may determine that the first computing device has buffered traffic for transmission to the third computing device. The third computing device may be added to a set of candidate computing device for transmission. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive from an access point (AP) a first frame indicating: a first frequency allocation for the first computing device; a second frequency allocation for a second computing device; and a sharing mode according to which the first computing device is allowed to transmit to another computing device using the first frequency allocation. The first computing device may determine whether the first computing device has buffered traffic for transmission to the second STA. The first computing device may transmit to the second computing device and via the first frequency allocation, a second frame on condition that the second frequency allocation is non-adjacent to the first frequency allocation. A receiver of the first computing device may be configured to monitor a plurality of frequency bands not including a first frequency band corresponding to the first frequency allocation of the first computing device. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive, from an access point (AP), a first frame indicating: a plurality of frequency allocations comprising a first frequency allocation for the first computing device; and a sharing mode according to which the first computing device is allowed to transmit to another computing device using the first frequency allocation. The first computing device may determine a second computing device for transmission of a second frame via the first frequency allocation, based on the second computing device not being allocated by the first frame or the second computing device being allocated by the first frame a second frequency allocation that is non-adjacent to the first frequency allocation. The first computing device may transmit the second frame via the first frequency allocation to the second computing device. A receiver of the first computing device may be configured to monitor a plurality of frequency bands not including a first frequency band corresponding to the first frequency allocation of the first computing device. The first computing device may determine that the first computing device has buffered traffic for transmission to the second computing device. The second computing device may be added to a set of candidate computing devices for transmission. A third computing device may be determined to which the first computing device has buffered traffic for transmission. The third computing device may be added to the set of candidate computing devices for transmission. The third computing device may be removed from the set of candidate computing devices for transmission based on the third computing device being allocated a third frequency allocation that is adjacent to the first frequency allocation by the first frame. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

A computing device may perform a method comprising multiple operations. A first computing device may receive, from an access point (AP), a first frame indicating a plurality of frequency allocations comprising a first frequency allocation for the first computing device and a second frequency allocation for a second computing device; and a sharing mode according to which the first computing device is allowed to transmit to another computing device using the first frequency allocation. A second frame may be transmitted, via the first frequency allocation, to the second computing device based on the second frequency allocation being adjacent to the first frequency allocation. A receiver of the first computing device may be configured to monitor a plurality of frequency bands not including a first frequency band corresponding to the first frequency allocation of the first computing device. A third frame may be transmitted to a third computing device, via the first frequency allocation, and based on the third STA not belonging to the plurality of computing devices allocated by the first frame or the third computing device being allocated a third frequency allocation by the first frame that is adjacent to the first frequency allocation. The first computing device may determine that the first computing device has buffered traffic for transmission to the third computing device. The third computing device may be added to a set of candidate computing devices for transmission. A frame comprising an indication of STR support may be transmitted to the AP. A computing device may comprise one or more processors and memory storing instructions that, when executed by the one or more processors, cause the computing device to perform the methods described herein. A system may comprise a computing device configured to perform the methods described herein. The computing device may be configured to receive at least one message from an AP. A computer-readable medium may store instructions that, when executed, cause performance of the methods described herein.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

An access point (and an AP MLD) may communicate with one or more wireless devices (e.g., computing device(s), non-AP MLD(s), station(s), etc.). Computing devices described herein may support multiple technologies, and/or multiple releases of the same technology. Computing devices may have some specific capability(ies) depending on wireless device category and/or capability(ies). Computing devices referred to herein may correspond to a plurality of computing devices compatible with a given LTE, 5G, 3GPP or non-3GPP release, IEEE 802.11 Standard(s) (e.g., IEEE 802.11be, beyond IEEE 802.11be), or Wi-Fi Alliance (WFA) Standard(s) (e.g., Wi-Fi 7, Wi-Fi 8) technology. A plurality of computing devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of access points and/or a plurality of wireless devices in a coverage area that may not comply with the disclosed methods, for example, because those wireless devices and/or access points may perform based on other (e.g., older or newer) releases of LTE, 5G, 6G, 3GPP or non-3GPP, IEEE 802.11

Standards (e.g., IEEE 802.11be, beyond IEEE 802.11be), or Wi-Fi Alliance (WFA) Standards (e.g., Wi-Fi 7, Wi-Fi 8) technology.

Communications described herein may be determined, generated, sent, and/or received using any quantity of messages, information elements, fields, parameters, values, indications, information, bits, and/or the like. While one or more examples may be described herein using any of the terms/phrases message, information element, field, parameter, value, indication, information, bit(s), and/or the like, one skilled in the art understands that such communications may be performed using any one or more of these terms, including other such terms. For example, one or more parameters, fields, and/or information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as access points (APs), AP multi-link devices (MLDs), stations (STAs), non-AP STAs, non-AP MLDs, base stations, wireless devices or user equipment (wireless device), servers, switches, antennas, and/or the like. A network may comprise any wireless technology, including but not limited to, cellular, wireless, Wi-Fi, 4G, 5G, 6G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

What is claimed is:

1. A method comprising:

receiving, by a first computing device from an access point (AP), a first frame indicating:

a plurality of frequency allocations for a plurality of computing devices, wherein the plurality of frequency allocations comprise a first frequency allocation for the first computing device; and a sharing mode in which the first computing device is allowed to transmit to another computing device using the first frequency allocation;

determining that a second computing device does not belong to the plurality of computing devices that are indicated in the first frame; and transmitting, by the first computing device to the second computing device, via the first frequency allocation, and based on the second computing device not belonging to the plurality of computing devices, a second frame.

2. The method of claim 1, further comprising:

receiving a third frame comprising:

a second plurality of frequency allocations for a second plurality of computing devices;

a signal during a triggered transmit opportunity (TXOP) sharing (TXS) mode for a TXOP obtained by the AP;

an indication that the second computing device transmits, using a frequency allocation of the second plurality of frequency allocations, to the AP or to a third computing device of the second plurality of computing devices; and an indication of whether a frequency division multiple access (FDMA) mode is used during the TXOP;

determining, by the first computing device, that the first computing device does not belong to the second plurality of computing devices allocated by the third frame;

determining, by the first computing device, that the third frame indicates usage of the FDMA mode during the TXOP; and configuring, based on the first computing device not belonging to the second plurality of computing devices allocated by the third frame and based on the third frame indicating usage of the FDMA mode during the TXOP, a receiver of the first computing device to monitor a plurality of frequency subchannels supported by the FDMA mode.

3. The method of claim 1, further comprising:

receiving, by the first computing device from the AP, a third frame indicating:

a second frequency allocation for the second computing device;

a third frequency allocation for the first computing device; and a second sharing mode according to which the first computing device is allowed to transmit to another computing device using the third frequency allocation;

determining, by the first computing device, that the second frequency allocation is non-adjacent to the third frequency allocation; and transmitting, by the first computing device to the second computing device, via the third frequency allocation, and based on the second frequency allocation being non-adjacent to the third frequency allocation, a fourth frame.

4. The method of claim 1, further comprising determining, by the first computing device, that the first computing device has buffered traffic for transmission to the second computing device.

5. The method of claim 1, further comprising adding the second computing device to a set of candidate computing devices.

6. The method of claim 1, further comprising adding, to a set of candidate computing devices, and based on data being available for transmission to a third computing device, the third computing device.

7. The method of claim 1, further comprising:

transmitting a Clear to Send (CTS) frame prior to transmitting the second frame;

receiving, from the second computing device and based on the second frame, a BlockAck (BA) frame; and transmitting, to a third computing device, via the first frequency allocation, and based on the third computing device not belonging to the plurality of computing devices allocated by the first frame, a third frame.

8. The method of claim 1, further comprising receiving a BlockAck (BA) frame from the second computing device based on the second frame.

9. The method of claim 1, wherein the first frame is a trigger frame.

10. The method of claim 1, wherein the first frame is a multi-user (MU) Request to Send (RTS) Transmit Opportunity (TXOP) Sharing (TXS) Trigger (MRTT) frame.

11. The method of claim 1, wherein the first frame comprises a Common Info field, and wherein the Common Info field comprises the sharing mode.

12. The method of claim 1, wherein the first frame comprises an indication of frequency division multiple access (FDMA) FDMA-mode use.

13. A method comprising:

receiving, by a first computing device from an access point (AP), a first frame indicating:

a plurality of frequency allocations for a plurality of computing devices;

a signal during a triggered transmit opportunity (TXOP) sharing (TXS) mode for a TXOP obtained by the AP;

an indication that a second computing device of the plurality of computing devices transmits, using a frequency allocation of the plurality of frequency allocations, to the AP or to another computing device; and an indication of whether frequency division multiple access (FDMA) mode is used during the TXOP;

determining, by the first computing device, that the first computing device does not belong to the plurality of computing devices;

determining, by the first computing device, that the first frame indicates usage of the FDMA mode during the TXOP; and configuring, based on the first computing device not belonging to the plurality of computing devices and based on the first frame indicating usage of the FDMA mode during the TXOP, a receiver of the first computing device to monitor a plurality of frequency subchannels supported by the FDMA mode.

14. The method of claim 13, wherein the first frame is a trigger frame.

15. The method of claim 13, wherein the first frame is a multi-user (MU) Request to Send (RTS) Transmit Opportunity (TXOP) Sharing (TXS) Trigger (MRTT) frame.

16. The method of claim 13, wherein the first frame comprises a Common Info field, and wherein the Common Info field comprises a sharing mode.

17. A method comprising:

receiving, by a first computing device from an access point (AP), a first frame indicating:

a first frequency allocation for the first computing device;

a second frequency allocation for a second computing device; and a sharing mode according to which the first computing device is allowed to transmit to another computing device using the first frequency allocation;

determining, by the first computing device, that the second frequency allocation is non-adjacent to the first frequency allocation; and transmitting, by the first computing device to the second computing device, via the first frequency allocation, and based on the second frequency allocation being non-adjacent to the first frequency allocation, a second frame.

18. The method of claim 17, further comprising configuring a receiver of the first computing device to monitor a plurality of frequency bands that exclude a first frequency band corresponding to the first frequency allocation of the first computing device.

19. The method of claim 17, further comprising:

determining, based on buffered traffic availability at the first computing device, a set of candidate computing devices for transmission;

determining that every computing device of the set of candidate computing devices for transmission is allocated, by the first frame, a frequency allocation that is adjacent to the first frequency allocation; and transmitting, to the AP and via the first frequency allocation, a third frame.

20. The method of claim 17, further comprising transmitting an indication of frequency division multiple access (FDMA) support.

21. A first computing device comprising:

one or more processors; and memory storing instructions that, when executed by the one or more processors, configure the first computing device to:

receive, from an access point (AP), a first frame indicating:

a plurality of frequency allocations for a plurality of computing devices, wherein the plurality of frequency allocations comprise a first frequency allocation for the first computing device; and a sharing mode in which the first computing device is allowed to transmit to another computing device using the first frequency allocation;

determine that a second computing device does not belong to the plurality of computing devices that are indicated in the first frame; and transmit, to the second computing device, via the first frequency allocation, and based on the second computing device not belonging to the plurality of computing devices, a second frame.

22. The first computing device of claim 21, wherein the instructions, when executed by the one or more processors, further configure the first computing device to:

receive a third frame comprising:

a second plurality of frequency allocations for a second plurality of computing devices;

a signal during a triggered transmit opportunity (TXOP) sharing (TXS) mode for a TXOP obtained by the AP;

an indication that the second computing device transmits, using a frequency allocation of the second plurality of frequency allocations, to the AP or to a third computing device of the second plurality of computing devices; and an indication of whether a frequency division multiple access (FDMA) mode is used during the TXOP;

determine that the first computing device does not belong to the second plurality of computing devices allocated by the third frame;

determine that the third frame indicates usage of the FDMA mode during the TXOP; and configure, based on the first computing device not belonging to the second plurality of computing devices allocated by the third frame and based on the third frame indicating usage of the FDMA mode during the TXOP, a receiver of the first computing device to monitor a plurality of frequency subchannels supported by the FDMA mode.

23. The first computing device of claim 21, wherein the instructions, when executed by the one or more processors, further configure the first computing device to:

receive, from the AP, a third frame indicating:

a second frequency allocation for the second computing device;

a third frequency allocation for the first computing device; and a second sharing mode according to which the first computing device is allowed to transmit to another computing device using the third frequency allocation;

determine that the second frequency allocation is non-adjacent to the third frequency allocation; and transmit, to the second computing device, via the third frequency allocation, and based on the second frequency allocation being non-adjacent to the third frequency allocation, a fourth frame.

24. The first computing device of claim 21, wherein the instructions, when executed by the one or more processors, further configure the first computing device to:

determine that the first computing device has buffered traffic for transmission to the second computing device; and add the second computing device to a set of candidate computing devices.

25. The first computing device of claim 21, wherein the instructions, when executed by the one or more processors, further configure the first computing device to:

transmit, prior to transmitting the second frame, a Clear to Send (CTS) frame;

receive, from the second computing device and based on the second frame, a BlockAck (BA) frame; and transmit, to a third computing device, via the first frequency allocation, and based on the third computing device not belonging to the plurality of computing devices allocated by the first frame, a third frame.

26. The first computing device of claim 21, wherein the instructions, when executed by the one or more processors, further configure the first computing device to:

receive, from the second computing device and based on the second frame, a BlockAck (BA) frame.

27. The first computing device of claim 21, wherein the first frame is a trigger frame.

28. The first computing device of claim 21, wherein the first frame is a multi-user (MU) Request to Send (RTS) Transmit Opportunity (TXOP) Sharing (TXS) Trigger (MRTT) frame.

29. The first computing device of claim 21, wherein the first frame comprises a Common Info field, and wherein the Common Info field comprises the sharing mode.

30. The first computing device of claim 21, wherein the first frame comprises an indication of frequency division multiple access (FDMA) mode use.

* * * * *